US00RE42923E

(19) United States
(12) Reissued Patent
Sango et al.

(10) Patent Number: US RE42,923 E
(45) Date of Reissued Patent: Nov. 15, 2011

(54) PIEZOELECTRIC VIBRATION ANGULAR VELOCITY METER AND CAMERA USING THE SAME

(75) Inventors: Yoshinori Sango, Odawara (JP); Toru Fujii, Minamiashigara (JP); Tetsuo Hattori, Yokohama (JP); Tomoko Hattori, legal representative, Yokohama (JP)

(73) Assignee: Panasonic Corporation, Osaka (JP)

( * ) Notice: This patent is subject to a terminal disclaimer.

(21) Appl. No.: 11/441,460

(22) Filed: May 26, 2006

Related U.S. Patent Documents

Reissue of:
(64) Patent No.: 5,794,080
Issued: Aug. 11, 1998
Appl. No.: 08/661,788
Filed: Jun. 13, 1996

U.S. Applications:
(63) Continuation-in-part of application No. 08/520,912, filed on Aug. 30, 1995, now abandoned.

(30) Foreign Application Priority Data

| | | |
|---|---|---|
| Aug. 31, 1994 | (JP) | 6-207080 |
| Aug. 31, 1994 | (JP) | 6-207081 |
| Aug. 31, 1994 | (JP) | 6-207082 |
| May 15, 1995 | (JP) | 7-115693 |
| Jun. 13, 1995 | (JP) | 7-170152 |
| Jul. 25, 1995 | (JP) | 7-209242 |

(51) Int. Cl.
*G03B 5/00* (2006.01)
*G01P 9/00* (2006.01)
*H01L 41/08* (2006.01)

(52) U.S. Cl. ..... 396/53; 73/504.12; 310/317
(58) Field of Classification Search ..... 396/53; 73/504.04, 504.12–504.16; 310/317, 366; 331/173
See application file for complete search history.

(56) References Cited

U.S. PATENT DOCUMENTS 4,692,649 A * 9/1987 Izukawa et al. ..... 310/316.02
(Continued)

FOREIGN PATENT DOCUMENTS

JP 2-223818 9/1990
(Continued)

OTHER PUBLICATIONS

United States Office Action issued in U.S. Appl. No. 12/687,757, mailed Feb. 15, 2011.

*Primary Examiner* — W. B. Perkey
(74) *Attorney, Agent, or Firm* — McDermott Will & Emery LLP

(57) ABSTRACT

When a power switch is turned on, first and second analog switches are turned on while a third analog switch is turned off. Accordingly, at the time of starting, a forced excitation driving circuit supplies to a vibrator an oscillation output pulse which is substantially at the resonance frequency of the vibrator, thereby forcibly driving the vibrator in an excitation manner. Thereafter, when the vibrator substantially attains its stationary state and thereby the charged voltage of a capacitor reaches a threshold value of an inverter, the first and second analog switches are turned off while the third analog switch is turned on. Accordingly, the output of a self-excitation circuit is supplied to the electrode of the vibrator so as to vibrate the vibrator in a self-excitation manner.

10 Claims, 55 Drawing Sheets

U.S. PATENT DOCUMENTS

| | | | | | |
|---|---|---|---|---|---|
| 5,473,288 | A | * | 12/1995 | Kumada | 331/116 R |
| 5,520,050 | A | * | 5/1996 | Nakamura | 73/504.14 |
| 5,534,826 | A | * | 7/1996 | Logan | 331/158 |
| 5,561,400 | A | * | 10/1996 | Iguchi et al. | 331/163 |
| 5,600,063 | A | * | 2/1997 | Ogawa | 73/504.03 |

FOREIGN PATENT DOCUMENTS

| | | | |
|---|---|---|---|
| JP | 02-223818 | * | 9/1990 |
| JP | 3-150914 | | 6/1991 |
| JP | 03-150914 | * | 6/1991 |

* cited by examiner

PIEZOELECTRIC VIBRATION ANGULAR VELOCITY METER AND CAMERA USING THE SAME

Matter enclosed in heavy brackets [ ] appears in the original patent but forms no part of this reissue specification; matter printed in italics indicates the additions made by reissue.

RELATED APPLICATIONS

[This is a continuation-in-part application of application Ser. No. 08/520,912 filed on Aug. 30, 1995, now pending.] *More than one reissue application has been filed for the reissue of Ser. No. 08/661,788, filed Jun. 13, 1996, U.S. Pat. No. 5,794,080, which is a Continuation-In-Part of Ser. No. 08/520,912 filed Aug. 30, 1995, abandoned. The reissue applications are application Ser. No. 11/441,460 (the present application), filed May 26, 2006 and Ser. No. 12/687,757, filed Jan. 14, 2010, which is a continuation reissue application of parent reissue application Ser. No. 11/441,460.*

BACKGROUND OF THE INVENTION

1. Field of the Invention

The present invention relates to an angular velocity meter using a piezoelectric element and a camera using the meter and, more particularly, to a camera which prevents a camera shake.

2. Related Background Art

A conventional piezoelectric vibration angular velocity meter is disclosed in Japanese Patent Laid-Open No. 3-150914.

SUMMARY OF THE INVENTION

The piezoelectric angular velocity meters of the present invention can be classified into bimorph and unimorph piezoelectric angular velocity meters.

A bimorph piezoelectric angular velocity meter includes a piezoelectric element. This piezoelectric element includes a first piezoelectric element and a second piezoelectric element bonded to the first piezoelectric element.

The second piezoelectric element includes a second member made of a piezoelectric crystal, and upper- and lower-surface electrodes sandwiching the second member.

The first piezoelectric element is fixed to the upper-surface electrode of the second piezoelectric element with an adhesive. The first piezoelectric element includes a first member made of a piezoelectric crystal, upper-surface electrodes, and a lower-surface electrode. The upper- and lower-surface electrodes sandwich the first member. An adhesive is interposed between the lower-surface electrode of the first member and the upper-surface electrode of the second member. The upper-surface electrodes include a left electrode, a right electrode, and a middle electrode located between the left and right electrodes. These electrodes extend along the longitudinal direction of the piezoelectric element.

The first and second members are made of PZT. Each electrode is made of a silver paste.

When an AC voltage is applied between the upper- and lower-surface electrodes of the second piezoelectric element, the piezoelectric is subjected to element self-excited vibration. Since the first and second piezoelectric elements are bonded to each other, the first piezoelectric element also vibrates at this time. The piezoelectric element deflects in the direction of thickness of the piezoelectric element.

When the piezoelectric element is caused to vibrate without being fixed anywhere, i.e., when the piezoelectric element is vibrated in a nonrestraint state, the piezoelectric element (vibrator) vibrates on two nodes.

This piezoelectric angular velocity meter further includes a substrate. Two support portions are interposed between the substrate and the second piezoelectric element. The two support members are interposed between the piezoelectric element and the substrate at positions corresponding to the two nodes of vibration.

Assume that when the piezoelectric element is vibrated, the piezoelectric element deflects such that the central position of the element moves at a velocity V. At this time, when this piezoelectric element rotates about the central axis along the longitudinal direction of the piezoelectric element, a Coriolis force is generated in a direction (lateral direction) perpendicular to both the longitudinal direction and the direction of thickness of the piezoelectric element. As a result, the piezoelectric element deflects in the lateral direction.

The deflection amount of the piezoelectric element in the lateral direction corresponds to the rotational angular velocity of the piezoelectric element. This deflection amount can be measured by detecting the difference between voltage signals output from the left and right electrodes of the second piezoelectric element. Ideally, the deflection amount of the middle electrode in the direction of thickness does not change even if the piezoelectric element deflects in the lateral direction. In practice, however, the deflection amount of the middle electrode in the direction of thickness slightly changes. If the deflection amount in the direction of thickness changes, an accurate angular velocity cannot be detected. For this reason, the amplitude of an AC voltage to be applied to the piezoelectric element is controlled by an automatic level control circuit such that the deflection amount (amplitude) of the middle electrode of the piezoelectric element in the direction of thickness is kept constant.

This piezoelectric angular velocity meter can be applied to a camera. The camera includes a motor for moving a lens. The motor is controlled by a central processing unit (CPU).

The CPU controls the motor not to change the positions of a film and the optical axis of the lens in the camera on the basis of an angular velocity detected by the piezoelectric angular velocity meter, thereby causing the motor to move the lens.

A unimorph piezoelectric angular velocity meter does not have a first member. In a bimorph piezoelectric angular velocity meter, the piezoelectric element may be cantilevered.

An angular velocity meter according to the present invention comprises a vibrator and a self-excitation driving circuit for driving said vibrator in a self-excitation manner, and the self-excitation driving circuit comprises: a converting means for converting a first sine wave voltage indicative of a state of vibration of the vibrator into a square wave voltage which becomes a first predetermined level when the first [square] *sine* wave voltage is greater than a predetermined reference level while becoming a second predetermined level when the first [square] *sine* wave voltage is smaller than the predetermined reference level; a filter for filtering a second sine wave voltage, which has a frequency identical to a frequency of the first sine wave voltage, from the square wave voltage; and a phase shifter for adjusting a phase of the second sine wave voltage, which has been filtered by the filter, such that an amplitude of vibration of the vibrator is substantially maximized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
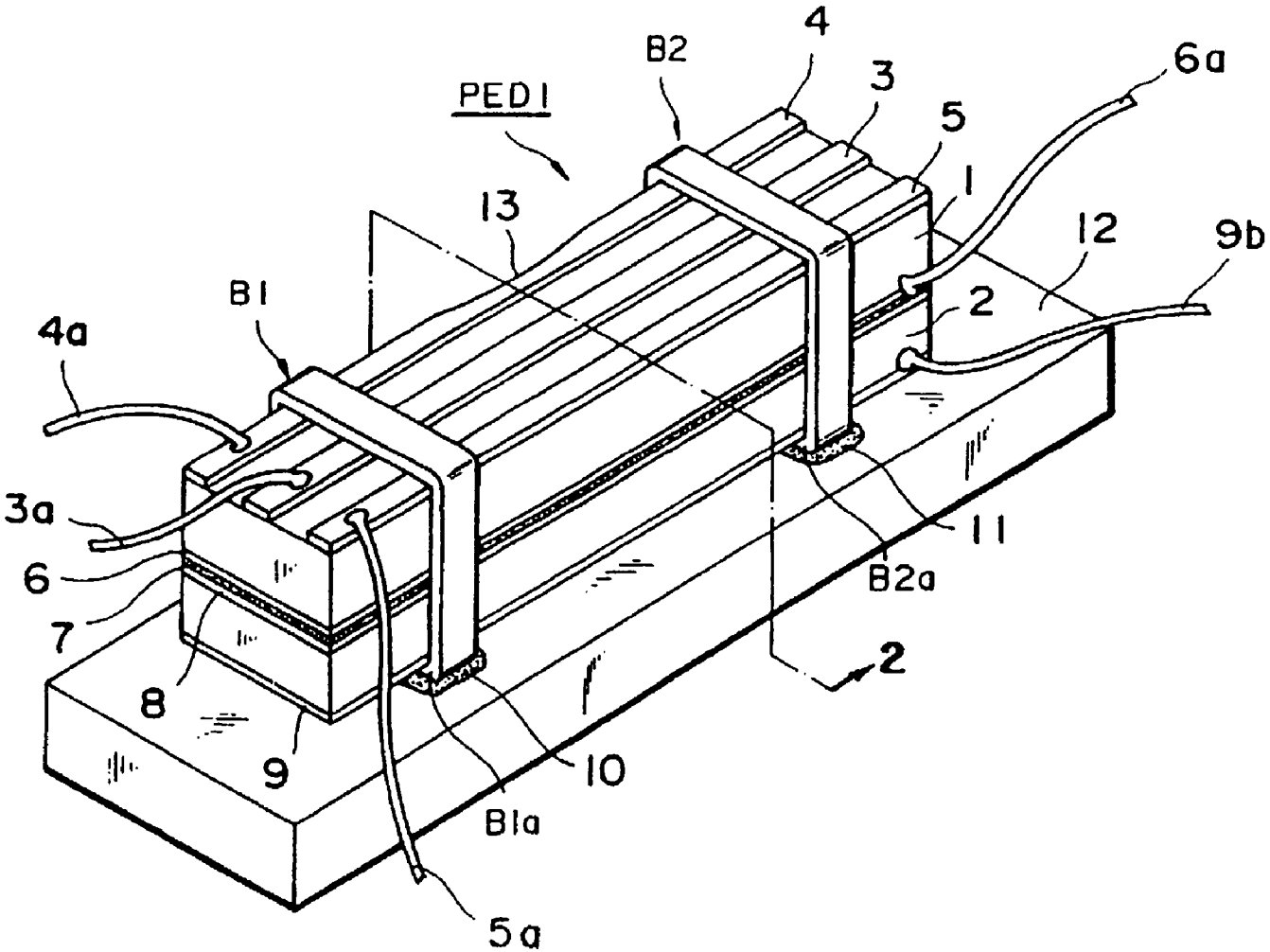
FIG. 1 is a perspective view of a piezoelectric element according to an embodiment of the present invention.
Figure 2:
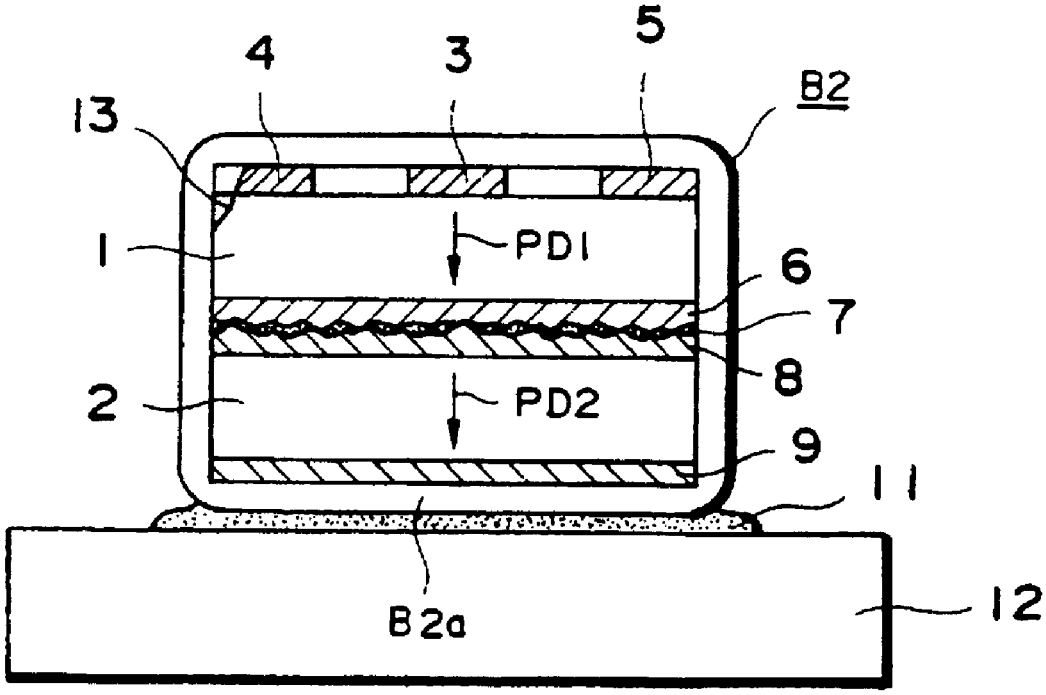
FIG. 2 is a longitudinal sectional view taken along the direction indicated by an arrow Z in FIG. 1 illustrating the piezoelectric element.

FIGS. 1 and 2 show a piezoelectric element according to an embodiment of the present invention.

A piezoelectric element PED1 comprises first and second piezoelectric elements. The first piezoelectric includes a first member 1, an electrode 6, and electrodes 3, 4, and 5. The electrode 6 and the electrodes 3, 4, and 5 sandwich the first member 1. The second piezoelectric element includes a second member 2 and electrodes 8 and 9 which sandwich the second member 2.

Each of the first and second members 1 and 2 is made of a piezoelectric crystal such as PZT. Each of the electrodes 3, 4, 5, 6, 8, and 9 is made of a silver paste. The lower surface of the first piezoelectric element is fixed to the upper surface of the second piezoelectric element via an adhesive layer 7.

A direction perpendicular to both the longitudinal direction and the direction of thickness of the first member 1 is defined as a "lateral direction" or "widthwise direction". The middle electrode 3 of the first piezoelectric element is arranged between the right and left electrodes 5 and 4. There are gaps between the middle electrode 3 and the right electrode 5 and between the middle electrode 3 and the left electrode 4. These electrodes 3, 4, and 5 are electrically insulated from each other. The electrodes 3, 4, and 5 extend parallel in the longitudinal direction.

The adhesive layer 7 between the lower surface of the lower-surface electrode 6 of the first piezoelectric element and the upper-surface electrode 8 of the second optical axis element is electrically insulated. Both the lower surface of the lower-surface electrode 6 of the first piezoelectric element and the upper surface of the upper-surface electrode 7 of the second piezoelectric element are rough. The adhesive layer 7 has a thickness of 1 mm or less. For these reasons, these electrodes 6 and 7 are electrically connected to each other.

The piezoelectric element PED1 is supported by ring-like support members B1 and B2. The rubber rings B1 and B2 are wound on the piezoelectric element PED1. Each of the rings B1 and B2 is made of silicone rubber and is fixed to a substrate 12 via adhesive layers 10 and 11. A node set when the piezoelectric element PED1 vibrates in a nonrestraint state is a point that remains still when the piezoelectric element PED1 vibrates without being supported anywhere. Two nodes are set. The piezoelectric element PED1 is supported by the support members B1 and B2 at the positions of these two nodes to be fixed to the substrate 12. The support members B1 and B2 respectively have support portions B1a and B2a.

The substrate 12 is a glass plate. The substrate 12 may be made of alumina.

One edge of the piezoelectric element PED1 is slightly cut. That is, a portion of the electrode 4 is cut, and the edge defined by the upper and side surfaces of the first piezoelectric element is smoothly arcuated. The first member 1 has an arcuated edge surface 13. When a portion of the piezoelectric element PED1 is cut, its natural oscillation frequency changes. A portion of the piezoelectric element PED1 is cut to adjust its natural oscillation frequency so as to match the frequency of an AC voltage to be applied between the electrodes 8 and 9.

Lead lines (wires) 3a, 4a, 5a, 6a, and 9a are electrically connected to the electrodes 3, 4, 5, 6, and 9, respectively.

The first and second members 1 and 2 have undergone polarization. The polarizing direction coincides with the direction of thickness of the members 1 and 2.

Figure 3A:
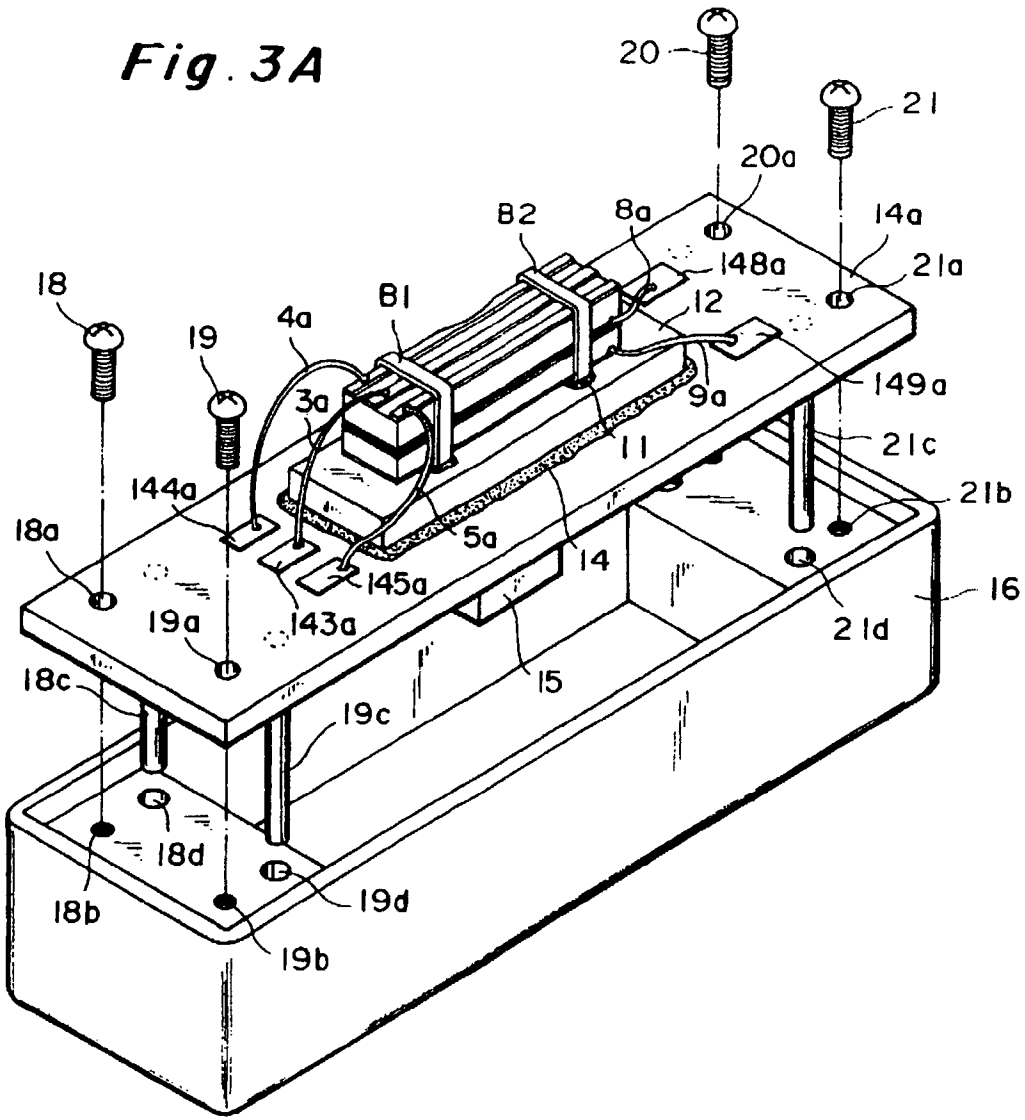
FIG. 3A is a perspective view showing the piezoelectric element in FIG. 1, a circuit for driving the piezoelectric element, and a case for housing them.

FIG. 3A shows the piezoelectric element in FIG. 1, a circuit unit for driving the piezoelectric element, and a case for housing them.

The glass plate 12 is fixed to a circuit board 14a via an adhesive layer 14. A circuit unit 15 is mounted on the lower surface of the circuit board 14a. The lead lines 3a, 4a, 5a, 6a, and 9a are electrically connected to the circuit unit 15 via terminals 143a, 144a, 145a, 146a, and 149a arranged on the upper surface of the circuit board 14a.

Four holes 18a to 21a are formed in the corner portions of the circuit board 14a. Screws 18 to 21 extend through these holes 18a to 21a, respectively. These screws 18 to 21 are threadably engaged with screw holes 18b to 21b formed in the upper surface of a lower case 16. The circuit board 14a is, therefore, fixed to the lower case 16. The lower case 16 is made of a plastic material.

A large cavity capable of housing the circuit unit 15 is formed in the center of the lower case 16. When the circuit board 14a is fixed to the lower case 16, the circuit unit 15 is housed in this cavity.

An input pin 18c, an output pin 19c, and a GND pin 21c extend downward from the circuit board 14a. These terminals 18c, 19c, and 21c are connected to the circuit unit 15. An input voltage is applied from the outside of the element in FIG. 3A to the circuit unit 15 via the input pin 18c. The GND pin 21c is connected to the earth (ground). An output voltage is output from the circuit unit 15 to the outside of this element via the output pin 19c.

Figure 3B:
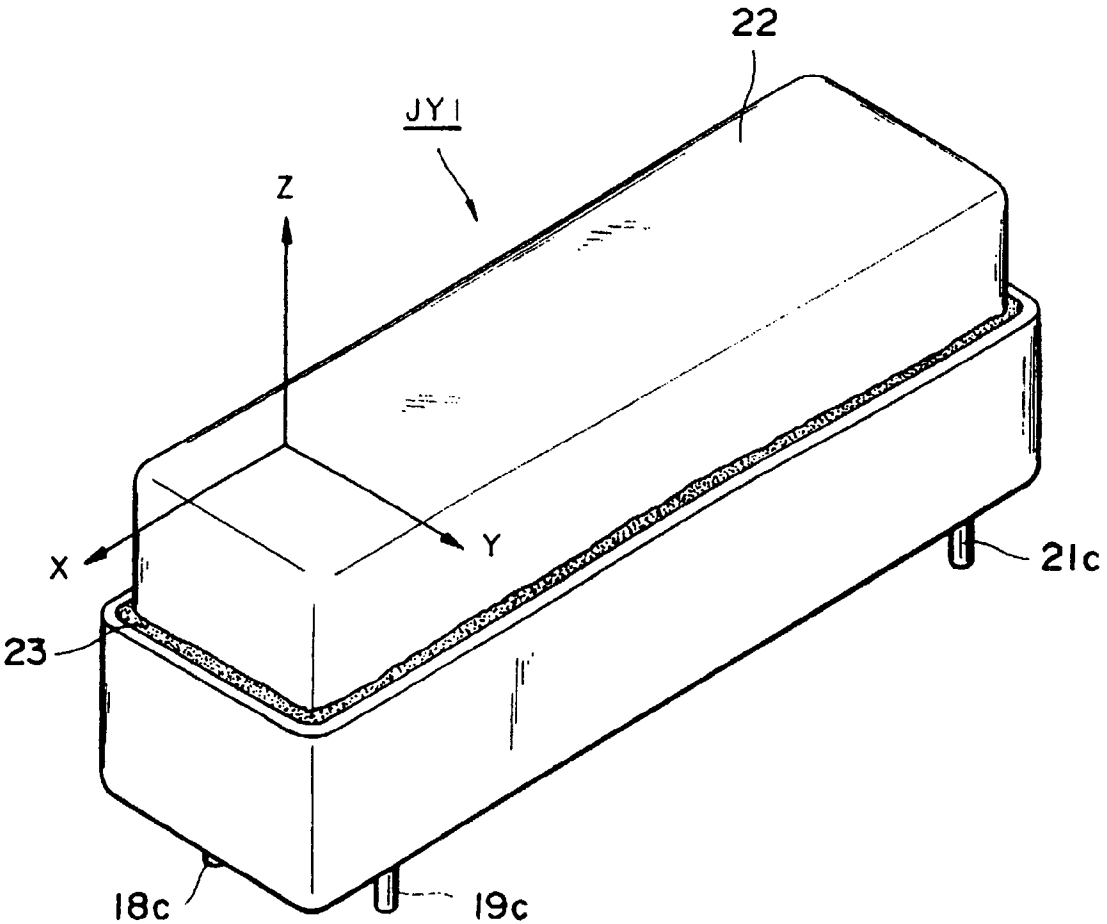
FIG. 3B is a perspective view of a piezoelectric angular velocity meter.

FIG. 3B shows a piezoelectric angular velocity meter. This element is obtained by mounting a cover (upper case) 22 on the upper surface of the element in FIG. 3A. The cover 22 is made of a metal. There is an adhesive (seal agent) layer 23 between the outer surface of the opening edge portion of the cover 22 and the inner surface of the opening edge portion of the lower housing. The airtightness in the case is maintained by the adhesive layer 23.

Figure 4A:
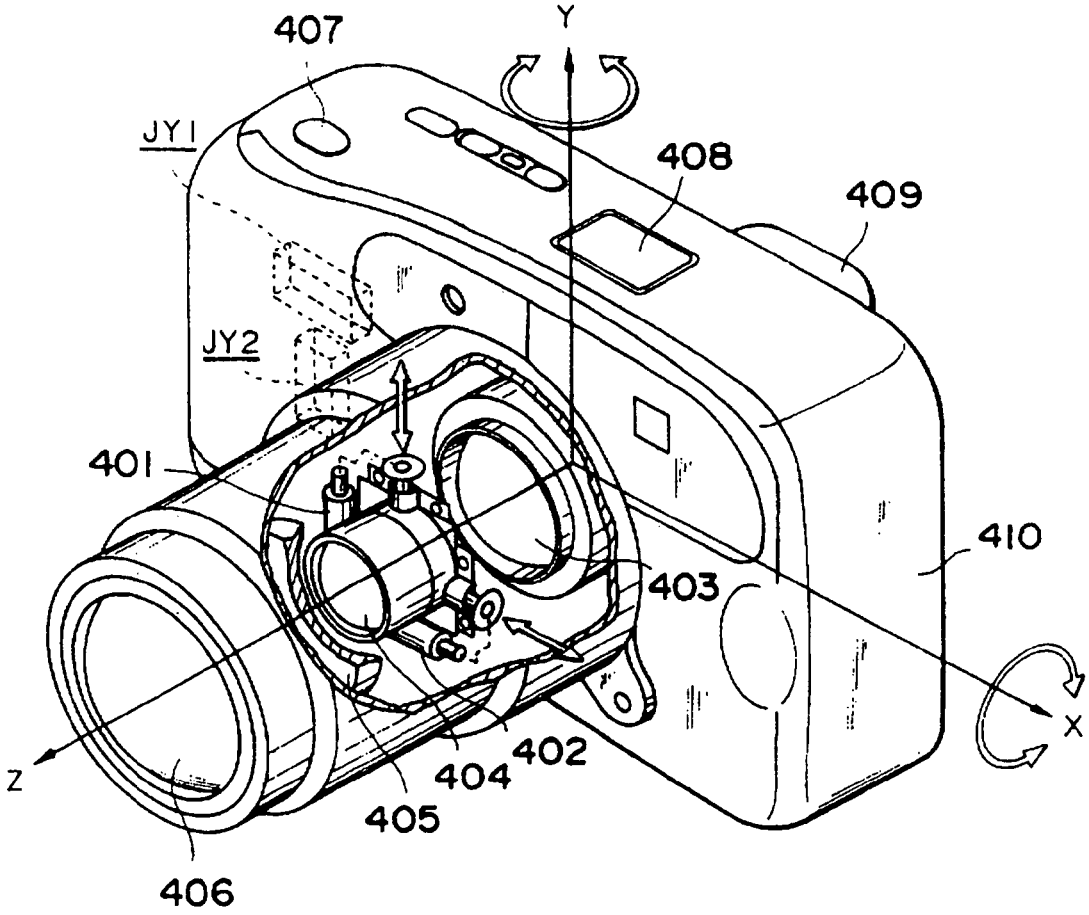
FIG. 4A is a perspective view of a camera using the piezoelectric angular velocity meter in FIG. 3B.

FIG. 4A shows a camera using a piezoelectric angular velocity meter (sensor) YJ1 in FIG. 3B.

This camera also includes a sensor JY2. The sensor JY2 has the same structure as that of the sensor JY1. The sensors JY1 and JY2 are arranged within the X-Y plane. The longitudinal directions of piezoelectric elements PED1 arranged in these sensors JY1 and JY2 are perpendicular to each other.

The optical axis of a lens of the camera is defined as the Z-axis. The X-axis, the Y-axis, and Z-axis in FIG. 4A are perpendicular to each other. This camera has a housing 410, in which the sensors JY1 and JY2 are arranged. The rotational angular velocity (pitching amount) of the camera which rotates about the X-axis is detected by the sensor JY1. The rotational angular velocity (pitching amount) of the camera which rotates about the Y-axis is detected by the sensor JY2.

This camera includes lenses 403, 404, 405, and 406. Image light passing through these lenses is focused on a film 411 arranged in the housing 410. The lens 404 is moved in the X direction by a coreless motor 401, and is moved in the Y direction by a coreless motor 402.

Figure 4B:
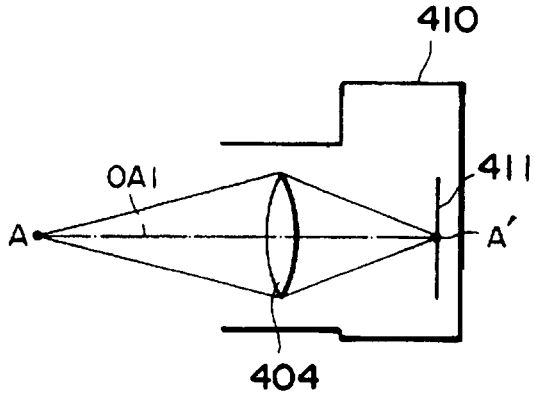
FIGS. 4B to 4D are views showing control of the lens of the camera.

While this camera is not rotated, an optical axis OA1 of the lens 404 extends through a center A' of the film 411. Light from an object A, therefore, passes through the center A' of the film 411 (see FIG. 4B).

Figure 4C:
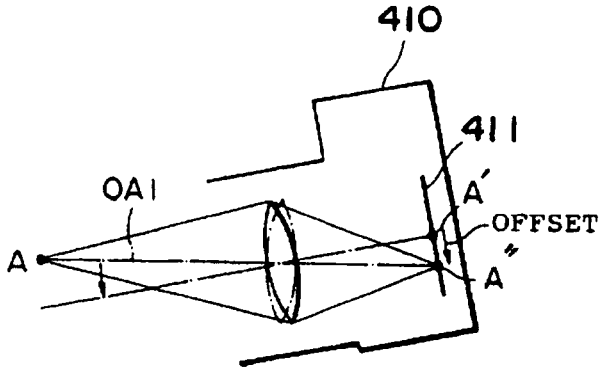

Let R (cm) be the distance from the X-Y plane (film surface) to the lens 404, and Ω (rad/sec) be the angular velocity detected by the sensor JY1. When the lens 404 is fixed to the housing 410 so as not to move, the lens 404 rotates about the X-axis at the angular velocity Ω (rad/sec), together with the camera (see FIG. 4C). At this time, the lens 404 is moved in the −Y direction at about a velocity R×Ω(cm/sec), together with the camera.

In this case, the focal point of light from the object A shifts from the point A' to a point A" on the film 411.

Figure 4D:
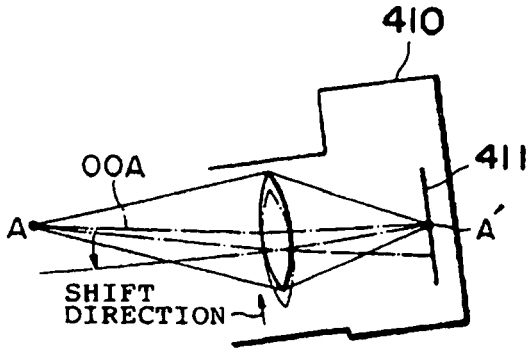

The camera of this embodiment includes a central processing unit 502. The central processing unit 502 controls the motor 401 to move the lens 404 in accordance with the angular velocity detected by the sensor JY1. When the angular velocity detected by the sensor JY1 is Ω (rad/sec), the lens 404 is moved in the +Y direction with respect to the housing 410 at about the velocity R×Ω (cm/sec) (see FIG. 4D). Even if, therefore, the camera rotates about the X-axis, an image of the object A does not move with respect to the film 411.

Similarly, when the lens 404 is fixed to the housing 410 so as not to move, and the camera rotates about the Y-axis at the angular velocity Ω (rad/sec), the lens 404 is moved in −X direction at about the velocity R×Ω (cm/sec).

The central processing unit 502 controls the motor 402 to move the lens 404 in accordance with the angular velocity detected by the sensor JY2. When the angular velocity detected by the sensor JY2 is Ω (rad/sec), the lens 404 is moved in the +X direction with respect to the housing 410 at about the velocity R×Ω (cm/sec) (see FIG. 4D). Even if, therefore, the camera rotates about the Y-axis, an image of the object A does not move with respect to the film 411.

Note that this camera, similar to a general camera, includes a release button (shutter button) 407, a liquid crystal display 408 for displaying an exposure value and the frame count of the film, and a finder 409.

The circuit unit 15 shown in FIG. 3B will be described next.

Figure 5:
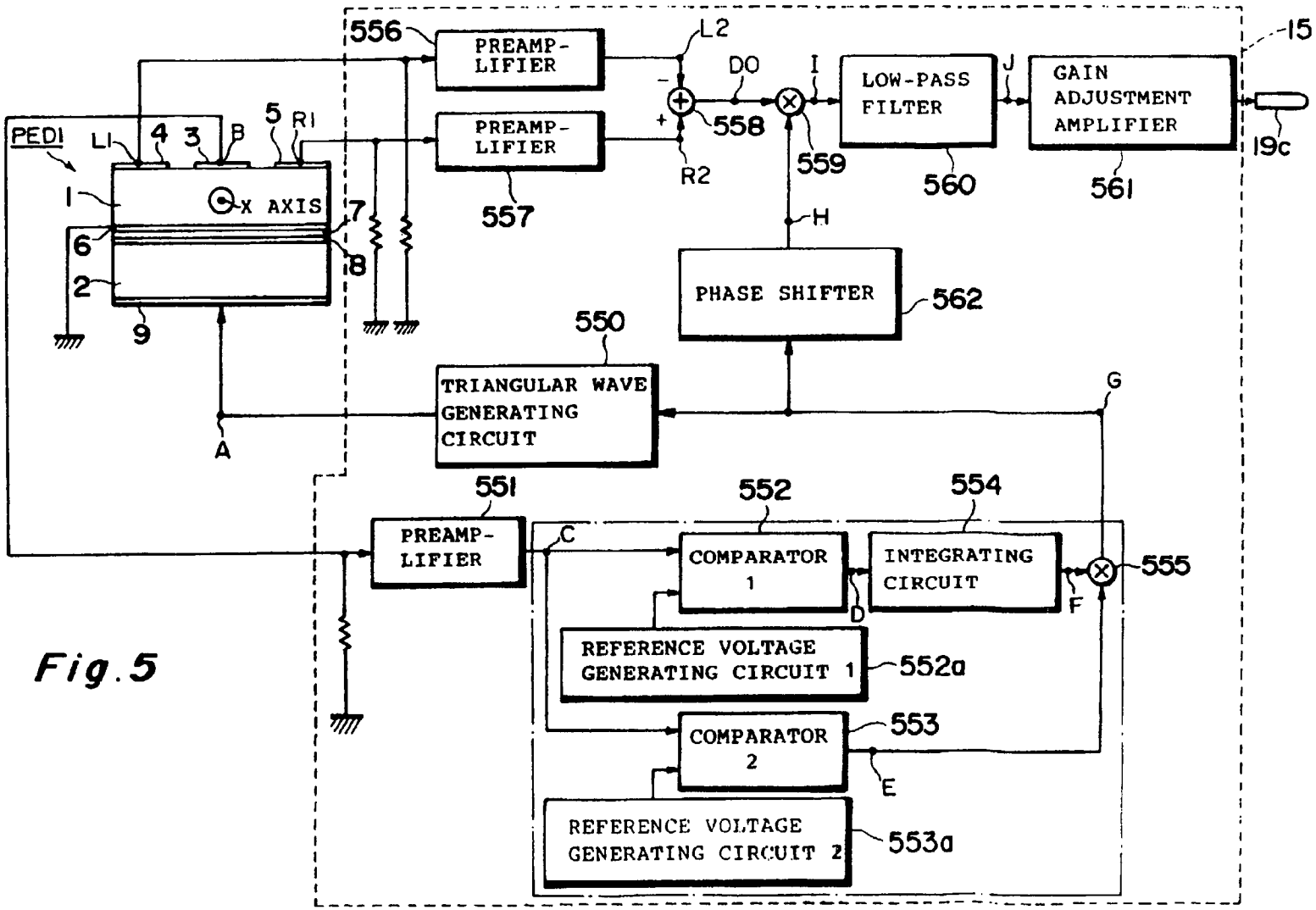
FIG. 5 is a block diagram showing a piezoelectric element and a circuit for driving it.
Figure 6A:
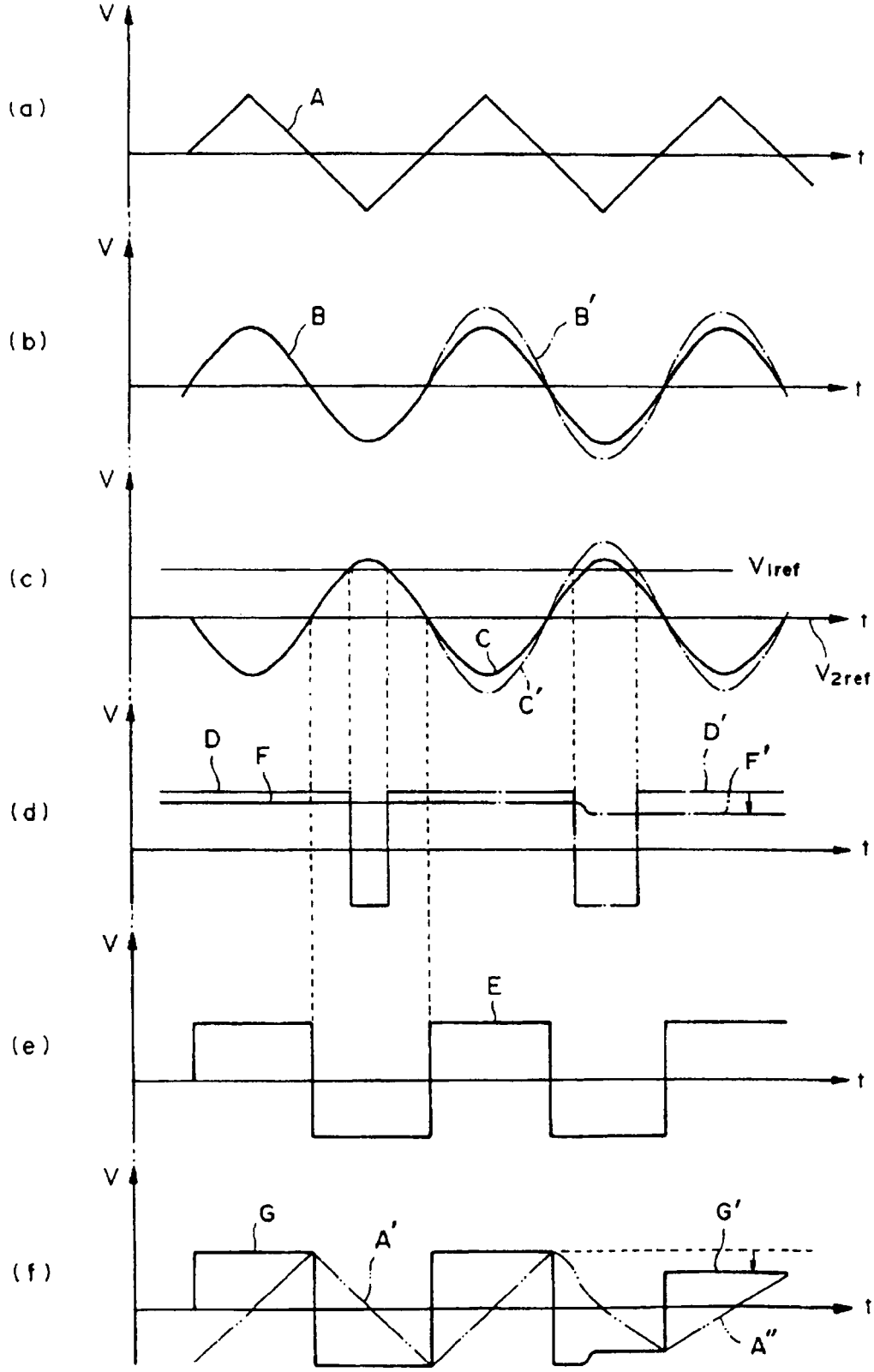
FIGS. 6A and 6B are timing charts for explaining the operation of the circuit in FIG. 5.
Figure 6B:
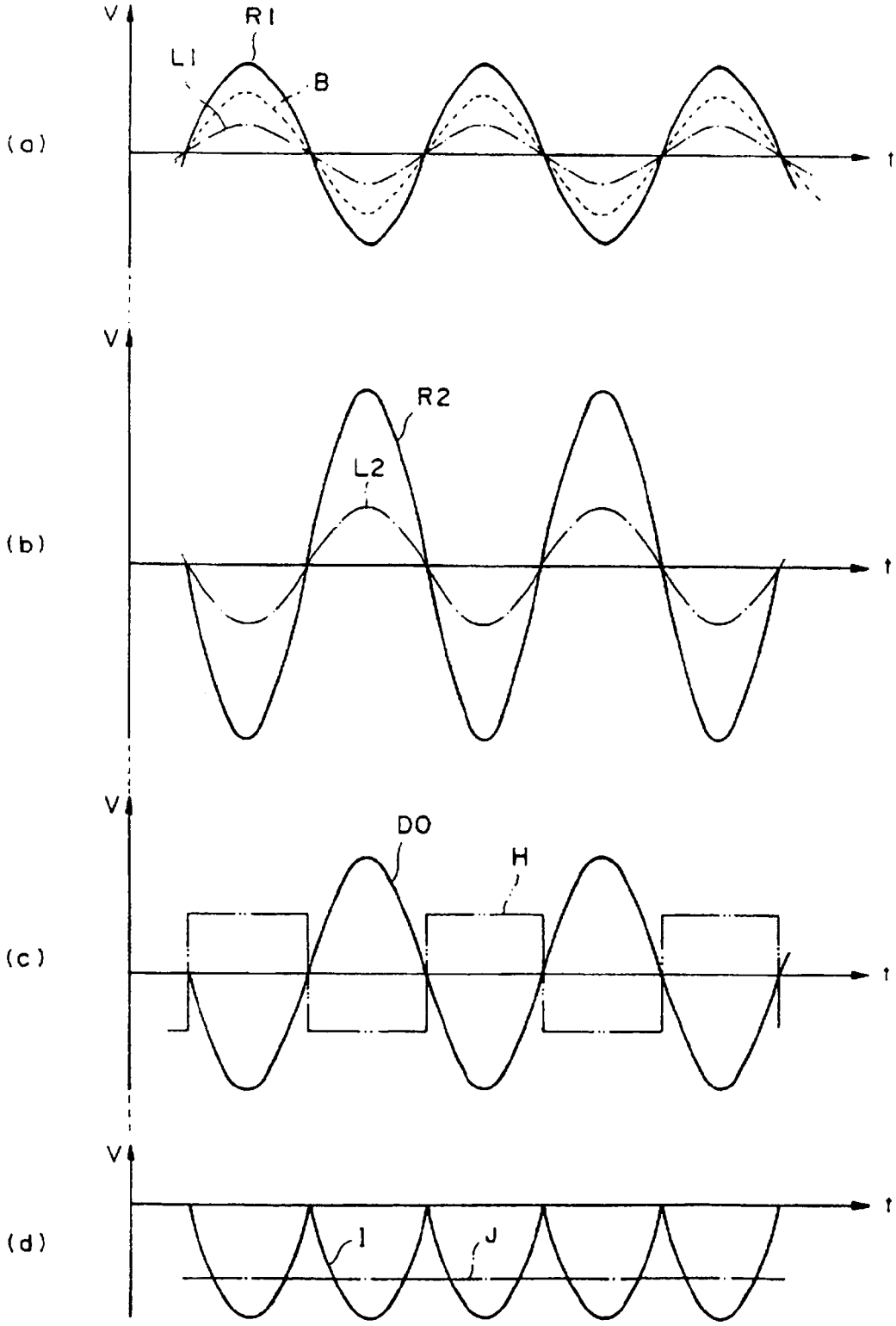

FIG. 5 is a block diagram showing the piezoelectric element in FIG. 1 and a circuit connected thereto. FIGS. 6A and 6B are timing charts for explaining the operation of the circuit in FIG. 5. Voltage waveforms A to J, R1, R2, L1, L2, and DO respectively correspond to the voltage waveforms at points A to J, R1, R2, L1, L2, and DO in FIG. 5. In addition, voltage waveforms A', A", B', C', D', F', and G' in FIGS. 6A and 6B respectively correspond to the voltage waveforms at points A, B, C, D, F, and G in FIG. 5.

An antivibration circuit for the piezoelectric element will be described first.

The second piezoelectric element is used to vibrate the first piezoelectric element. A triangular wave "A" generating circuit 550 applies a triangular wave voltage between the lower-surface electrode 9 of the second piezoelectric element and the ground electrode 6 (see FIG. 6A (a)). The frequency of the triangular wave is about 39 MHz. The frequency of the triangular wave matches the natural oscillation frequency of the piezoelectric element PED1.

When an AC voltage matching the natural oscillation frequency of the piezoelectric element PED1 is applied from the triangular wave generating circuit 550 to the second piezoelectric element, the second piezoelectric element vibrates. Since the first piezoelectric element is fixed to the second piezoelectric element, the first piezoelectric element also vibrates. When the first piezoelectric element vibrates, AC voltages are respectively induced between the ground electrode 6 and the three electrodes 3, 4, and 5 of the first piezoelectric element owing to the piezoelectric effect.

The middle electrode 3 of the first piezoelectric element is used to keep vibration constant. The voltage waveform between the middle electrode 3 and ground is indicated by "B" in FIG. 6A (b).

A preamplifier 551 is connected to the middle electrode 3. The preamplifier 551 inverts the phase of an input voltage signal and outputs the resultant signal. The waveform of the voltage output from the preamplifier 551 is indicated by "C" in FIG. 6A (c).

First and second comparators 552 and 553 are connected to the preamplifier 551.

The first comparator 552 receives both a signal from the preamplifier 551 and a signal from a first reference voltage generating circuit 552a. The level of the first reference voltage is represented by $V_1$ref. If a voltage signal output from the preamplifier 551 is higher than the level $V_1$ref, the first comparator 552 outputs a low-level voltage signal. If a voltage signal output from the preamplifier 551 is lower than the level $V_1$ref, the first comparator 552 outputs a high-level voltage signal. The waveform output of the voltage from the first comparator 552 is indicated by "D" in FIG. 6A (d).

An integrating circuit (level monitor) 554 is connected to the first comparator 552. The integrating circuit 554 integrates an input signal and outputs the resultant signal. A voltage signal output from the first comparator 552 is integrated by the integrating circuit 554, which than outputs a DC voltage F in FIG. 6A (d).

The second comparator 553 receives both a signal from the preamplifier 551 and a signal from a second reference voltage generating circuit 553a. The level of the second reference voltage is represented by $V_2$ref. If a voltage signal output from the preamplifier 551 is higher than the level $V_2$ref, the second comparator 553 outputs a low-level voltage signal. If a voltage signal output from the preamplifier 551 is lower than the level $V_2$ref, the second comparator 553 outputs a high-level voltage signal. The level $V_2$ref is lower than the level $V_1$ref. The level $V_2$ref crosses the operating point of an input AC voltage. The waveform of the voltage output from the second comparator 553 is indicated by "E" in FIG. 6A (e).

Both a voltage signal output from the second comparator 553 and a voltage signal output from the integrating circuit 554 are input to a multiplier (switch) 555. The multiplier 555 multiplies the output voltage from the second comparator 553 and the output voltage from the integrating circuit 554, and outputs the product. The multiplier 555 switches the output voltage from the integrating circuit 554 in synchronism with the output voltage from the second comparator 553. The output from the second comparator 553 is a square wave voltage, and the output from the integrating circuit 554 is a DC voltage. For this reason, the output from the multiplier 555 is a square wave voltage. The waveform of the voltage output from the multiplier 555 is indicated by "G" in FIG. 6A (f).

The triangular wave generating circuit 550 integrates the square wave voltage output from the multiplier 555, and outputs the resultant voltage. The voltage B detected by the middle electrode 3 delays in phase with respect to the voltage A' output from the triangular wave generating circuit 550 by 90°.

Since the piezoelectric element PED1 detects a strain corresponding to an angular velocity as a voltage, the amplitude of vibration may change. Assume that the amplitude of an AC voltage induced by the first piezoelectric element increases, as indicated by "B" and "B'" in FIG. 6A (b). In this case, the amplitude of the output voltage from the preamplifier 551 also increases, as indicated by "C'". Therefore, the time during which the voltage is higher than the level $V_1$ref is prolonged, and the pulse width of the square wave output from the first comparator 552 increases as indicated by "D'". As a result, the level of the DC voltage output from the integrating circuit 554 decreases. The amplitude of the square wave output from the multiplier 555 also decreases. Consequently, the amplitude of the triangular wave output from the triangular wave generating circuit 550 decreases.

As described above, if the amplitude of an AC voltage induced by the first piezoelectric element increases as indicated by "B'", this automatic level control circuit controls the triangular wave generating circuit 550 to decrease this amplitude. If the amplitude of the AC voltage induced by the first piezoelectric element decreases, the automatic level control circuit controls the triangular wave generating circuit 550 to increase this amplitude. The automatic level control circuit comprises the comparators 552 and 553, the integrating circuit 554, the multiplier 555, and the reference voltage generating circuits 552a and 553a.

A rotational angular velocity detection circuit will be described next.

Assume that while the piezoelectric element PED1 is vibrating along the Z-axis direction, the piezoelectric element PED1 rotates about the X-axis. In this case, a Coriolis force acts on the piezoelectric element PED1 in the Y-axis direction, and the piezoelectric element PED1 deflects in the Y-axis direction (lateral direction). At this time, an AC voltage L1 induced between the left electrode 4 and the ground electrode 6 is different in amplitude from an AC voltage R1 induced between the right electrode 5 and the ground electrode 6 (see FIG. 6B). Note that the waveform B in FIG. 6B (a) indicates the waveform of the voltage output from the left and right electrodes 4 and 5 when no Coriolis force acts on the piezoelectric element.

A preamplifier 556 is connected to the left electrode 4 of the first piezoelectric element. A preamplifier 557 is connected to the right electrode 5. The preamplifiers 556 and 557 invert the phases of input voltage signals and amplify them. The amplification factor is, for example, 2.2. The waveform of the voltage output from the preamplifier 556 indicated by "L2" in FIG. 6B (b). The waveform of the voltage output from the preamplifier 557 is indicated by "R2" in FIG. 6B (b).

The signals L2 and R2 output from the preamplifiers 556 and 557 are input to a differential amplifier 558. As shown in FIG. 6B (c), a voltage signal DO representing the difference between the voltage signals L2 and R2 is output from the differential amplifier 558. This difference signal DO corresponds to the Coriolis force acting on the piezoelectric element PED1, i.e., the rotational angular velocity of the piezoelectric element.

The signal output from the differential amplifier 558 is input to a multiplier 559. The multiplier 559 multiplies the voltage signal DO output from the multiplier 555 and a signal H output from the differential amplifier 558 and passing through a phase shifter 562, and outputs the resultant signal. The phase shifter 562 adjusts the phase of a signal G output from the multiplier 555 such that the differential output DO is synchronous with the output G.

As shown in FIG. 6B (d), a voltage signal I output from the multiplier 559 passes through a low-pass filter 560. A DC component J of the signal is output from the low-pass filter 560. The level of the DC voltage J corresponds to the Coriolis force acting on the piezoelectric element PED1, i.e., the rotational angular velocity of the piezoelectric element.

The DC voltage J is amplified by a gain adjustment amplifier 561 and is output from the output terminal 19c.

As described above, a signal corresponding to the angular velocity of rotation about the X-axis is output from the piezoelectric angular velocity meter JY1. The piezoelectric angular velocity meter JY2 has the same structure as that of the meter JY1. A signal corresponding to the angular velocity of rotation about the Y-axis is output from the angular velocity meter JY2.

Figure 7:
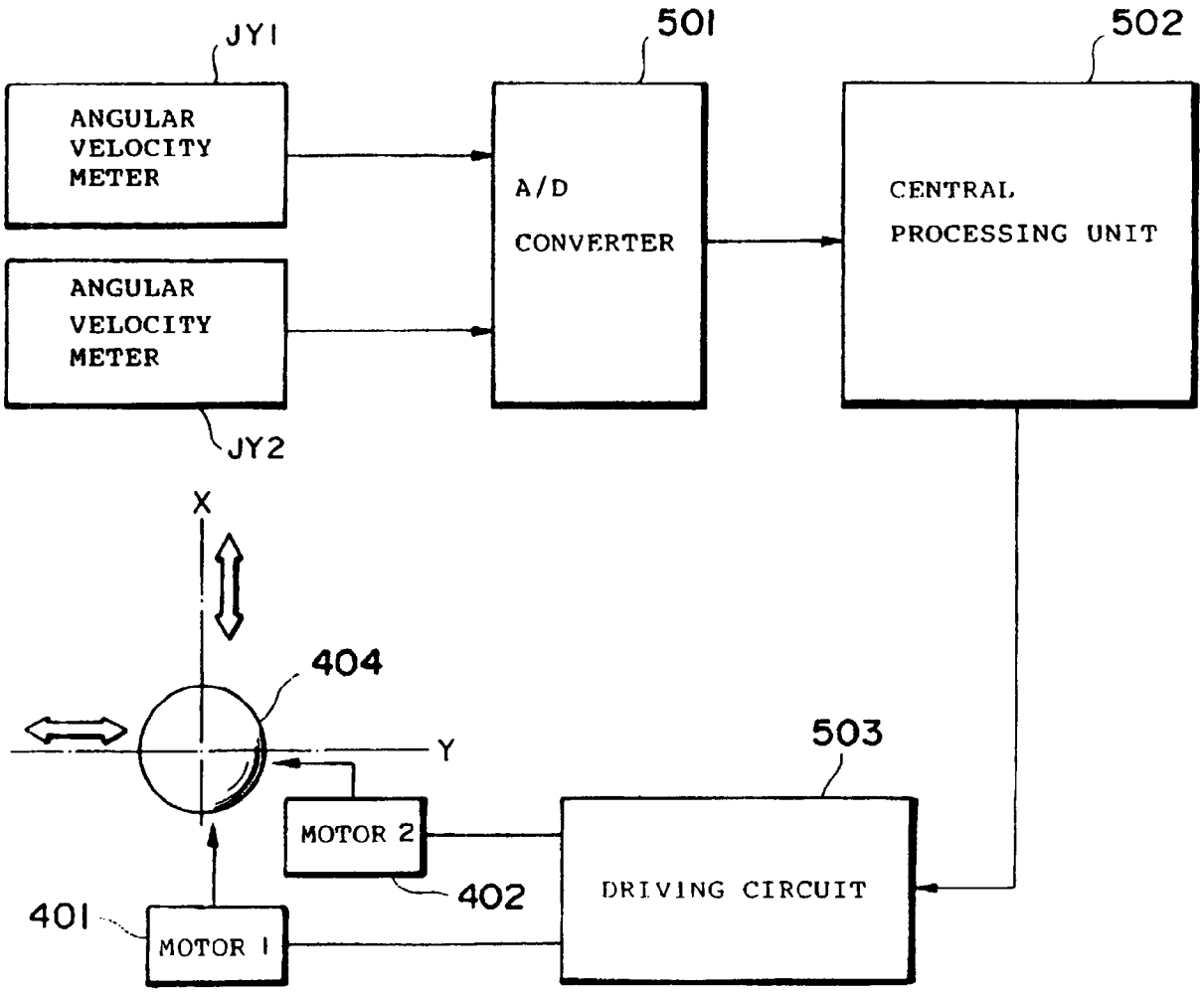
FIG. 7 is a block diagram showing a camera system for moving the lens in accordance with a signal output from the piezoelectric angular velocity meter.

FIG. 7 shows a camera system for moving a lens on the basis of signals output from the piezoelectric angular velocity meters.

The signals output from the angular velocity meters JY1 and JY2 are converted into digital signals by an A/D converter 501. Data output from the A/D converter 501 are input to the central processing unit (CPU) 502. The motors 401 and 402 are driven by a driving circuit 503. The central processing unit 502 controls the driving circuit 503 to rotate the motor 401. The method of controlling the lens 404 through the central processing unit 502 has been described with reference to FIGS. 4A to 4D.

Each piezoelectric angular velocity meter will be described in detail below.

When the above vibrator PED1 causes natural oscillation and rotates about the vibrator axis, a Coriolis force FC is generated in a direction perpendicular to the two directions. This force FC is given by:

$$Fc=2m\ (V\cdot\Omega) \tag{1}$$

where m is the mass of the vibrator, v is the vibration speed of the vibrator, and Ω is the rotational angular velocity.

In a conventional vibration angular velocity meter, problems are posed in manufacturing inexpensive, compact vibrators. More specifically, when the manufacturing process includes the process of joining piezoelectric ceramic plates to metal vibrators, piezoelectric ceramic plates must be joined to vibrator side surfaces one by one. This process needs much time, posing difficulty in realizing mass production. In the process, the workability deteriorates as the size of each vibrator decreases. When electrodes are to be formed on the side surface of cylindrical piezoelectric ceramic member, the electrodes must be formed on vibrators one by one by using a roll type printing machine. In addition, each vibrator must be polarized. Such a process is not suitable for mass production and a reduction in size either.

If electrodes are two-dimensionally formed on a ceramic plate consisting of a piezoelectric or electrostrictive material, compact vibrators can be manufactured in large quantities at once. In consideration of such a technique, there is provided a piezoelectric vibration angular velocity meter having a unimorph structure including a metal or ceramic base member in the form of a quadratic prism, a vibrator constituted by a piezoelectric or electrostrictive member in the form of a quadratic prism, an inner electrode formed between the base member and the piezoelectric or electrostrictive member, and an outer electrode formed on the side surface of the piezoelectric or electrostrictive member which is located on the opposite side to the inner electrode.

Note that the ceramic material includes a glass material, a sintered polycrystalline material, a synthetic single crystal, and the like.

Unimorph vibrators can be manufactured in large quantities by joining a piezoelectric or electrostrictive ceramic or plate having electrode patterns formed on both the surfaces to a metal or ceramic plate having the same size as that thereof, and cutting the resultant structure. In addition, if the electrode patterns are formed by lithography, and the joint plate is cut with a precision cutter, compact unimorph vibrators can be manufactured with good reproducibility.

Nonrestraint fundamental vibration of a unimorph vibrator is excited by using a so-called piezoelectric lateral effect by applying a voltage between an inner electrode as a ground electrode on a piezoelectric or electrostrictive member and the middle electrode of three divided outer electrodes. The vibration, therefore, is caused in a direction perpendicular to the electrode surface. When the vibrator rotates about the axis of the vibrator, the vibrator is bent within the electrode surface owing to the Coriolis force. This bending due to the Coriolis force is detected by the two detection electrodes of the three divided outer electrodes which are located on both sides.

At this time, since piezoelectric signals are generated in the Coriolis force detection electrodes upon driving of the vibrator, actual signals are signals obtained by synthesizing signals originating from the Coriolis force and signals originating from the driving of the vibrator. The signals generated in the two detection electrodes have the same frequency, are opposite in phase with respect to the Coriolis force, and are in phase with respect to the driving operation. If, therefore, differential voltages between the signals are obtained, only signals almost originating from the Coriolis force can be obtained.

Figure 8A:
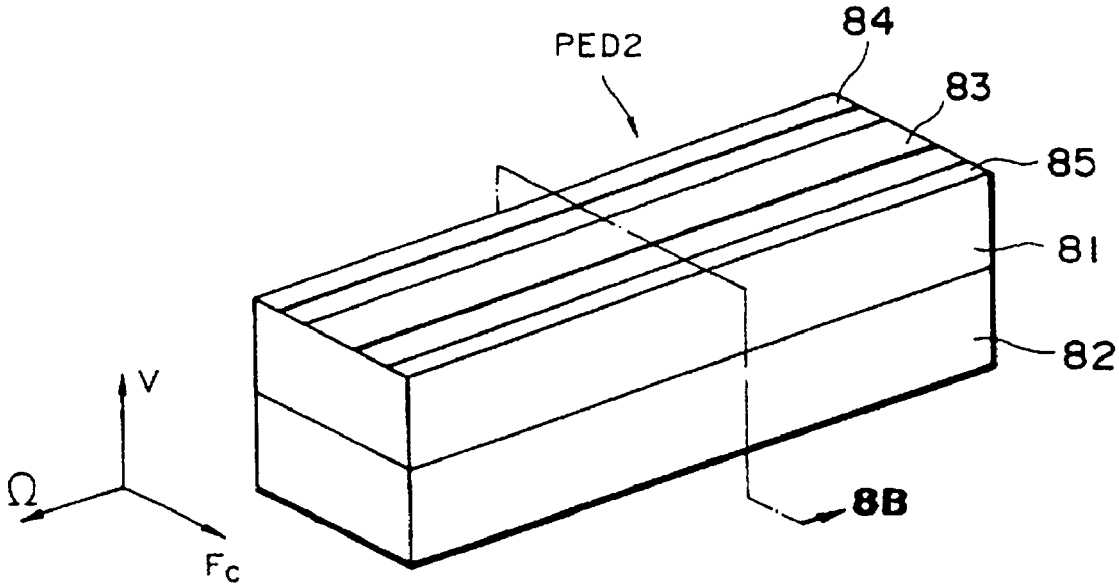
FIG. 8A is a perspective view of the piezoelectric element in FIG. 1.
Figure 8B:
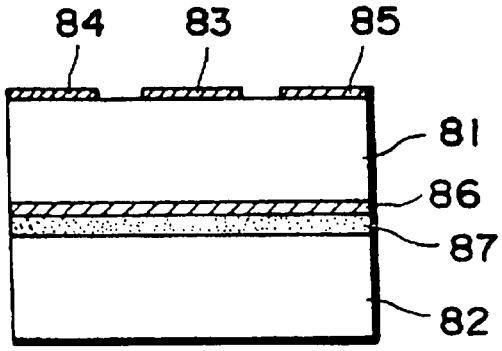
FIG. 8B is a sectional view taken along the direction indicated by an arrow Z in FIG. 8A illustrating the piezoelectric element.

FIGS. 8A and 8B show a vibration angular velocity meter PED2 of the second embodiment. A rectangular parallellepiped member 81 consists of a piezoelectric material. Electrodes 83, 84, 85, and 86 formed on the two opposite surfaces of the upper member 81. The upper member is joined to a lower rectangular parallellepiped member 82 consisting of a silica glass material with an adhesive layer 87 such that the electrode 86 serving as an inner electrodes becomes a joint surface. The electrodes 83, 84, and 85 on the piezoelectric member 81, i.e., the upper surface of the vibrator, are isolated from each other to be symmetrical about the central axis of the vibrator. The middle electrode 83 is used for a driving operation, and the electrodes 84 and 85 on both sides are used for detection. The inner electrode 86 serving as a ground electrode is formed on the entire surface without being divided. The piezoelectric member 81 is polarized in the direction of thickness. A cross-section of the vibrator which is perpendicular to the direction of a vibrator axis Ω is almost square to match the resonance frequency in the direction of a velocity V of the direction of thickness with the resonance frequency in the direction of the Coriolis force Fc.

Figure 9A:
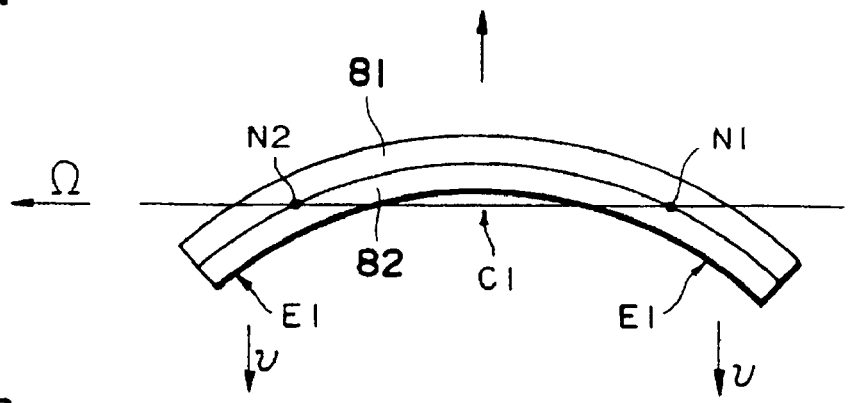
FIGS. 9A to 9C are views for explaining the operation of the piezoelectric element.
Figure 9B:
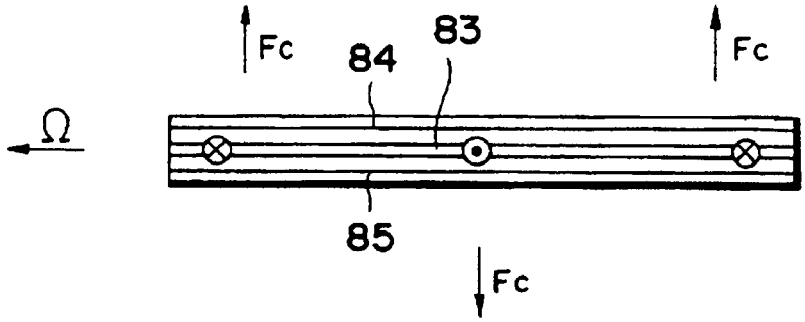
Figure 9C:
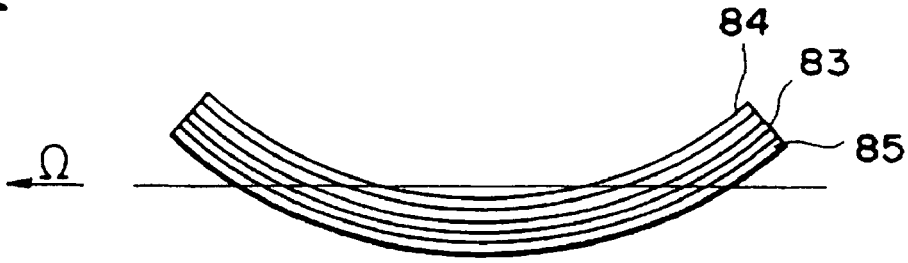

FIGS. 9A to 9C show the operation principle of the piezoelectric vibration angular velocity meter in FIG. 8A. The vibrator in FIG. 8A vibrates under a nonrestraint condition, and the central portion between nodes N1 and N2 of the vibration and the end portions have velocities in opposite directions (see FIG. 9A). When the vibrator rotates about the vibrator axis C1, Coriolis forces Fc are exerted on a central portion Ω, between the nodes N1 and N2 of the vibration and end portions E1 and E2 in the opposite directions (see FIG. 9B). With these forces Fc, the vibrator is bent in a direction within the electrode surface (within a plane perpendicular to the direction of thickness) (see FIG. 9C). In the two detection electrodes 84 and 85 on both sides, piezoelectric signals originating from the driving/vibration shown in FIG. 19A and piezoelectric signals originating from the deformation due to the Coriolis forces in FIG. 9C are generated at the same time. Of these signals, the piezoelectric signals originating from the Coriolis forces are almost opposite in phase between the two electrodes 84 and 85. This is because in, for example, the deformed state in FIG. 9C, a compression stress acts on the electrode 84 side and, and a tensile stress acts on the electrode 85 side. That is, stresses acting on the two electrodes 84 and 85 always have opposite signs. In contrast to this, the piezoelectric signals originating from the driving operation and generated in the two electrodes 84 and 85 are almost identical. If, therefore, differential signals between the piezoelectric signals in the two electrodes 84 and 85 are obtained, only the piezoelectric signals almost originating from the Coriolis force can be obtained. Since the vibrator has a square cross-section to match the resonance frequency in the Coriolis force direction with the resonance frequency in the driving direction, if outputs from the detection electrodes 84 and 85 are fed back, the vibrator can be driven at a frequency near the resonance frequency by a simple oscillation circuit. Therefore, the vibration based on the Coriolis force is also set in a resonant state to improve the detection sensitivity.

The vibrator, however, need not be designed such that the resonance in the driving direction matches the resonance frequency in the Coriolis force direction. For example, even if a resonant state is not set in a driving operation, unimorph vibration with a large displacement can be used, and resonance in the Coriolis force direction can be used only for detection. For this purpose, the vibrator my be subjected to unimorph driving at the resonance frequency in the Coriolis force direction. With such a vibrator, the resonance matching step can be omitted.

Figure 9D:
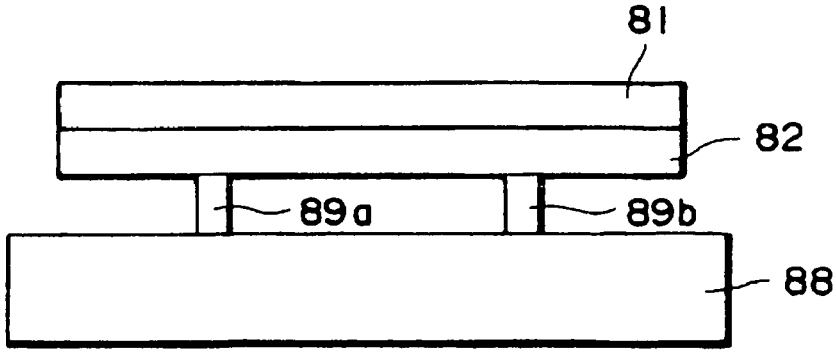
FIG. 9D is a sectional view showing the piezoelectric element fixed to a substrate via support members.

FIG. 9D shows a method of supporting the vibrator to realize the nonrestraint vibration condition of the vibrator in FIG. 8A. Support portions 89a and 89b are fixed to the plate 82 at positions corresponding to the nodes N1 and N2 of vibration with an adhesive, and the support portions 89a and 89b are fixed to a support base 88 with a silicone-based adhesive. The overall vibrator may be simply embedded in an adhesive having a relatively low elastic constant.

Figure 10A:
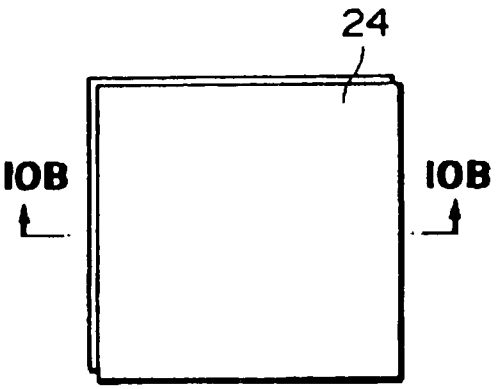
FIG. 10A is a plan view of a piezoelectric element.
Figure 10B:
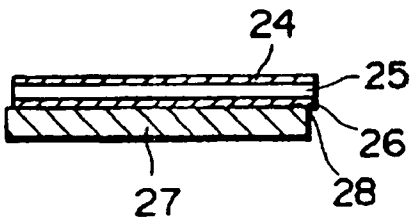
FIG. 10B is a sectional view taken along the direction indicated by arrows Z in FIG. 10A illustrating the element.
Figure 10C:
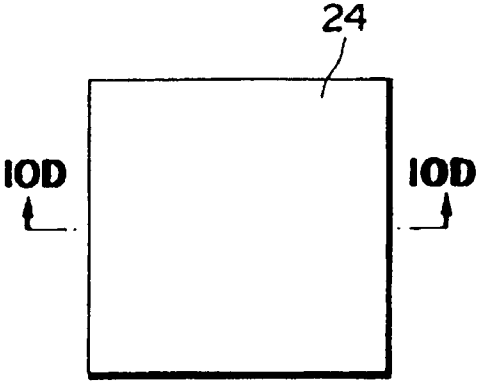
FIG. 10C is a plan view of a piezoelectric element.
Figure 10D:
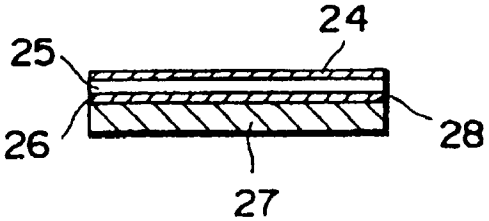
FIG. 10D is a sectional view taken along the direction indicated by arrows Z in FIG. 10C illustrating the element.
Figure 10E:
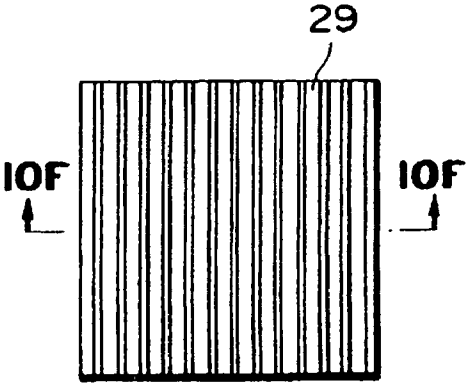
FIG. 10E is a plan view of a piezoelectric element.
Figure 10F:
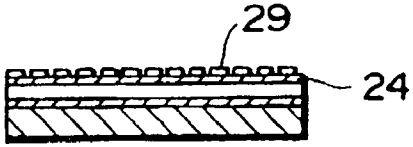
FIG. 10F is a sectional view taken along the direction indicated by arrows Z in FIG. 10E illustrating the element.
Figure 10K:
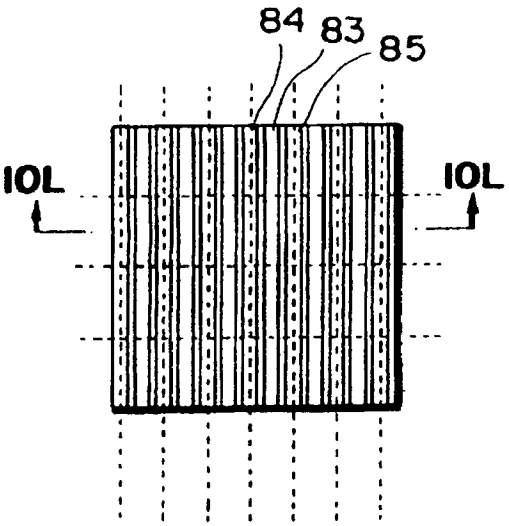
FIG. 10K is a plan view of a piezoelectric element.
Figure 10L:
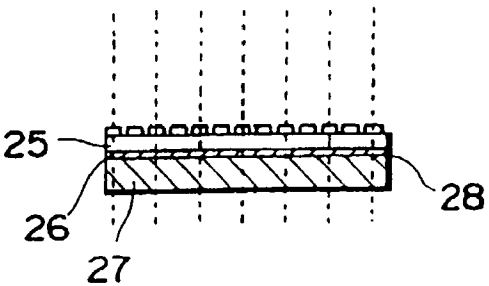
FIG. 10L is a sectional view taken along the direction indicated by arrows Z in FIG. 10K illustrating the element.
Figure 10I:
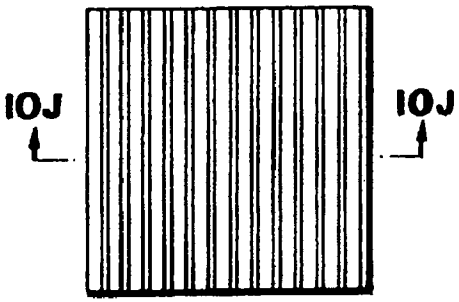
FIG. 10I is a plan view of a piezoelectric element.
Figure 10J:
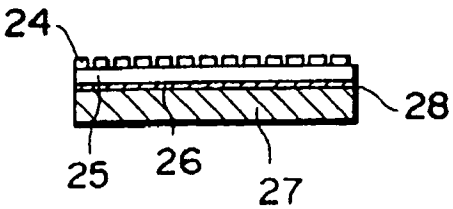
FIG. 10J is a sectional view taken along the direction indicated by arrows Z in FIG. 10I illustrating the element.
Figure 10G:
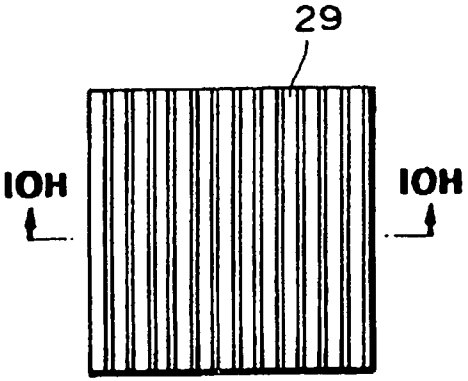
FIG. 10G is a plan view of a piezoelectric element.
Figure 10H:
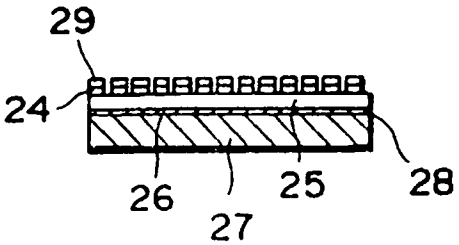
FIG. 10H is a sectional view taken along the direction indicated by arrows Z in FIG. 10G illustrating the element.

FIGS. 10A to 10L show a manufacturing process for the piezoelectric vibration angular velocity meter in FIG. 8A. A plate 25 made of a piezoelectric material polarized in the direction of thickness and having silver electrodes 24 and 26 on the upper and lower surfaces is joined to a silica glass plate 27 having a shape similar to the plate 25 with an epoxy-based adhesive layer 28 (see FIGS. 10A and 10B). In order to maintain high positioning precision in the subsequent steps, the peripheral portion of the joint plate is cut with a dicing saw to align the side surfaces of the two plates (FIGS. 10C and 10D). A photoresist film 29 is formed on the surface of one electrode 24, and a resist pattern corresponding to an electrode pattern having electrodes of the same width at equal intervals is formed by an exposure apparatus (FIGS. 10E and 10F). The exposed portions of the silver electrode 24 are removed by reactive ion etching using this resist 29 as a protective mask (FIGS. 10G and 10H). Thereafter, the resist 29 is removed (FIGS. 10G and 10J), and every other electrode of the remaining bar-like electrodes 24 is cut at its middle portion, thereby manufacturing a vibrator having a driving electrode 83 formed in the middle and detection electrodes formed on both sides thereof, which electrodes are symmetrical about the central axis of the vibrator (FIGS. 10K and 10L). According to this process, a large number of compact unimorph piezoelectric vibration angular velocity meters can be manufactured from one joint structure of a piezoelectric plate and a silica glass plate.

An inexpensive, compact piezoelectric vibration angular velocity meter similar to the one described above can be manufactured by using a metal plate as a member constituting a unimorph structure instead of a ceramic material such as silica glass. In this case, the metal member can be used as parts of electrodes and leads.

As described above, according to the present invention, inexpensive, compact vibration angular velocity meters can be provided in large quantities.

Figure 11:
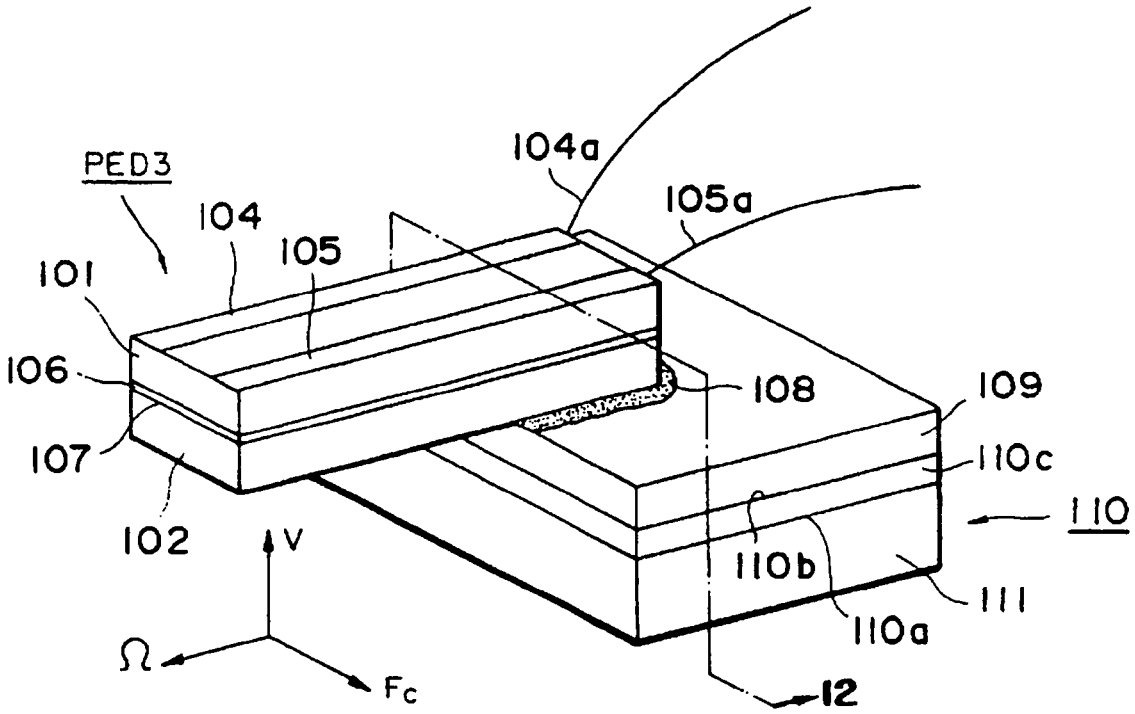
FIG. 11 is a perspective view of a unimorph piezoelectric element.
Figure 12:
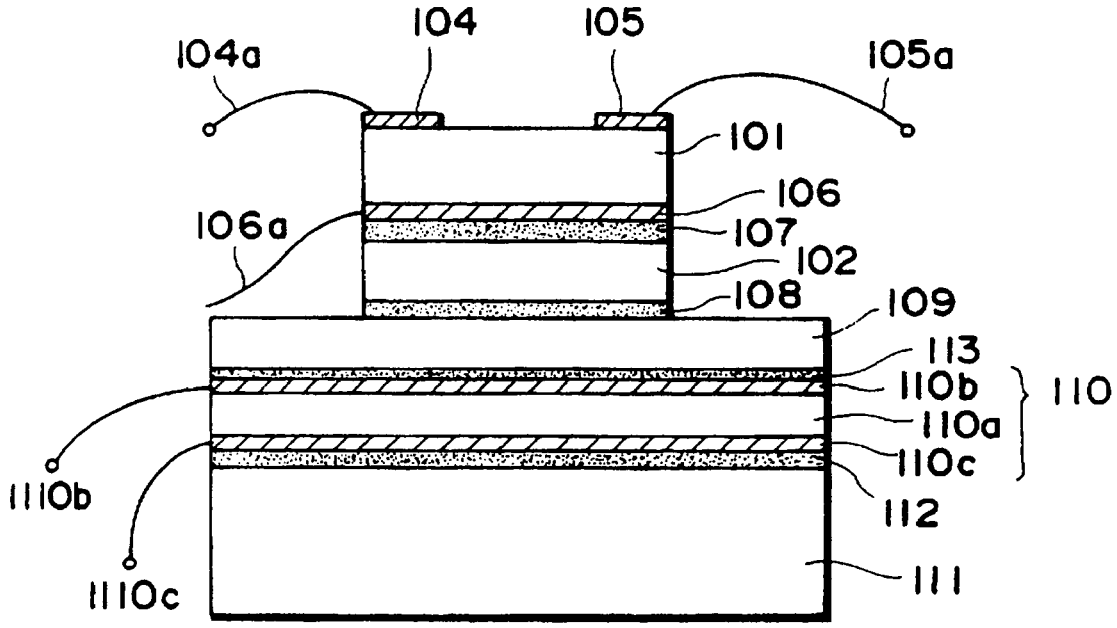
FIG. 12 is a longitudinal sectional view taken along the direction indicated by an arrow Z in FIG. 11 illustrating the piezoelectric element.

FIGS. 11 and 12 show a piezoelectric vibration angular velocity meter according to the third embodiment. A unimorph structure as a vibrator is manufactured by joining a piezoelectric member 101 to a metal member 102 whose thermal expansion coefficient is matched with that of the piezoelectric member 101. Two divided outer electrodes 104 and 105 are formed on a surface of the piezoelectric member 101, and an inner electrode 106 is formed entirely on the opposite surface of the inner electrode 106 to the surface on which the electrodes 104 and 105 are formed. The piezoelectric member 101 is polarized in a direction perpendicular to the electrode surface. The vibrator is joined on a metal plate 109. The metal plate 109 is joined to a plate 110 constituted by a piezoelectric member 110a having electrodes 110b and 110c formed on both surfaces. This plate 110 is fixed to a support base 111. The shape of the vibrator is designed such that the resonance frequencies of an element DEP3 in a normal direction (indicated by "V" in FIG. 11) with respect to the electrode surface become almost the same. Leads 104a and 105a extend from the divided electrodes 104 and 105 on the fixed end portion of the vibrator PED3 to connect the metal member 102 and the metal plate 109 of the vibrator to ground.

An AC voltage having a frequency near the resonance frequency of the fundamental cantilever natural oscillation of the uniform vibrator PED3 is applied to the piezoelectric plate 110 to cause resonant vibration of the vibrator. When the vibration is caused in the direction (indicated by "V" in FIG. 11) perpendicular to the electrode surface to cause rotation (indicated by "Ω" in FIG. 11) about the axis of the vibrator, the vibrator is bent within the electrode surface owing to the Coriolis force ("Fc" in FIG. 11). Owing to this force, a compression stress is generated on the right side (electrode 105 side) of the vibrator and a tensile force is generated on the left side (electrode 104 side) of the vibrator with respect to the central axis of the vibrator. At this time, piezoelectric signals originating from the Coriolis force, which are obtained from the two divided detection electrodes 104 and 105 because of the piezoelectric lateral effect, have opposite phases. In contrast to this, piezoelectric signals originating from the stresses upon driving of the vibrator and generated in the two divided electrodes are in phase. In general, since a signal generated by a driving operation is larger than a signal generated by a Coriolis force, it is difficult to read the Coriolis force from a signal obtained by synthesizing the two signals. For this reason, the difference between the signals obtained from the two divided electrodes is obtained, and the gain and phase are adjusted, thereby canceling out the piezoelectric signals generated by the driving operation. With this operation, only the signals generated by the Coriolis force can be extracted. Note that the respective members are fixed with adhesive layers 107, 108, 112, and 113. Lead lines 1110b and 1110c are respectively connected to the electrodes 110b and 110c.

Figure 13:
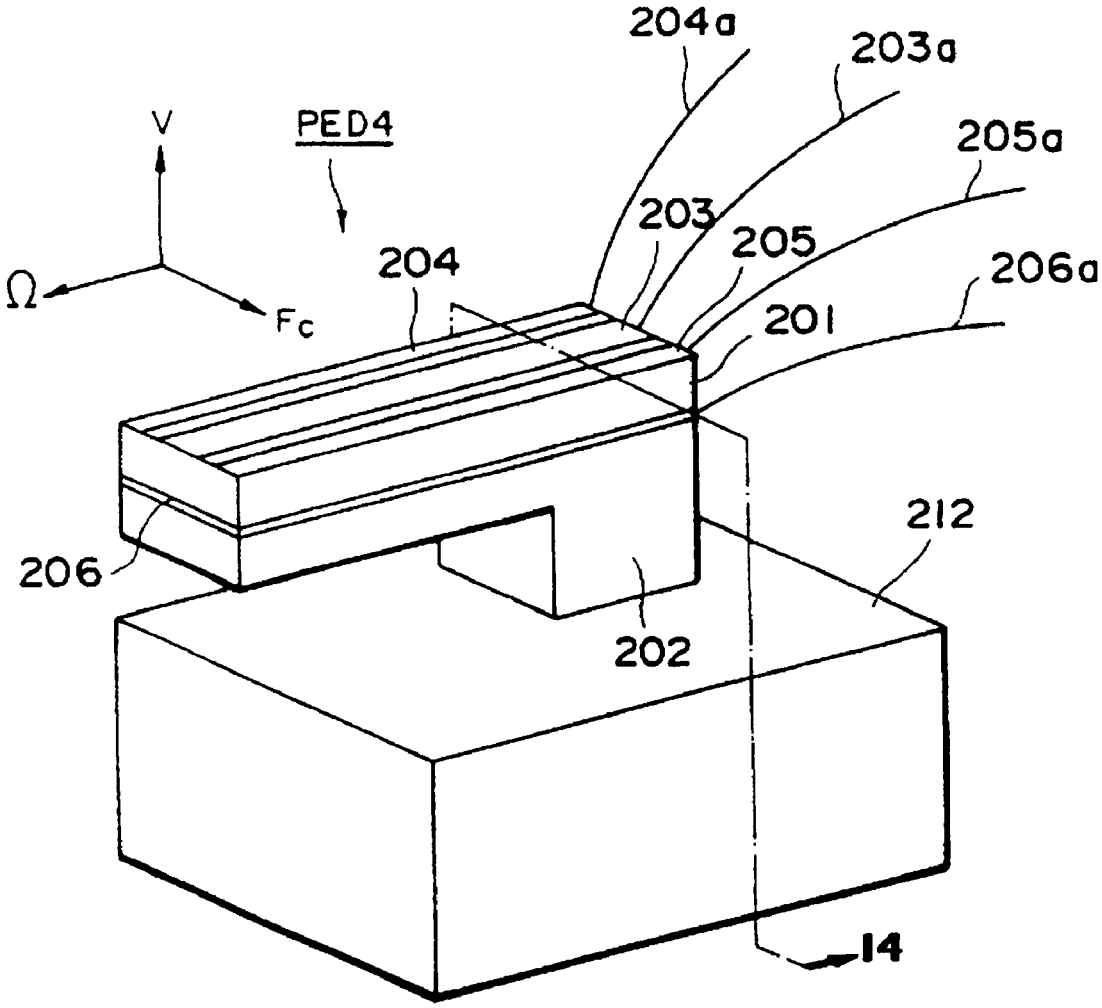
FIG. 13 is a perspective view of a unimorph piezoelectric element.
Figure 14:
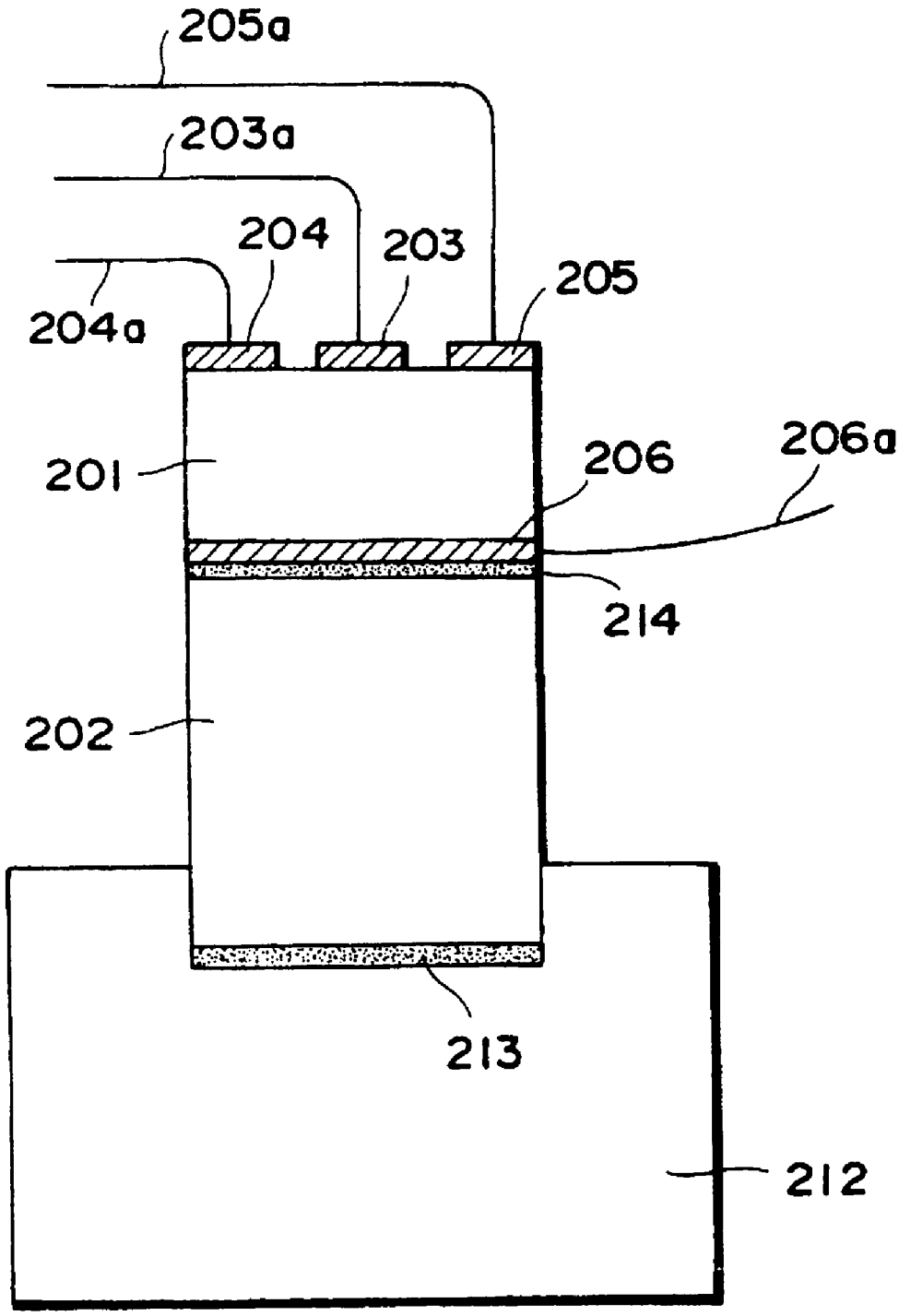
FIG. 14 is a longitudinal sectional view taken along the direction indicated by an arrow Z in FIG. 13 illustrating the piezoelectric element.

FIGS. 13 and 14 show a piezoelectric vibration angular velocity meter PED4 according to the fourth embodiment. Electrodes 203, 204, 205, and 206 are formed on the opposite surfaces of a piezoelectric member 201 constituting the vibrator. The three divided electrodes 203, 204, and 205 serving as outer electrodes are formed with reference to the central axis of the vibrator, and the inner electrode 206 is formed on the entire surface. Polarization is performed in a direction perpendicular to the electrode surface. This piezoelectric member 201 is joined to part of the vibrator made of a free-machining ceramic material and a prop 202 via the inner electrode 206 with an adhesive 214. The prop 202 is also embedded/fixed in/to a support base 212 made of a ceramic material with an adhesive layer 213. Leads 203a, 204a, and 205a respectively extend from the divided electrodes 203, 204, and 205 on the fixed end portion of the vibrator, and a lead 206a also extends from the inner electrode 206. The shape of the vibrator is designed such that the resonance frequency in the normal direction (indicated by "V" in FIG. 13) with respect to the electrode surface is almost equal to that in the Coriolis force direction (indicated by "F" in FIG. 13). The outer electrode 203 in the middle is used for a driving operation. When an AC voltage having a frequency near the resonance frequency of the fundamental natural oscillation of the unimorph vibrator is applied, resonant vibration in the normal direction (indicated by "V" in FIG. 13) with respect to the electrode surface is caused. At this time, when the vibrator rotates about the axis of the vibrator, the vibrator is bent within the electrode surface owing to the Coriolis force ("Fc" in FIG. 13). By obtaining the difference between piezoelectric signals generated in the two electrodes on both the sides of the middle electrode by stresses caused upon this bending, the Coriolis force can be detected by the same method as that described in the third embodiment.

If the vibrator is caused to vibrate under cantilever vibration conditions with one end of the vibrator being fixed, and the other end being set in a nonrestraint state, the vibrator can be easily fixed, and lead lines can be joined to electrode portions on the fixed portion which does not vibrate. Therefore, an almost ideal vibration state can be obtained. This device has a unimorph structure including a rectangular parallellepiped base member consisting of a metal or ceramic material, a vibrator constituted by a parallellepiped piezoelectric or electrostrictive member joined to the base member, an inner electrode formed between the base member and the piezoelectric or electrostrictive member, and outer electrodes on the opposite side surface of the piezoelectric or electrostrictive member to the inner electrode. One end of the vibrator is fixed.

Cantilever vibration allows the vibrator to be easily fixed, and also allows lead lines to be connected to the fixed portion which does not vibrate so that an ideal vibration state can be easily attained. The vibrator is preferably shaped into a quadratic prism, which allows easy formation of a unimorph structure and easy adjustment of the resonance frequency.

By vibrating the piezoelectric or electrostrictive element as an excitation means, fundamental cantilever vibration of the unimorph vibrator can be excited. Vibration is caused in a direction perpendicular to the electrode surface. When the vibrator rotates about the axis of the vibrator, the vibrator is bent within the electrode surface owing to the Coriolis force. Of the signals generated in the two divided outer electrodes, the signals originating from the Coriolis force have opposite phases between the two electrodes, and the signals originating from the driving operation are in phase. If, therefore, the differential signal between the two signals is obtained, only the signals almost originating from the Coriolis force can be obtained.

If three divided outer electrodes are formed on a piezoelectric or electrostrictive member constituting a unimorph structure, the middle electrode is used for excitation to excite fundamental cantilever natural oscillation. If the electrodes on both sides are used for detection, and the differential voltage between the two signals generated in the two electrodes is obtained, signals originating from the Coriolis force can be obtained.

According to the above method, a vibration angular velocity meter having an ideal vibration condition can be easily provided. In addition, inexpensive, compact vibrators can be manufactured in large quantities by forming an electrode pattern on a large ceramic plate by printing, photolithography, or the like, joining a metal or ceramic plate to the ceramic plate, and cutting the resultant structure.

Figure 15:
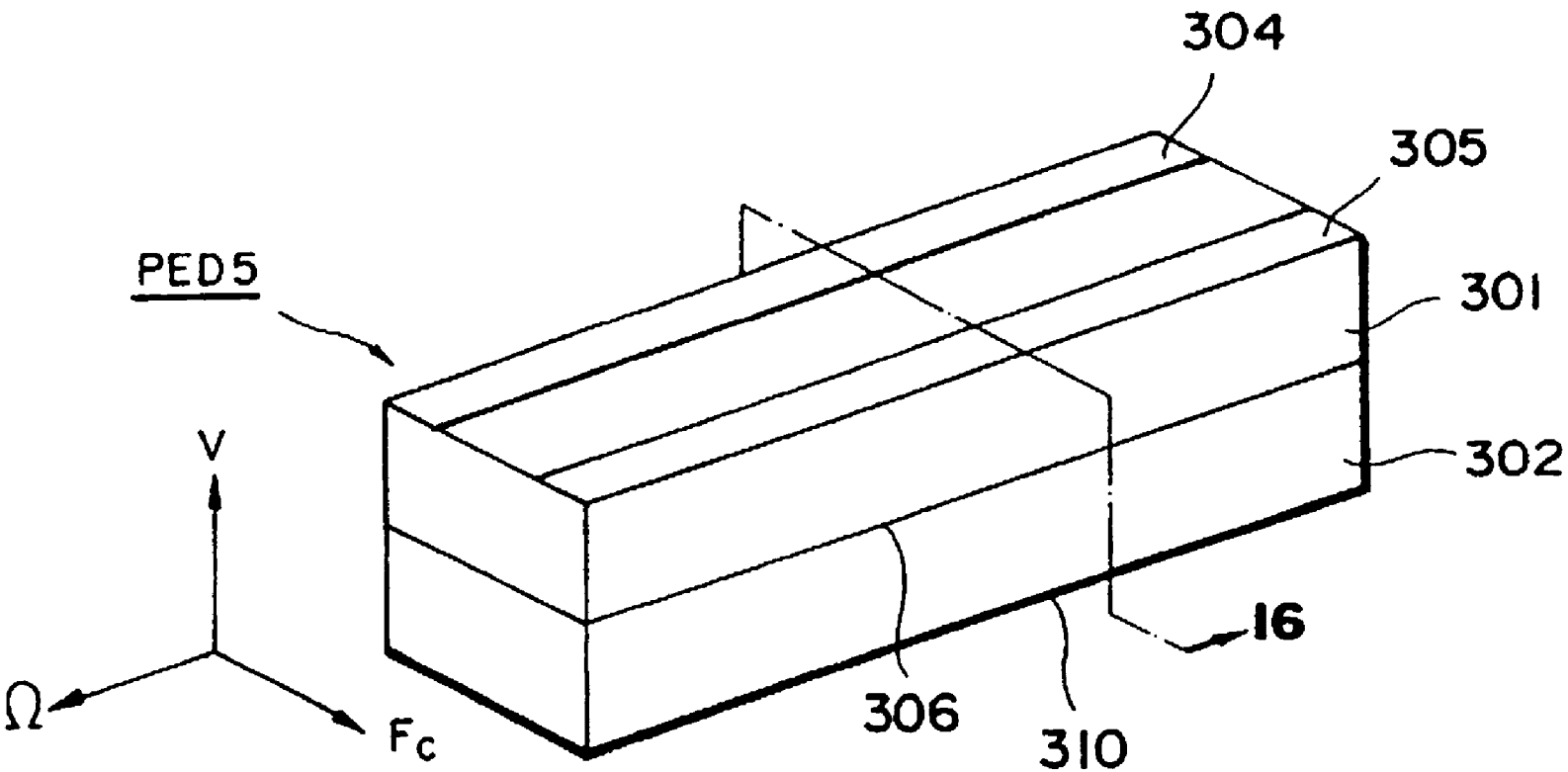
FIG. 15 is a perspective view of a bimorph piezoelectric element.
Figure 16:
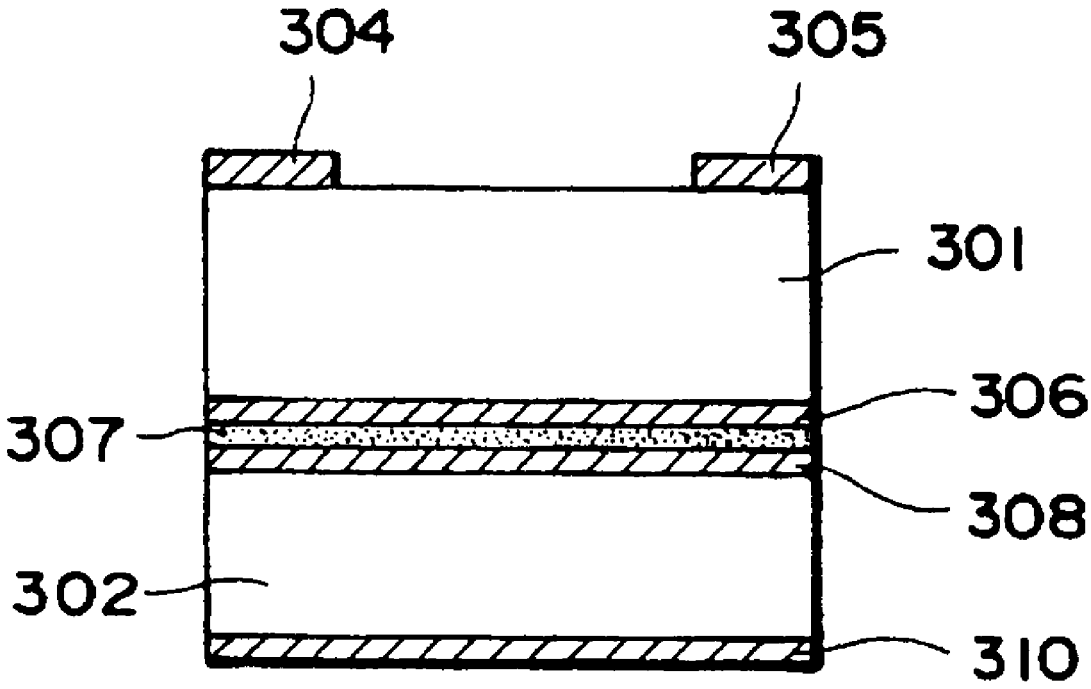
FIG. 16 is a longitudinal sectional view taken along the direction indicated by an arrow Z in FIG. 15 illustrating the piezoelectric element.

FIGS. 15 and 16 show a vibration angular velocity meter PED5 according to the fifth embodiment. Rectangular parallelepiped members 301 and 302 consisting of a piezoelectric material and having electrodes 304, 305, 306, 308, and 310 on the two opposite surfaces of each member are joined to each other by joining the electrode surfaces to each other. The piezoelectric member 301 serving as a detection member has the electrodes 304 and 305 isolated from each other on the upper surface of the vibrator to be symmetrical about the central axis of the vibrator. The piezoelectric member 302 serving as a detection member has both the electrodes 306 and 310 respectively formed on the entire surfaces. Both the piezoelectric members are polarized in a direction perpendicular to the electrodes. A cross-section of the vibrator in a direction perpendicular to the axis of the vibrator has almost a square shape to match the resonance frequency in the driving direction with the resonance frequency in the Coriolis force direction.

Figure 17A:
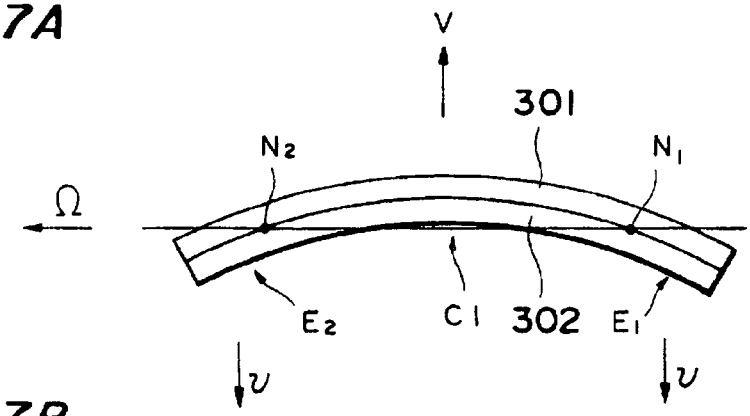
FIGS. 17A top 17C are views for explaining the operation of the piezoelectric element in FIG. 15.
Figure 17B:
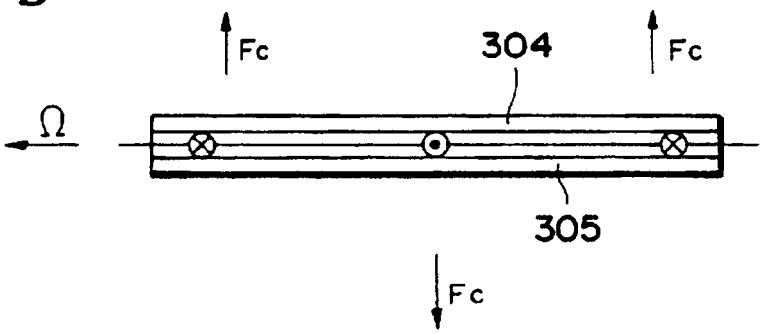
FIG. 17D is a sectional view showing the piezoelectric element fixed to a substrate via support members.
Figure 17C:
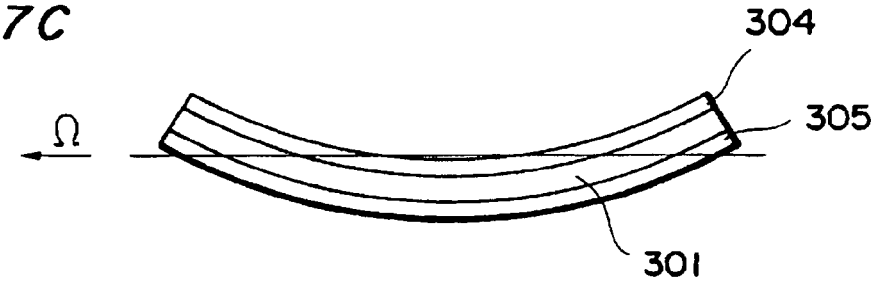

FIGS. 17A to 17C show the operation principle of the vibration angular velocity meter PED5 in FIG. 16. The vibrator vibrates under a nonrestraint condition, and a central portion C1 and end portions E1 and E2 of the vibrator have velocities in opposite directions with respect to nodes N1 and N2 of vibrator as boundaries (FIG. 17A). At this time, when the vibrator rotates about an axis Ω of the vibrator, since the central portion C1 and the end portions E1 and E2 have velocities in the opposite directions, Coriolis forces are generated in the opposite directions with respect to the nodes N1 and N2 of vibration as boundaries (FIG. 17B). Owing to these Coriolis forces, the vibrator is bent in a direction within the electrode surface (FIG. 17C). In the two divided detection electrodes 304 and 305, piezoelectric signals (FIG. 17C) originating from the driving operation (FIG. 17A), and piezoelectric signals originating from deformation caused by the Coriolis forces are generated at the same time. Of these signals, the piezoelectric signals originating from the Coriolis forces and generated in the two electrodes 304 and 305 have almost opposite phases. This is because, in the deformation state shown in FIG. 17C, for example, a compression stress acts on the electrode 304 side, and a tensile stress acts on the electrode 305 side, and stresses acting on the two electrodes always have opposite signs. In contrast to this, the piezoelectric signals originating from the driving operation and generated in the two electrodes 304 and 305 are almost in phase. Therefore, only the piezoelectric signals almost originating from the Coriolis forces can be obtained by obtaining differential signals from the two electrodes 304 and 305.

Figure 17D:
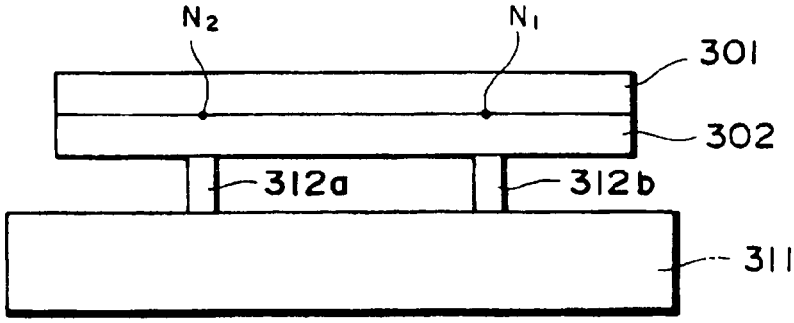

FIG. 17D shows a vibrator supporting method for realizing a nonrestraint condition for the vibrator PED5 in FIG. 16. Support members 312a and 312b are fixed to the member 302 at positions corresponding to the nodes N1 and N2 of vibration, and are fixed to a support base 311 with a silicone-based adhesive. The overall vibrator may be simply embedded in an adhesive having a relatively low elastic constant.

Figure 18A:
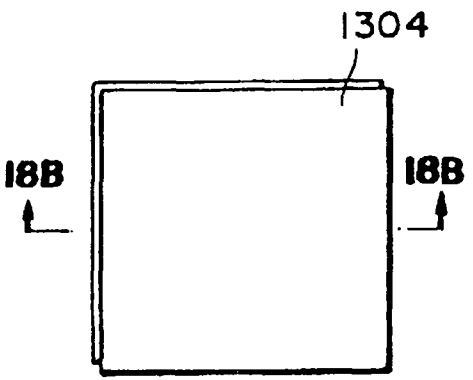
FIG. 18A is a plan view of a piezoelectric element.
Figure 18B:
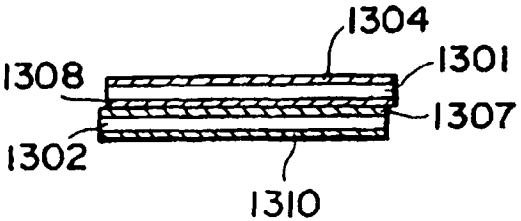
FIG. 18B is a sectional view taken along the direction indicated by arrows Z in FIG. 18A illustrating the element.

FIGS. 18A to 23B show a manufacturing process for the piezoelectric vibration angular velocity meter in FIG. 16. A first piezoelectric plate is constituted by a piezoelectric crystal plate 1301 and electrodes 1304 and 1306 formed on the upper and lower surfaces of the piezoelectric crystal plate 1301. A second piezoelectric plate is constituted by a piezoelectric crystal plate 1302 and electrodes 1308 and 1310 formed on the upper and lower surfaces of the piezoelectric crystal plate 1302. These plates are bonded to each other with an adhesive layer 1307 as of epoxy resin (FIGS. 18A and 18B). Note that the piezoelectric crystal plates 1301 and 1302 are polarized in the direction of thickness of the electrode 1304.

Figure 19A:
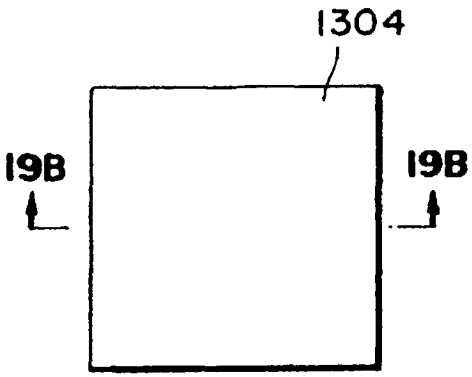
FIG. 19A is a plan view of a piezoelectric element.
Figure 19B:
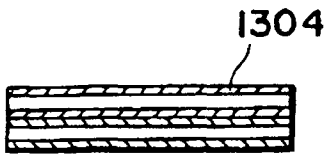
FIG. 19B is a sectional view taken along the direction indicated by arrows Z in FIG. 19A illustrating the element.

In order to maintain high positioning precision in the subsequent steps, the peripheral portion of the joint plate constituted by the these plates is cut in the direction of thickness with a dicing saw to align the side surfaces of the two plates (FIGS. 19A and 19B).

Figure 20A:
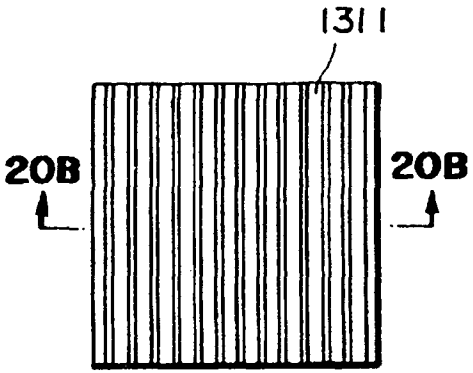
FIG. 20A is a plan view of a piezoelectric element.
Figure 20B:
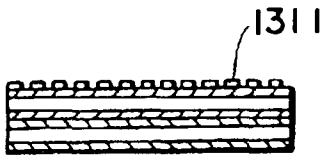
FIG. 20B is a sectional view taken along the direction indicated by arrows Z in FIG. 20A illustrating the element.

A photoresist 1311 is coated on the electrode 1304. Predetermined areas of the photoresist 1311 are exposed by using an exposure apparatus. The photoresist 1311 is exposed such that exposed areas having the same width are arranged at equal intervals. The non-exposed areas of the photoresist 1311 are etched to form a resist pattern corresponding to an electrode pattern (FIGS. 20A and 20B).

Figure 23A:
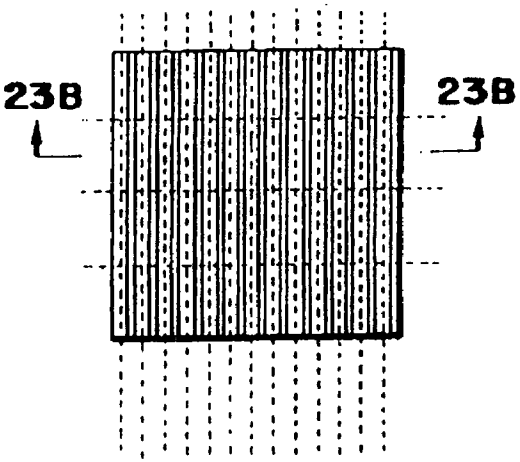
FIG. 23A is a plan view of a piezoelectric element.
Figure 23B:
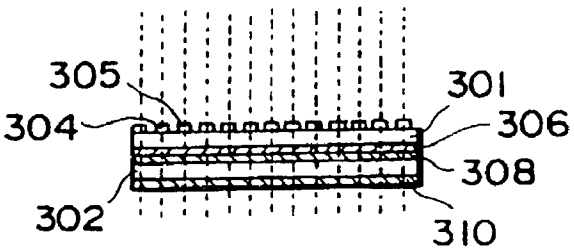
FIG. 23B is a sectional view taken along the direction indicated by arrows Z in FIG. 23A illustrating the element.
Figure 22A:
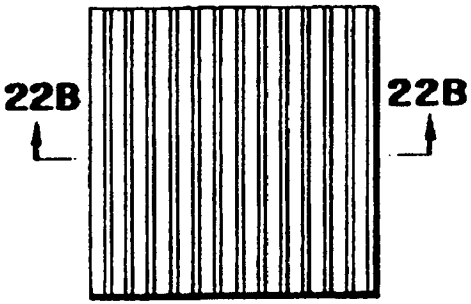
FIG. 22A is a plan view of a piezoelectric element.
Figure 22B:
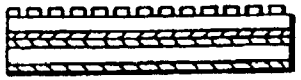
FIG. 22B is a sectional view taken along the direction indicated by arrows Z in FIG. 22A illustrating the element.
Figure 21A:
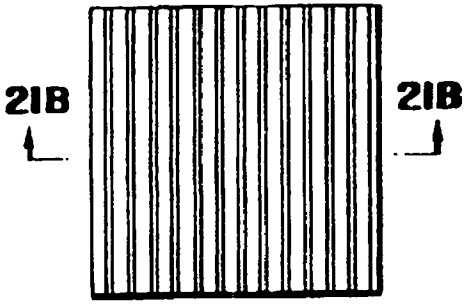
FIG. 21A is a plan view of a piezoelectric element.
Figure 21B:
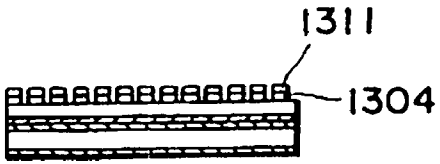
FIG. 21B is a sectional view taken along the direction indicated by arrows Z in FIG. 21A illustrating the element.

This resist 1311 is used as a protective mask. The exposed portions of the silver electrode 1304 are removed by using the reactive ion etching (RIE) method (FIGS. 21A and 21B). Thereafter, the resist 1311 is removed (FIGS. 22A and 22B). As a result, a plurality of strip-like silver electrodes 1304 are exposed. The joint plate is then cut along a direction perpendicular to the longitudinal direction of the strip-like silver electrodes 1304 with a dicing saw. In addition, the joint plate is cut along the central line in the longitudinal direction of the silver electrodes 1304 with the dicing saw (FIGS. 23A and 23B). As a result, the piezoelectric element shown in FIG. 15 is formed. According to this process, compact bimorph piezoelectric vibration angular velocity meters can be manufactured in large quantities from one pair of piezoelectric plates.

Figure 24:
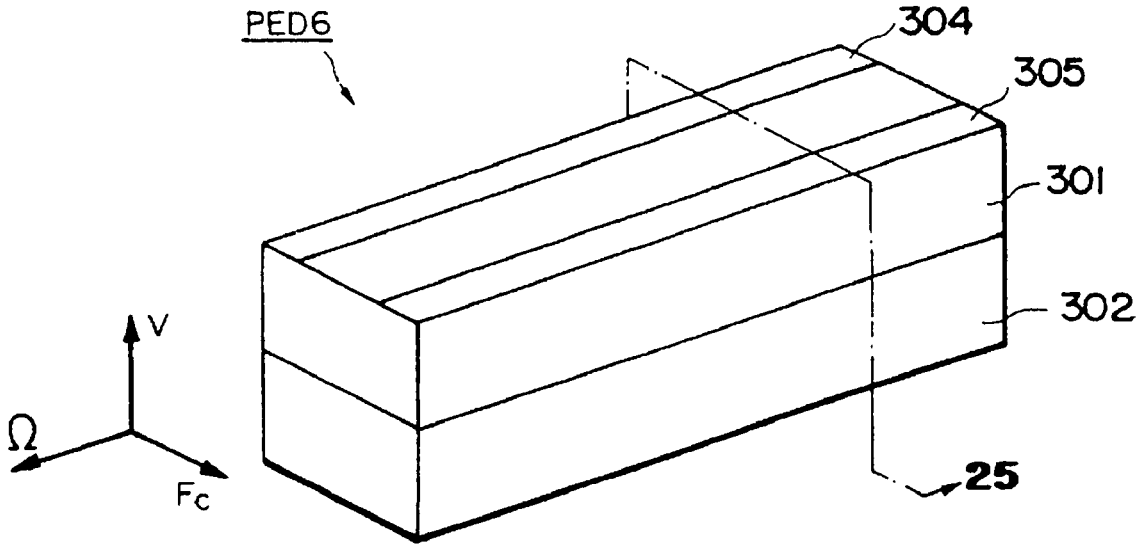
FIG. 24 is a perspective view of a piezoelectric element.
Figure 25:
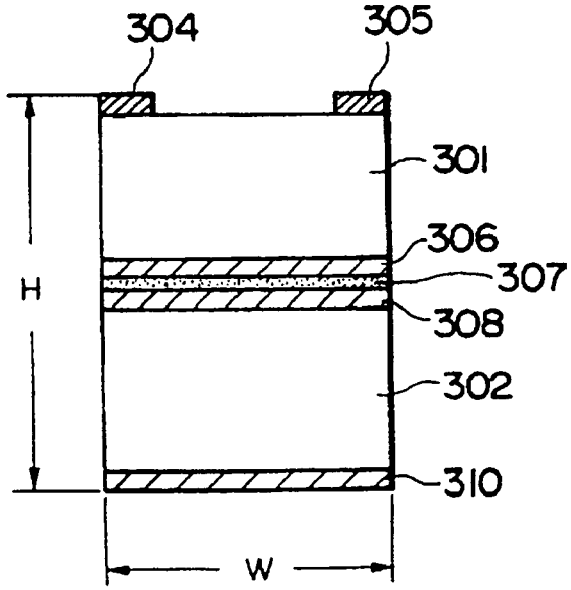
FIG. 25 is a longitudinal sectional view taken along the direction indicated by an arrow Z in FIG. 24 illustrating the piezoelectric element.

FIG. 24 shows a vibration angular velocity meter PED6 according to the sixth embodiment. This element basically has the same structure as that of the element shown in FIG. 15. A cross-section of the vibrator PED6 in a direction perpendicular to the longitudinal direction has a width W, in a direction along the surface of an electrode 304, which is smaller than a side height H in a direction perpendicular to the surface of the electrode 304. The driving and detection principles of this element are basically the same as those described with reference to FIGS. 17A to 17C. Since the width W in a Coriolis force direction Fc is smaller than the height H, the nonrestraint vibration fundamental resonance frequency in the Coriolis force direction Fc is lower than that in a driving direction V.

When an AC voltage having a frequency near the nonrestraint vibration fundamental resonance frequency in the Coriolis force direction is applied to a driving piezoelectric member 302 via driving elements 308 and 310, vibration is excited in the direction V. The vibration caused at this time causes no resonance because the frequency of the applied AC voltage is lower than the vibration fundamental basic resonance frequency. However, since the element PED6 has a bimorph structure, a sufficiently large amplitude can be obtained by applying a proper voltage. Detection outer electrodes 304 and 305 are separated from the central axis of the vibrator PED6 to maintain the balance of vibration and prevent coupling of vibration caused by the driving operation in the Coriolis force direction.

When the vibrator rotates about the axis of the vibrator PED6, Coriolis forces are generated. Since the frequency of an AC voltage used for a driving operation is equal to the vibration fundamental resonance frequency in the Coriolis force direction, a resonant state is set once the vibrator is bent by the Coriolis forces. As a result, an amplitude of a quality factor multiple (sever 10 to several 1,000 times) of vibration of a static amplitude obtained by piezoelectric strain can be obtained.

Coriolis force signals are detected by the divided electrodes. This detection principle is the same as that in the first embodiment.

If electrodes are two-dimensionally formed on a ceramic plate consisting of a piezoelectric or electrostrictive material, compact vibrators can be manufactured in large quantities at once. In consideration of such a technique, there is provided a piezoelectric vibration angular velocity meter comprising a vibrator having a bimorph structure constituted by a first member made of a piezoelectric or electrostrictive material in the form of a quadratic prism and a second member made of a piezoelectric or electrostrictive material in the form of a quadratic prism, an inner electrode formed between the first and second members, and outer electrodes formed on the opposite surfaces of the first and second members to the inner electrode.

Bimorph vibrators can be manufactured in large quantities at once by joining two piezoelectric or electrostrictive plates respectively having electrode patterns formed on upper and lower surfaces and having the same size, and cutting the resultant structure. In addition, if the electrode patterns are formed by reactive etching, and the joint ceramic plate is cut with a precision cutter, compact bimorph vibrators can be manufactured with good reproducibility.

Nonrestraint fundamental vibration of a bimorph vibrator is excited by using a so-called piezoelectric lateral effect by applying a voltage between an inner electrode in the bimorph shape as a ground electrode and the outer electrode on the driving piezoelectric or electrostrictive member. The vibration, therefore, is caused in a direction perpendicular to the electrode surface. When the vibrator rotates about the axis of the vibrator, the vibrator is bent within the electrode surface owing to the Coriolis forces. This bending due to the Coriolis forces is detected by the detection piezoelectric or electrostrictive member.

According to the above arrangement, since a piezoelectric signal is generated in the Coriolis force detection element upon driving of the vibrator, detection of the Coriolis forces imposes a heavy load on an electrical system in practice. For this reason, the outer electrode on the detection piezoelectric or electrostrictive member is divided into two electrodes with reference to the central line of the vibrator in the axial direction. Signals generated in the two electrodes have the same frequency and opposite phases with respect to the Coriolis forces and are in phase with respect to the driving operation. If, therefore, the differential voltages between these signals are obtained, only the signals almost originating from the Coriolis forces can be obtained.

If a cross-section of the vibrator is square, and the resonance frequencies in the Coriolis force direction and the driving direction can be matched with each other, the vibrator can be driven at a frequency near the resonance frequency with a simple oscillation circuit by feeding back outputs from the detection electrodes. Therefore, the vibration based on the Coriolis forces is set in a resonant state, and the detection sensitivity improves.

In order to omit the cumbersome process of matching resonance frequencies, the vibrator has a rectangular cross-section to intentionally shift the resonance frequencies in the two directions. With this operation, a bimorph driving operation which allows a large amplitude without driving the vibrator in a resonant state can be realized, and the frequency of the AC voltage for this driving operation is used as the resonance frequency of the fundamental vibration in the Coriolis force direction. In addition, if the vibrator is driven at a frequency higher than the fundamental resonance frequency in a bimorph driving operation, vibration cannot be stably caused because of, e.g., coupling with a high-order mode. For this reason, the vibrator has a rectangular cross-section shorter in the electrode surface direction than in the other direction.

As a method of fixing the vibrator, a method of fixing the vibrator at positions corresponding to the nodes of nonrestraint fundamental vibration is most simple and hence preferable.

According to the above method of the present invention, inexpensive, compact vibration angular velocity meters can be provided in large quantities.

Figure 26:
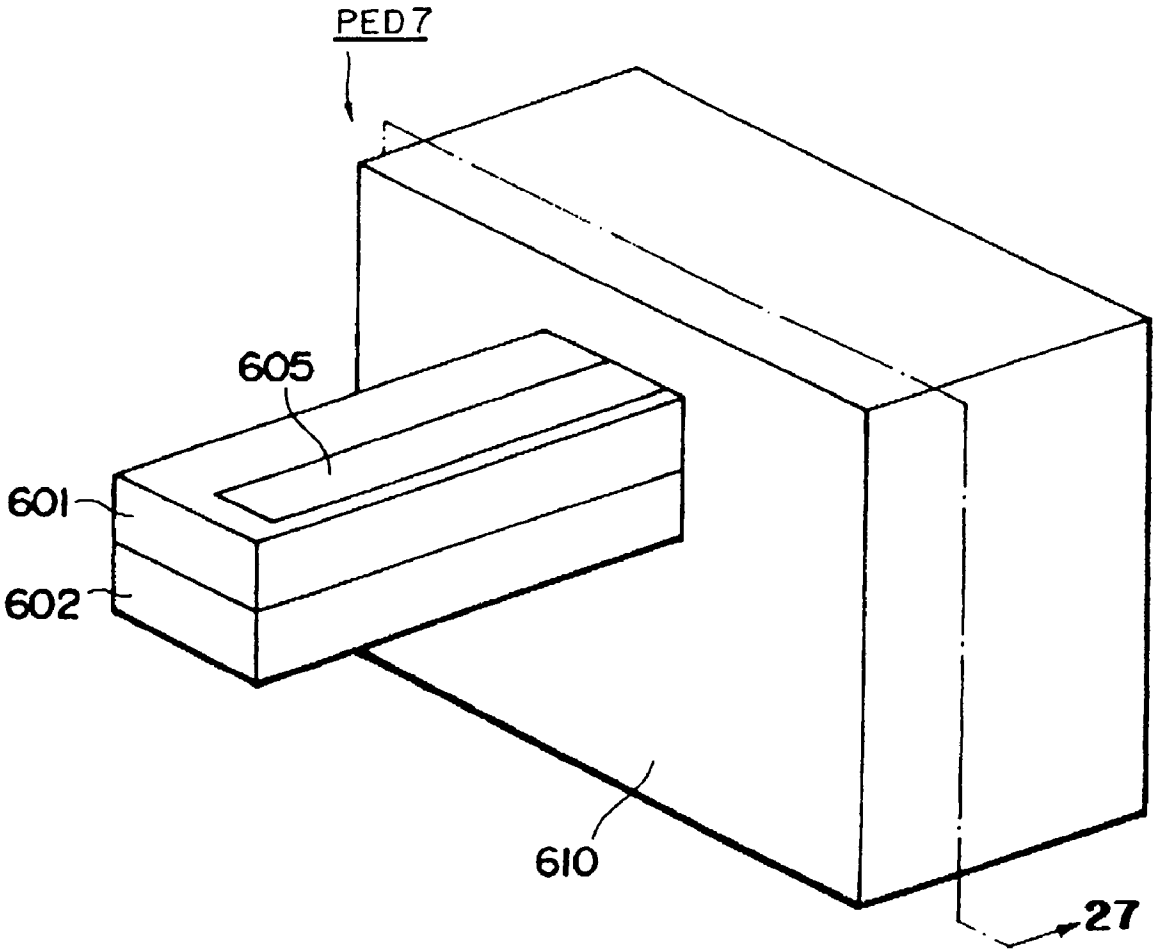
FIG. 26 is a perspective view of a bimorph piezoelectric element.
Figure 27:
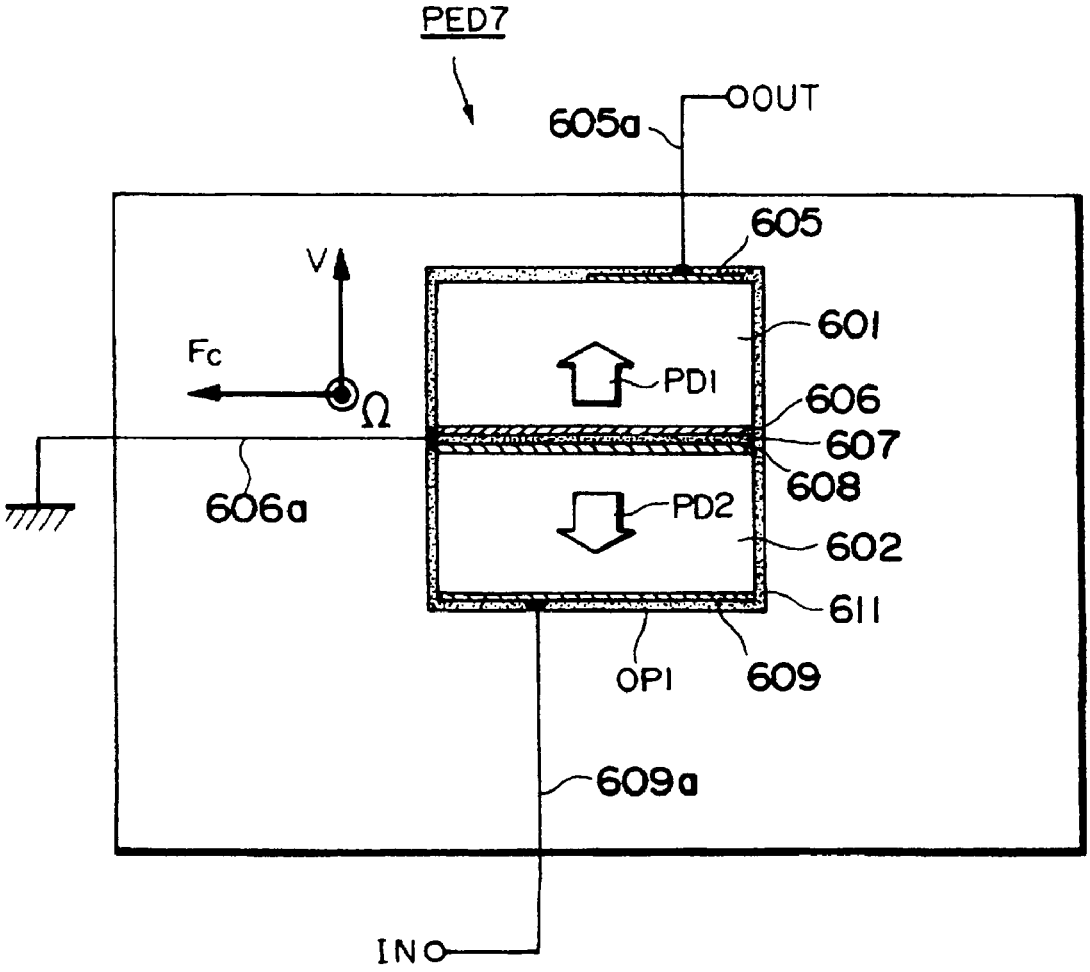
FIG. 27 is a sectional view taken along the direction indicated by an arrow Z in FIG. 26 illustrating the element.

FIGS. 26 and 27 show a piezoelectric vibration angular velocity meter PED7 according to the seventh embodiment. This element includes rectangular parallellepiped members 601 and 602 made of a piezoelectric material. Electrodes 605 and 606 are respectively formed on the upper and lower surfaces of the rectangular parallellepiped member 601. Electrodes 608 and 609 are respectively formed on the upper and lower surfaces of the rectangular parallellepiped member 602. These rectangular parallellepiped members are fixed to each other with an adhesive layer 607. The electrode 605 on the upper surface is used to detect the strain amount of the element based on Coriolis forces. The central line of the upper-surface electrode 605 in the longitudinal direction is parallel to the central line of the upper surface of the rectangular parallellepiped member 601 in the longitudinal direction but does not overlap it.

A support portion 610 has a hole (cavity) OP1 in its center. In this hole OP1, the piezoelectric element is constituted by the rectangular parallellepiped members 601 and 602, the electrodes 606, 608, and 609, and the adhesive layer 607. One end portion of the piezoelectric element is fitted in the hole OP1 of the support portion 610. The size of the opening of this hole OP1 is almost equal to the area of a cross-section of the piezoelectric element in a direction perpendicular to the longitudinal direction. Although the piezoelectric element and the support portion 610 are fixed to each other with an adhesive layer 611, they may be fixed to each other with a screw.

A lead line 606a is electrically connected to the electrodes 606 and 608. This lead line 606a is in contact with the inner surface of the hole OP1 of the support portion 610 as well as the electrodes 606 and 608. A lead line 605a is electrically connected to the electrode 605. This lead line 605a is in contact with the inner surface of the hole OP1 of the support portion 610 as well as the electrode 605. A lead line 609a is electrically connected to the electrode 609. The lead line 609a is in contact with the inner surface of the hole OP1 of the support portion 610 as well as the electrode 609.

FIG. 27 is a sectional view taken along a direction perpendicular to the axial direction of the vibrator of the vibration angular velocity meter in FIG. 26. A cross-section of the vibrator is almost square, and the resonance frequencies in the vibrator driving direction (indicated by "V" in FIG. 27) and the Coriolis force direction (indicated by "Fc" in FIG. 27) are almost the same. The driving piezoelectric member 602 and the detection piezoelectric member 601 are respectively polarized in the directions indicated by arrows PD2 and PD1 in FIG. 27. The electrodes 606 and 608 between the two members 601 and 602 are used as ground electrodes commonly used for driving and detecting operations. When an AC voltage having a frequency near the fundamental resonance frequency of cantilever vibration is applied to the driving piezoelectric member 602, the member 602 tries to expand/contract in accordance with the applied AC voltage owing to the piezoelectric lateral effect. At this time, since no driving voltage is applied to the detection piezoelectric member 601, no force acts on the member to change its length. However, the vibrator obtained by joining the two piezoelectric members becomes a so-called unimorph structure, and resonance of the vibrator is excited in the direction indicated by "V" in FIG. 27.

In this case, when the vibrator rotates about the vibrator axis, a Coriolis force is generated in the direction indicated by "Fc" in FIG. 27, so that the vibrator is bent in a direction perpendicular to both the vibrator direction and the axial direction of the vibrator. Since the resonance frequency in the Coriolis force direction is set to be equal to that in the driving direction, the magnitude of the Coriolis force, i.e., the rotational angular velocity, can be obtained according to equation (1) by detecting a voltage generated in the electrode of the detection piezoelectric member owing to the piezoelectric lateral effect upon this bending. When the Coriolis force indicated by "Fc" in FIG. 27 acts on the vibrator, a compression stress and a tensile stress respectively act on the left and right sides of the vibrator with respect to the central axis of the vibrator. In this case, if the detection electrode is symmetrically arranged with respect to the central axis of the vibrator, piezoelectric signals based on the compression stress and the tensile stress have opposite phases and hence almost cancel out each other, resulting in low sensitivity. For this reason, as shown in FIG. 27, the detection electrode 605 is shifted from the central axis of the vibrator to allow extraction of only a piezoelectric signal based on a compression or tensile stress upon one bending operation. In this case, a piezoelectric signal based on a stress accompanying a driving operation is also generated in the detection electrode. The signal accompanying the Coriolis force has the same frequency as that of the driving AC voltage. A signal obtained by synthesizing the above two signals is obtained from the detection electrode.

Figure 28:
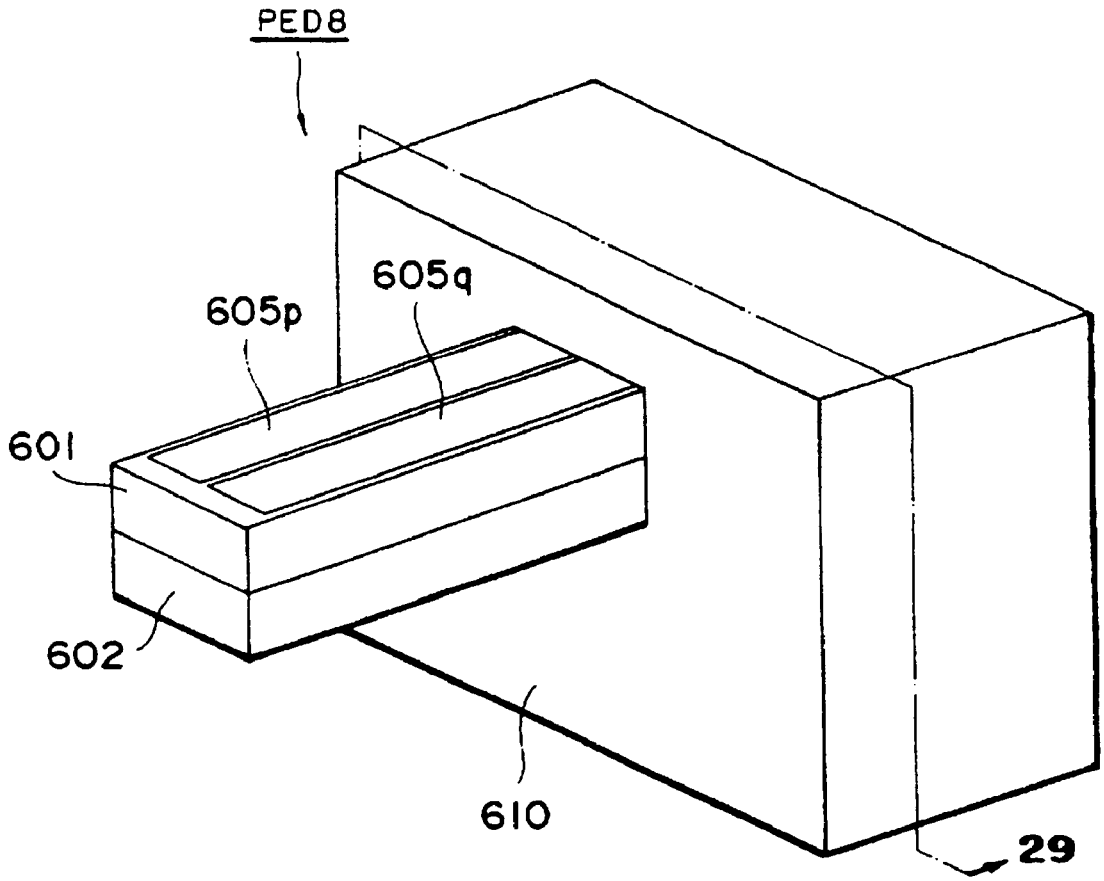
FIG. 28 is a perspective view of a bimorph piezoelectric element.

FIG. 28 shows the basic arrangement of a piezoelectric vibration angular velocity meter PED8 having a bimorph vibrator according to the eighth embodiment. This vibration angular velocity meter basically has the same mechanism as that shown in FIGS. 26 and 27 except that the detection electrode formed on the upper surface of the detection piezoelectric member is divided into two electrodes (605p and 605q) in the axial direction of the vibrator.

Figure 29:
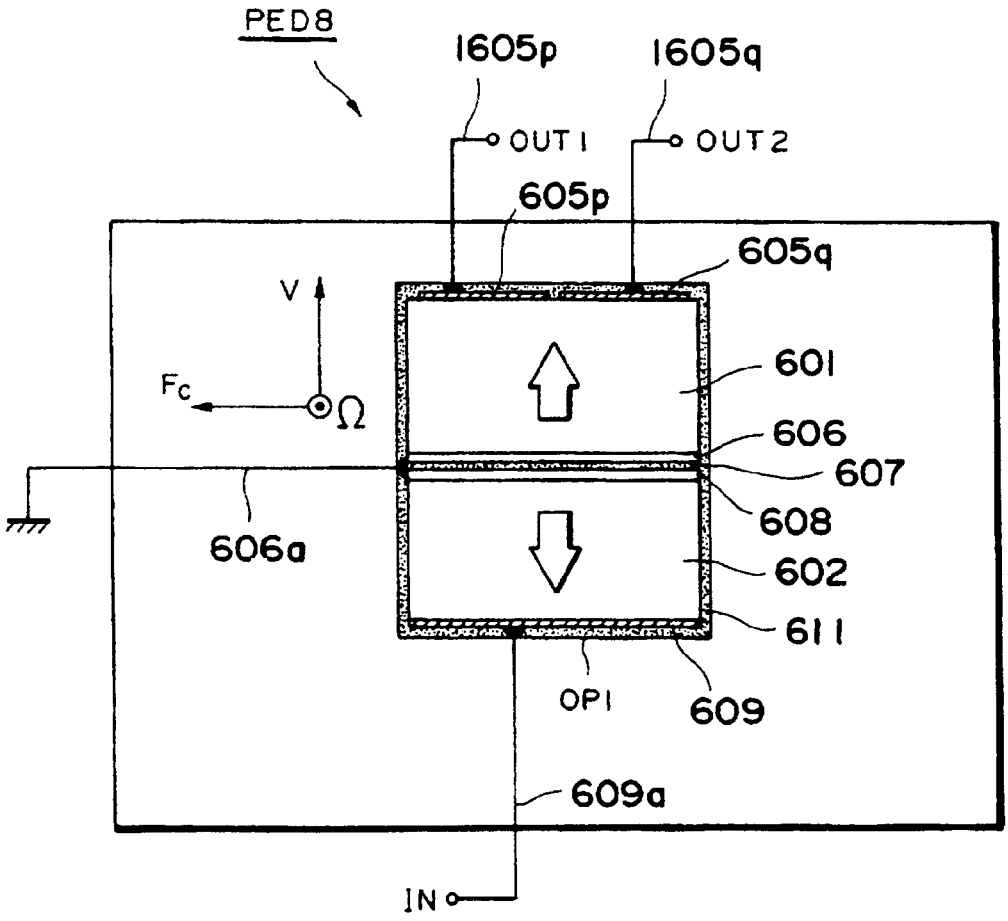
FIG. 29 is a sectional view taken along the direction indicated by an arrow Z in FIG. 28 illustrating the element.

FIG. 29 is a sectional view taken along a direction perpendicular to the axis of the vibrator of the vibration angular velocity meter in FIG. 28. A cross-section of the vibrator has a shorter side in the electrode direction than in a direction perpendicular thereto. The driving and detection principles are basically the same as those described with reference to FIG. 27. However, the cantilever vibration fundamental resonance frequency in the Coriolis force direction indicated by "Fc" in FIG. 29 is lower than that in the driving direction indicated by "V" in FIG. 29 because the length of the vibrator in the Coriolis force direction is smaller than that in the driving direction.

When an AC voltage having a frequency near the cantilever vibration fundamental resonance frequency in the Coriolis force direction is applied to a driving piezoelectric member 602 via a driving electrode 609, vibration is excited in the direction indicated by "V" in FIG. 29. The vibration caused at this time does not become resonant vibration because the frequency of the applied AC voltage is lower than the cantilever vibration fundamental resonance frequency in the driving direction. However, since the vibrator has a unimorph structure, a sufficiently large amplitude can be provided by applying an appropriate voltage to the driving piezoelectric member 602.

When the vibrator rotates about the axis of the vibrator, a Coriolis force is generated. Since the frequency of the AC voltage used for a driving operation is equal to the cantilever vibration fundamental resonance frequency in the Coriolis force direction, a resonant state occurs once the vibrator is bent by the Coriolis force. As a result, an amplitude of a quality factor multiple (several 10 to several 1,000 times) of vibration of a static amplitude obtained by piezoelectric strain can be obtained.

A signal based on a Coriolis force is detected by the divided electrodes. When the Coriolis force indicated by "Fc" in FIG. 29 acts on the vibrator, a compression stress and a tensile stress respectively act on the left and right sides of the vibrator with respect to the central axis of the vibrator in FIG. 29. Piezoelectric signals obtained from the two divided electrodes therefore have the same frequency and opposite phases. Since a signal based on a stress accompanying a driving operation of the vibrator is larger than a signal based on a Coriolis force, it is difficult to detect the Coriolis force from a signal obtained by synthesizing the two signals. For this reason, the difference (OUT1-OUT2) between signals obtained from the two divided electrodes 605p and 605q is detected via leads 1605p and 1605q, and gain and phase adjustment is performed, and the piezoelectric signals based on the driving operation are canceled out, thereby extracting only the signal based on the Coriolis force.

Figure 30:
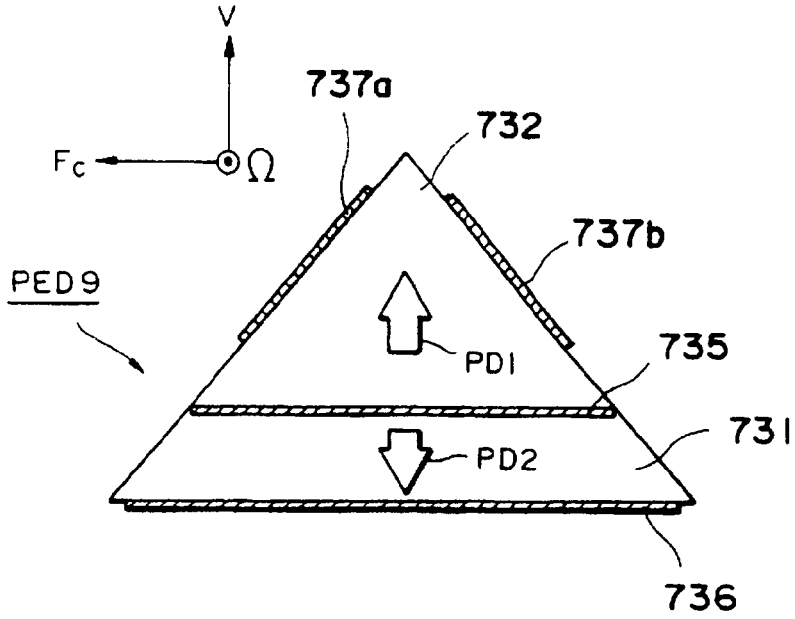
FIG. 30 is a perspective view of a bimorph piezoelectric element.
Figure 31:
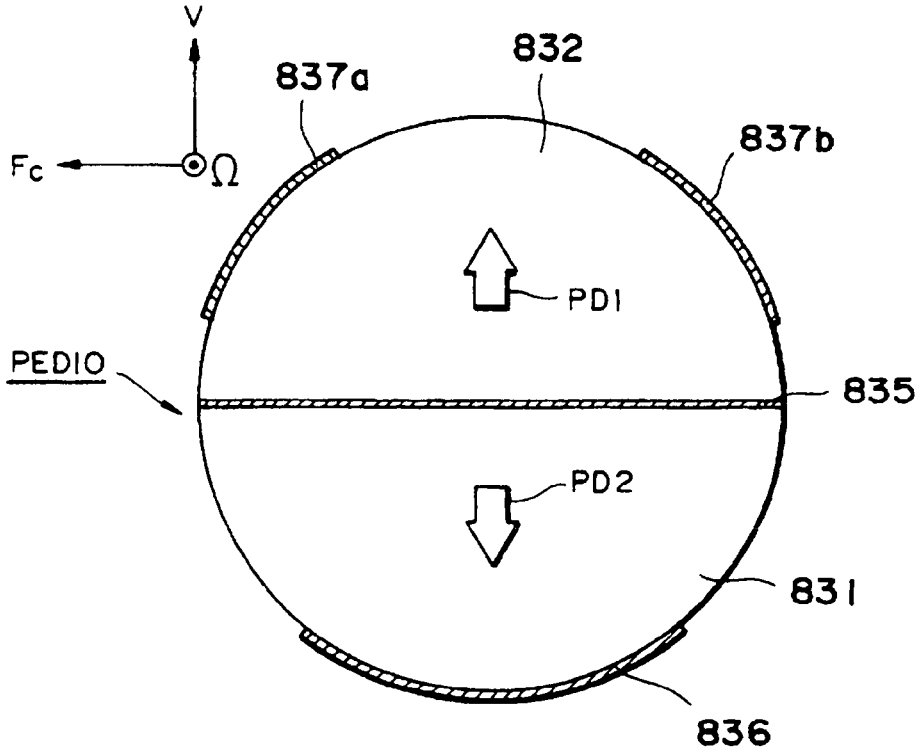
FIG. 31 is a perspective view of a bimorph piezoelectric element.

Each embodiment described above has exemplified the angular velocity meter using the vibrator in the form of a quadratic prism. However, as shown in FIGS. 30 and 31 each illustrating a vibrator viewed from the axial direction of the vibrator, even if a vibrator is in the shape of a triangular prism or column, the operation principle of the vibration angular velocity meters having the bimorph vibrators of the seventh and eighth embodiments can be used. In either structure, the driving piezoelectric member and the detection piezoelectric member are joined to each other via the ground electrode, and the detection electrode is divided into two electrodes.

FIG. 30 shows a piezoelectric vibration angular velocity meter PED9 according to the ninth embodiment. This element includes a first member 732 consisting of a piezoelectric crystal and having three surfaces, and first, second, and third electrodes 737a, 737b, and 735 respectively formed on the three surfaces.

This element also includes a second member 731 consisting of a piezoelectric crystal and having two parallel surfaces.

The second member 731 is fixed to the third electrode 735 via one of these two surfaces. A fourth electrode 736 is formed on the surface of one of the two surfaces of the second member 731. These piezoelectric members are respectively polarized in the directions indicated by arrows PD1 and PD2. The directions indicated by the arrows PD1 and PD2 are perpendicular to the surface of the electrode 735.

An AC voltage is applied between the electrodes 735 and 736. By obtaining the difference between a voltage signal output across the electrodes 737a and 735 and a voltage signal output across the electrodes 737b and 375, the strain amount of this element can be detected, and hence the angular velocity can be detected.

FIG. 31 shows a piezoelectric vibration angular velocity meter PED10 according to the 10th embodiment. This element includes a first member 832 consisting of a piezoelectric crystal and having a semicircular cross-section and a second member 831 consisting of a piezoelectric crystal and having a semicircular cross-section. The second member 831 is fixed to the first member 832. The cross-sections of the first and second members 832 and 831 constitute a circle. An electrode 835 is interposed between these members.

An AC voltage is applied between the electrode 835 and an electrode 836. By obtaining the difference between a voltage signal output across an electrode 837a and the electrode 835 and a voltage signal output across an electrode 837b and the electrode 835, the strain amount of this element can be detected, and hence the angular velocity can be detected.

If a columnar vibrator is vibrated under cantilever vibration conditions with one end of the vibrator being fixed, and the other end being set in a nonrestraint state, the vibrator can be easily fixed, and lead lines can be joined to electrode portions on the fixed portion which does not vibrate. Therefore, an almost ideal vibration state can be obtained. The present invention is based on such an idea.

According to the present invention, there is provided a piezoelectric vibration angular velocity meter comprising a columnar vibrator partly or completely made of a piezoelectric or electrostrictive member, an excitation means for exciting the vibrator, and a detection means for detecting a Coriolis force generated in the vibrator, wherein one end of the vibrator is fixed.

In addition, the vibrator of the piezoelectric vibration angular velocity meter of the present invention has a unimorph or bimorph structure. That is, there is provided a piezoelectric vibration angular velocity meter comprising a base member made of a metal or ceramic material in the form of a quadratic prism, and a vibrator made of a piezoelectric or electrostrictive material in the form of a quadratic prism and joined to the base member, or a vibrator constituted by a first member made of a piezoelectric or electrostrictive material in the form of a quadratic prism and a second member made of a piezoelectric or electrostrictive material in the form of a quadratic prism.

Cantilever vibration allows the vibrator to be easily fixed, and also allows lead lines to be connected to the fixed portion which does not vibrate so that an ideal vibration state can be easily attained.

The vibrator preferably has the shape of a quadratic prism, triangular prism, or column because it allows easy adjustment of resonance frequencies and easy formation of the vibrator.

Driving (excitation) of the vibrator and detection of a Coriolis force are performed by using the piezoelectric or electrostrictive effect.

In forming a vibrator by using a piezoelectric or electrostrictive ceramic material, a material in the form of a quadratic prism, e.g., a plate-like material, is preferably used because it facilitates polarization.

When a unimorph vibrator is to be used, a piezoelectric or electrostrictive element as an excitation means is arranged near the vibrator (on the vibrator or the support portion for fixing the vibrator), and a voltage is applied to the element to excite fundamental cantilever vibration of the unimorph vibrator.

When a bimorph vibrator is to be used, an inner electrode is used as a ground electrode, and a voltage is applied between the inner electrode and an outer electrode on a piezoelectric or electrostrictive member for a driving operation, i.e., excitation. With this operation, fundamental cantilever vibration of the bimorph vibrator is excited by using a so-called piezoelectric lateral effect.

In either the unimorph structure or the bimorph structure, vibration is caused in a direction perpendicular to the electrode surface. When the vibrator rotates about the axis of the vibrator, the vibrator is bent within the electrode surface owing to Coriolis forces. Of the signals generated in the two divided outer electrodes for detection, the signals originating from the Coriolis forces have opposite phases, but the signals originating from the driving operation are in phase. If, therefore, the differential signal between the two signals is obtained, only the signal almost originating from the Coriolis force can be obtained.

If the outer electrode on a piezoelectric or electrostrictive member is divided into three electrodes, the middle electrode is used for excitation to execute fundamental cantilever natural oscillation. If the electrodes on the two sides of the middle electrode are used for detection, and the differential voltage between the voltages generated in the two electrodes is obtained, a signal originating from a Coriolis force can be obtained.

If the vibrator has a square cross-section, and the resonance frequencies in the Coriolis force direction and the driving direction can be matched with each other, the vibrator can be driven at a frequency near the resonance frequency with a simple oscillation circuit by feeding back outputs from detection electrodes. Vibration based on a Coriolis force is set in a resonant state to improve the detection sensitivity.

In order to omit the cumbersome process of matching resonance frequencies, the vibrator has a rectangular cross-section to intentionally shift the resonance frequencies in the two directions. With this operation, a bimorph driving operation which allows a large amplitude without driving the vibrator in a resonant state can be realized, and the frequency of the AC voltage for this driving operation is used as the resonance frequency of the fundamental vibration in the Coriolis force direction. In addition, if the vibrator is driven at a frequency higher than the fundamental resonance frequency in a bimorph driving operation, vibration cannot be stably caused because of, e.g., coupling with a high-order mode. For this reason, the vibrator preferably has a rectangular cross-section shorter in the coriolis force direction than in the other direction.

In joining two piezoelectric or electrostrictive ceramic plates to each other, a metal plate as a so-called shim member can be inserted between the two plates to increase the displacement amount of the bimorph structure.

As described above, according to the present invention, a vibration angular velocity meter having an ideal vibration state can be easily provided.

In addition, inexpensive, compact vibrators can be manufactured in large quantities by forming a plurality of electrode patterns on a large ceramic plate by a printing technique, photolithography, or the like, joining a metal or ceramic plate thereto, and cutting the resultant structure.

As has been described above, the piezoelectric vibration angular velocity meter of the present invention includes a columnar unimorph or bimorph vibrator made of a piezoelectric or electrostrictive member, an excitation electrode for exciting the vibrator, and a detection electrode for detecting a Coriolis force generated in the vibrator. In the meter, an ideal vibration state can be attained by fixing one end of the vibrator.

In the following, a self-excitation circuit which drives a vibrator of a piezoelectric vibrational angular velocity meter or the like in a self-excitation manner will be explained. First, the schematic configuration of the self-excitation circuit in accordance with the following embodiments will be explained.

Figure 55:
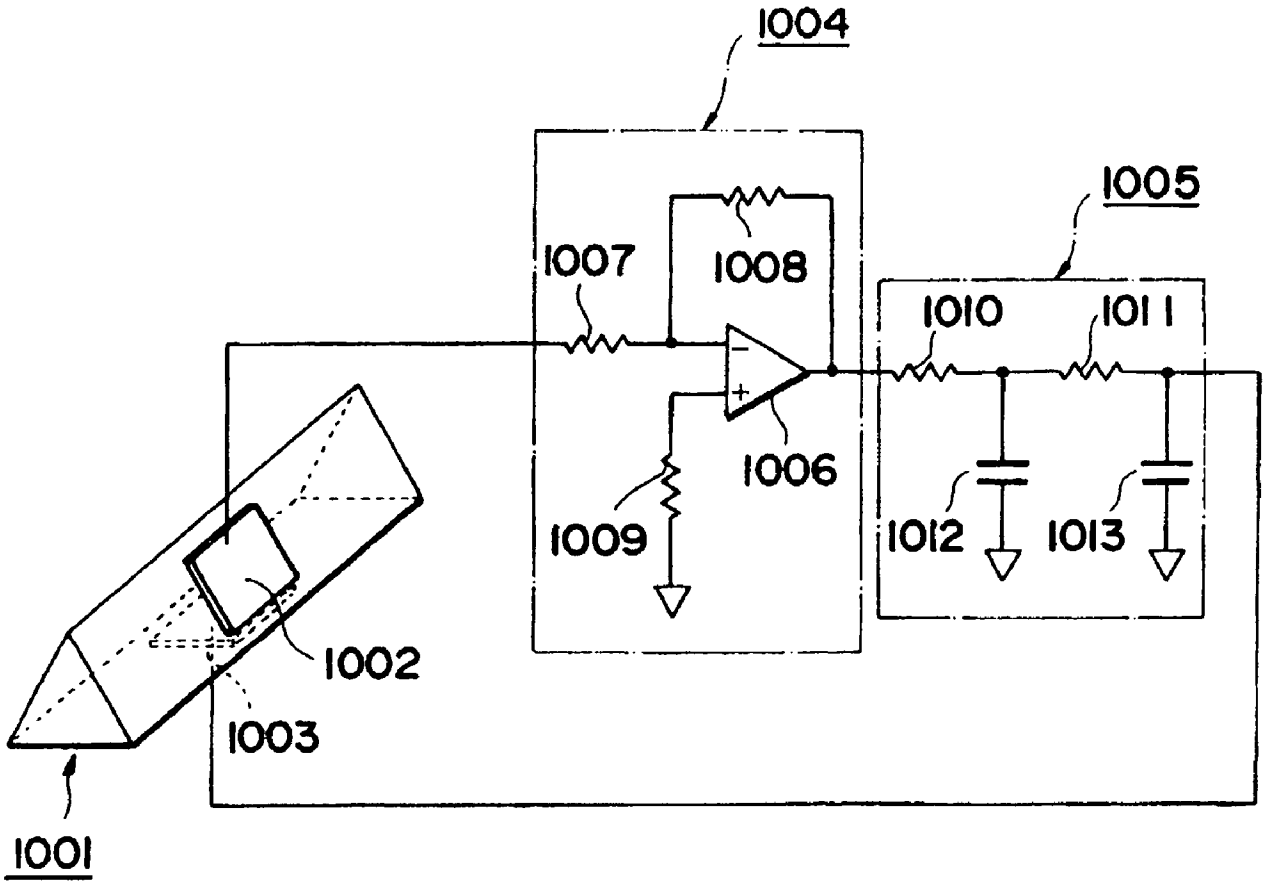
FIG. 55 is a view showing a comparative self-excitation circuit.

FIG. 55 shows a circuit which is to be compared with the self-excitation circuit used in the piezoelectric vibrational angular velocity meter of the present invention.

This self-excitation circuit is constituted by an inverting amplifier 1004 which inversely amplifies a signal from a signal detecting piezoelectric element 1002 in the upper portion of a vibrator 1001 and a low-pass filter 1005 which adjusts the phase of the output signal of the inverting amplifier 1004. The output side of the low-pass filter 1005 is connected to a driving piezoelectric element 1003 for the vibrator 1001.

The inverting amplifier 1004 is constituted by an operational amplifier 1006 and resistors 1007, 1008, and 1009. The low-pass filter 1005 is constituted by resistors 1010 and 1011 and capacitors 1012 and 1013 as two steps of RC filters.

Here, the vibrator 1001 is configured such that piezoelectric elements are respectively bonded to two side surfaces of a triangle pole made of a metal. Each of these piezoelectric elements comprises a piezoelectric layer and electrodes respectively formed on both sides thereof. One of these piezoelectric elements is the above-mentioned detecting piezoelectric element 1002, whereas the other is the above-mentioned driving piezoelectric element 1003. Also, the above-mentioned triangle pole is grounded.

According to this self-excitation circuit, the signal output from the detecting electrode 1002 is inversely amplified by the inverting amplifier 1004 and the phase of thus amplified voltage is adjusted by the low-pass filter 1005, whose output is supplied, as a driving voltage, to the driving electrode 1003 of the vibrator 1001. Accordingly, a positive feedback is provided so as to attain a loop gain of 1 or higher, whereby the vibrator 1001 is driven in a self-excitation manner.

While the vibrator is likely to become mechanically and electrically unstable, the positively fed-back voltage (driving voltage) may become unstable in thus configured self-excitation circuit of FIG. 55 due to the mechanical and electrical unstableness of the vibrator 1001. Accordingly, it may not prevent such problems as unstable amplitude upon self-excited vibration of the vibrator and abnormal oscillation at frequencies other than the resonance frequency of the vibrator from occurring.

The following self-excitation circuits and the piezoelectric vibrational angular velocity meter using the same can stabilize driving voltage regardless of the mechanical and electrical unstableness of the vibrator, thereby stabilizing the amplitude at the self-excitation vibration of the vibrator while preventing the abnormal oscillation at frequencies other than the resonance frequency of the vibrator from occurring.

First, the outline of the following embodiments will be explained.

The self-excitation circuit of the first embodiment is a self-excitation circuit for driving a vibrator in a self-excitation manner and comprises a converting means for converting a first sine wave voltage indicative of a state of vibration of the vibrator into a square wave voltage which becomes a first predetermined level when the first square wave voltage is greater than a predetermined reference level while becoming a second predetermined level when the first square wave voltage is smaller than the predetermined reference level; a filter for filtering a second sine wave voltage, which has a frequency identical to that of the first sine wave voltage, from the square wave voltage; and a phase shifter for adjusting the phase of the second sine wave voltage, which has been filtered by the filter, such that the amplitude of vibration of the vibrator is substantially maximized.

The self-excitation circuit of the second embodiment comprises a current/voltage converter which receives one input signal from the vibrator as an electric current signal and converts the electric current signal into a voltage signal, while the converting means converts the output of the current/voltage converter, as the first sine wave voltage, into the square wave voltage.

The self-excitation circuit of the third embodiment comprises a means for receiving one input signal from the vibrator as a voltage signal, while the converting means converts this voltage signal, as the first sine wave voltage, into the square wave voltage.

The self-excitation circuit of the fourth embodiment comprises a means for receiving a plurality of input signals from the vibrator and attaining a voltage signal corresponding to the sum of the plurality of input signals, while the converting means converts the voltage signal corresponding to the sum of the plurality of input signals, as the first sine wave voltage, into the square wave voltage.

In the self-excitation circuit of the fifth embodiment, the means for attaining a voltage signal corresponding to the sum of the plurality of input signals has a plurality of current/voltage converters which respectively receive the plurality of input signals as electric current signals and convert these electric current signals into voltage signals.

In the self-excitation circuit of the sixth embodiment, the means for attaining a voltage signal corresponding to the sum of the plurality of input signals has a means for receiving the plurality of input signals respectively as voltage signals.

In the self-excitation circuit of the seventh embodiment, the converting means includes a zero-cross comparator.

The self-excitation circuit of the eighth embodiment further comprises an attenuator 1042 for attenuating the output of the zero-cross comparator.

In the self-excitation circuit of the ninth embodiment, the attenuator comprises a potential dividing circuit including a variable resistor.

The piezoelectric vibrational angular velocity meter of the tenth embodiment comprises a vibrator and a self-excitation circuit for driving the vibrator in a self-excitation manner.

In the piezoelectric vibrational angular velocity meter of the eleventh embodiment, the vibrator in the tenth embodiment comprises first and second members each made of a rectangular parallelopiped piezoelectric member; a first electrode formed between a first side surface of the first member and a first side surface of the second member; second and third electrodes 1033 and 1034 respectively formed at both side positions on a second side surface of the first member opposite to the first side surface thereof or respectively formed on third and fourth side surfaces of the first member neighboring the first side surface thereof; and a fourth electrode 1035 formed on a second side surface of the second member opposite to the first side surface thereof.

In the piezoelectric vibrational angular velocity meter of the twelfth embodiment, the vibrator in the eleventh embodiment further comprises a fifth electrode formed at substantially the center position of the second side surface of the first member.

In the piezoelectric vibrational angular velocity meter of the thirteenth embodiment, the vibrator in the tenth embodiment comprises a member made of a columnar piezoelectric material and a plurality of band-like electrodes formed on the outer peripheral surface of this member so as to extend in the axial direction thereof.

In the piezoelectric vibrational angular velocity meter of the fourteenth embodiment, the vibrator in the tenth embodiment comprises a member made of a metal formed like a polygonal (higher than triangle) pole and a plurality of piezoelectric elements respectively bonded to a plurality of side surfaces of the member.

The above-mentioned converting means converts the first sine wave voltage indicative of the state of vibration of the vibrator into a square wave voltage having a predetermined level. The first sine wave voltage is obtained on the basis of one or a plurality of input signals from the vibrator. While the amplitude of the first sine wave voltage may fluctuate due to mechanical and electrical unstableness of the vibrator, the level of the square wave voltage is always maintained at the predetermined level. From the square wave voltage, the second sine wave voltage having a frequency identical to that of the first sine wave voltage is filtered by the filter. Accordingly, regardless of the fluctuation in amplitude of the first sine wave voltage, namely, regardless of the mechanical and electrical unstableness of the vibrator, the amplitude of the second sine wave voltage is securely held at a predetermined level. Then, the phase of the second sine wave voltage is adjusted by the phase shifter such that the amplitude of vibration of the vibrator is substantially maximized. The output of the phase shifter is supplied, as a driving voltage, to the vibrator so as to provide a positive feedback. Consequently, the vibrator is driven in a self-excitation manner.

Accordingly, regardless of the mechanical and electrical unstableness of the vibrator, the amplitude of the driving voltage supplied to the vibrator is held at a predetermined level and stabilized. Therefore, the amplitude of the self-excited vibration of the vibrator is stabilized, thereby preventing the vibrator from abnormally oscillating at frequencies other than the resonance frequency thereof.

When the vibrator configured in accordance with the eleventh or twelfth embodiment is adopted as the vibrator, a large number of such vibrators can be made at once, for example, when two sheets of piezoelectric plates in which electrode patterns have been formed on both sides thereof are bonded together and then cut. Also, when the electrode patterns are formed by reactive etching or the like and the bonded plates are cut by a precision cutting machine or the like, small vibrators can be made with a favorable reproducibility.

Figure 32:
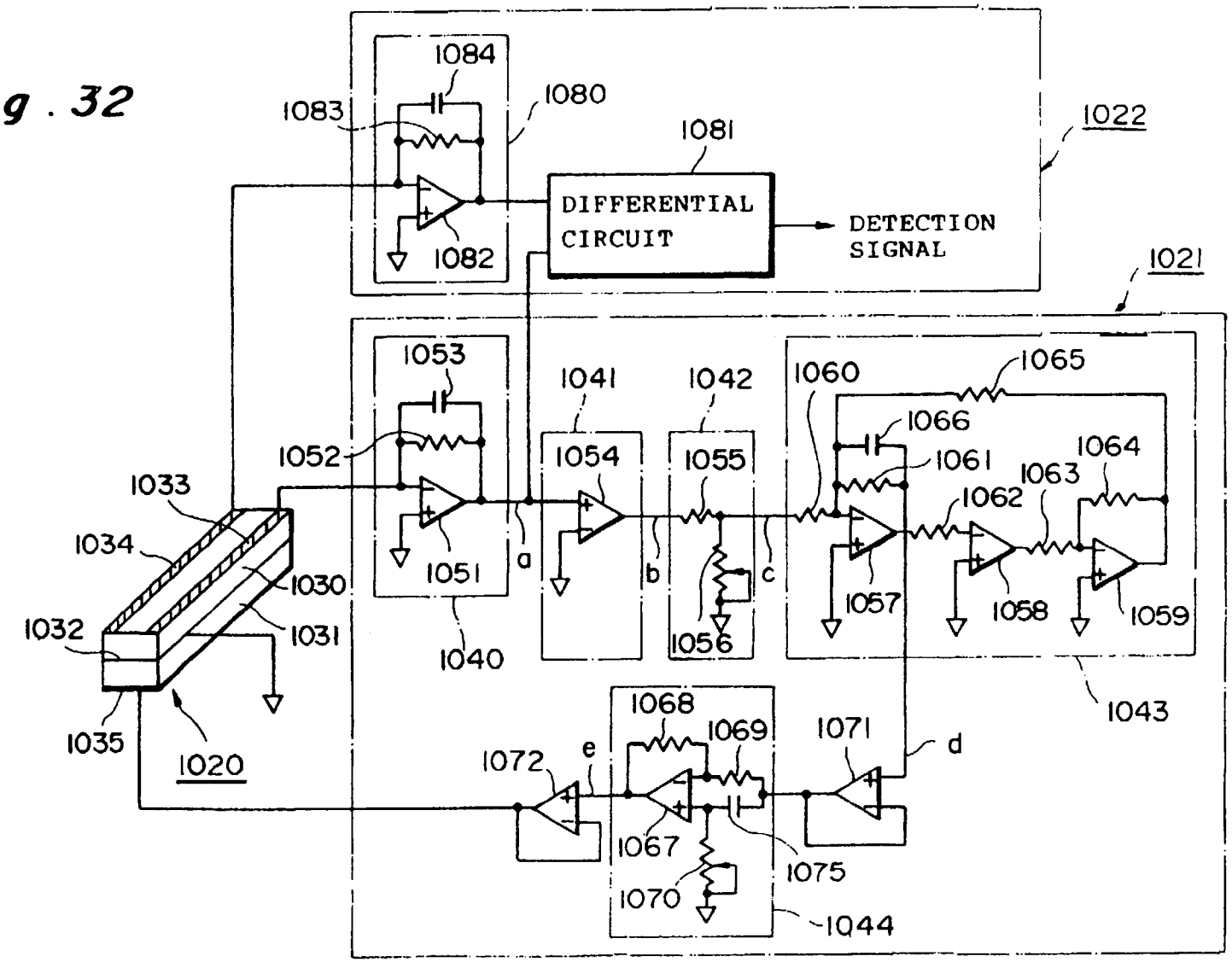
FIG. 32 is a circuit diagram showing a piezoelectric vibrational angular velocity meter in accordance with another embodiment.

In the following, self-excitation circuits in accordance with embodiments will be explained in further detail with reference to the drawings. FIG. 32 shows a self-excitation circuit in accordance with an embodiment. The piezoelectric vibrational angular velocity meter in accordance with this embodiment comprises, as shown in FIG. 32, a vibrator 1020, a self-excitation circuit 1021 for driving the vibrator 1020 in a self-excitation manner, and a detection circuit 1022 which attains, based on an input signal from the vibrator 1020, a detection signal corresponding to Coriolis force acting on the vibrator 1020.

Figure 33:
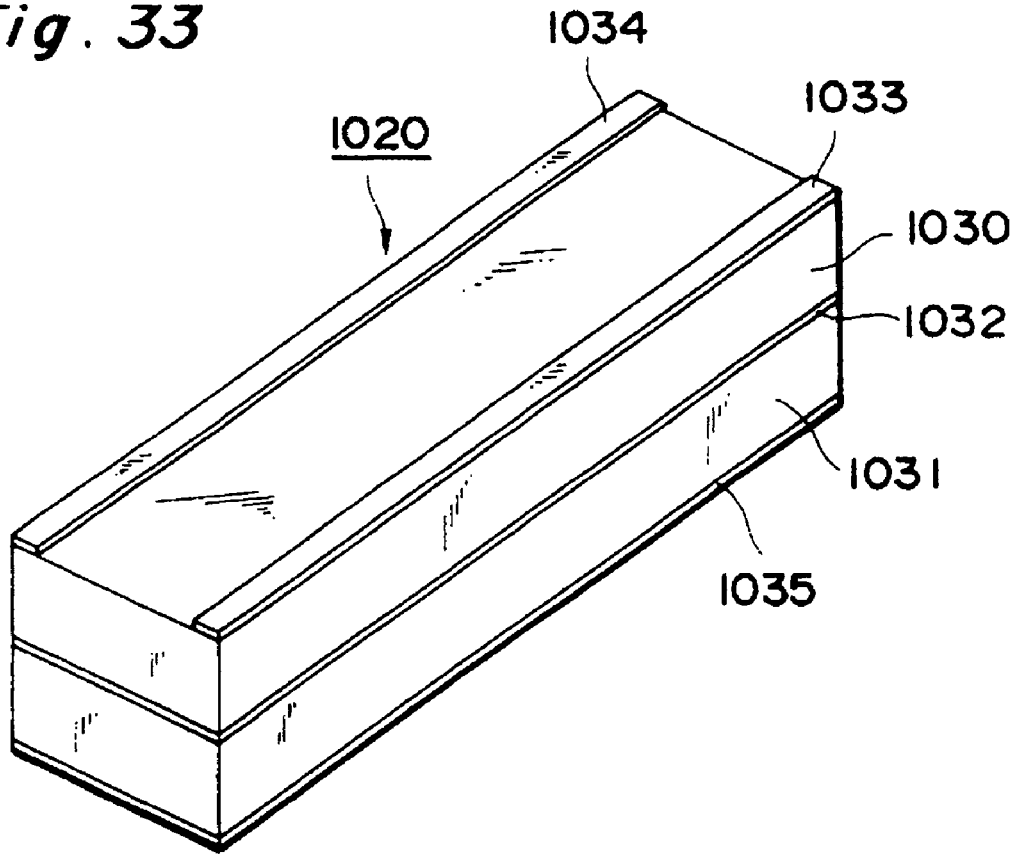
FIG. 33 is a perspective view of a vibrator.
Figure 34:
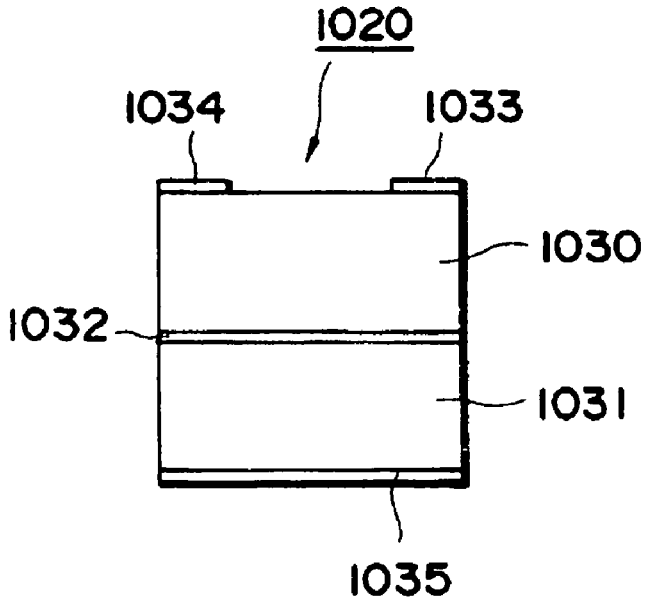
FIG. 34 is a front view of the vibrator shown in FIG. 33.

First, the vibrator 1020 will be explained with reference to FIGS. 33 and 34. FIG. 33 is a perspective view of the vibrator 1020, whereas FIG. 34 is a front view thereof.

As shown in FIG. 33, the vibrator 1020 comprises first and second members 1030 and 1031 each made of a piezoelectric material formed like a rectangular parallelopiped (which may not strictly be a rectangular parallelopiped), an electrode 1032 formed between a first side surface (lower surface in FIG. 34) of the first member 1030 and a first side surface (upper surface in FIG. 34) of the second member 1031, electrodes 1033 and 1034 respectively formed at both side positions on a second side surface (upper surface in FIG. 34) of the first member 1030 opposite to the first side surface thereof, and an electrode 1035 formed on a second side surface (lower surface in FIG. 34) of the second member 1031 opposite to the first side surface thereof.

In this embodiment, each of the first and second members 1030 and 1031 is made of a piezoelectric ceramic (e.g., lead zirconate titanate (PZT)) and has a thickness of 0.5 mm, a width of 1.0 mm, and a length of 9.0 mm. The present invention, however, should not be restricted to such a size. The direction of polarization of the first member 1030 is the upward direction in FIG. 34, whereas that of the second member 1031 is the downward direction in FIG. 34. The electrodes 1033 and 1034 are respectively formed, by silver paste, at both side positions on the upper surface of the first member 1030 so as to extend in the longitudinal direction of the first member 1030 each with a width of 0.3 mm. The electrode 1035 is formed by silver paste on the whole lower surface of the second member 1031. The electrode 1032 is configured such that silver paste formed on the whole lower surface of the first member 1030 beforehand and silver paste formed on the whole upper surface of the second member 1031 beforehand are bonded together by means of an adhesive such as an epoxy adhesive (not depicted). In order to minimize the influence of the adhesive upon the vibration of the vibrator, an adhesive having a low viscosity is preferably used therefor. Here, even when the adhesive itself does not have any conductivity, there are a number of minute areas between the silver paste formed on the lower surface of the first member 1030 and the silver paste formed on the upper surface of the second member 1031 which are directly brought into contact with each other without intervention of the adhesive when an appropriate pressure is applied thereto at the time of bonding, thereby electrically connecting with each other. Of course, a conductive adhesive may be used therefor.

Since the vibrator 1020 is thus configured, a large number of such vibrators can be made at once. Namely, when a piezoelectric plate in which a number of electrode patterns for the electrodes 1033 and 1034 and a number of electrode patterns constituting a part of the electrode 1032 have been formed for the number of vibrators 1020 beforehand and a piezoelectric plate in which a number of electrode patterns for the electrode 1035 and a number of electrode patterns constituting the other part of the electrode 1032 have been formed for the number of vibrators 1020 beforehand are bonded together by means of the above-mentioned adhesive and then cut into the individual vibrators 1020, the large number of vibrators 1020 can be made at once. Also, when the electrode pattern formation by reactive etching or the like and the cutting of the bonded plates by a precision cutting machine or the like are effected, the vibrator 1020 having a small size can be made with a favorable reproducibility.

In this vibrator 1020, for example, the electrode 1032 is used as a reference electrode (earth electrode), the electrodes 1033 and 1034 are used as Coriolis force detecting electrodes, and the electrode 1035 is used as a vibrator excitation electrode (driving electrode). Also, one or both of the electrodes 1033 and 1034 are used for taking out the input signal for the self-excitation circuit, namely, used for taking out the signal for attaining a voltage indicative of the state of vibration of the vibrator 1020 for self-excitation. When an excitation voltage is applied to the electrode 1035 while using the electrode 1032 as a reference electrode, the second member 1031 is subjected to bending vibration in a direction (vertical direction in FIG. 34) perpendicular to the surfaces of the electrodes 1032 and 1035, whereby the vibrator 1020 as a whole is subjected to bending vibration in this direction. Assuming that the vibrator 1020 is rotated around an arbitrary axis which extends in the longitudinal direction of the members 1030 and 1031, Coriolis force is generated in the width direction of the members 1030 and 1031, whereby refracting vibration of the vibrator 1020 occurs in this direction due to the Coriolis force. Due to this refracting vibration, signals corresponding to the Coriolis force are generated at the electrodes 1033 and 1034, respectively, in phases opposite to each other. Though the signals generated at the electrodes 1032 and 1034 include not only these signals but also the signals due to the bending vibration (excitation) of the vibrator 1020 in the direction perpendicular to the surfaces of the electrodes 1032 and 1035, the signal corresponding to the Coriolis force can be obtained alone when the differential between the signal of the electrode 1033 and the signal of the electrode 1034 is determined so as to cancel the component due to the excitation. As a result, the rotational speed (angular velocity) of the vibrator 1020 can be measured.

Here, as the material for each of the members 1030 and 1031, a piezoelectric material having a large Q value is selected in order for the vibrator 1020 to efficiently vibrate upon application of the driving voltage thereto and to generate a high voltage due to the vibration thereof. Also, it is preferable for the vibrator 1020 to have resonance frequencies in its thickness direction and width directions substantially coincide with each other. When they coincide with each other, the vibrator 1020 has a substantially square cross section. For example, this frequency matching operation is effected as, while the vibrator 1020 is vibrated, its side surface is shaven with laser or the like so as to adjust the resonance frequency.

Figure 35:
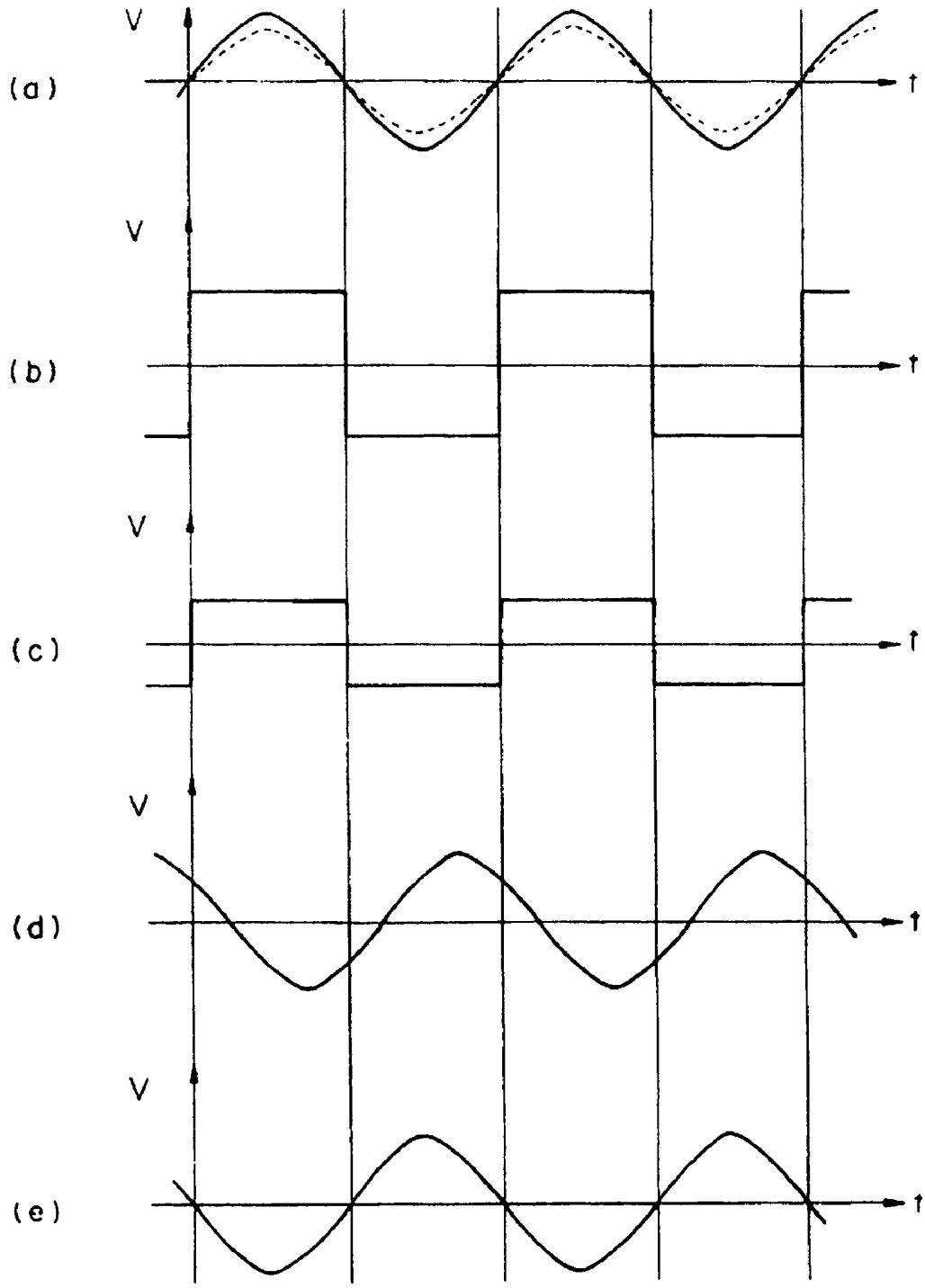
FIG. 35 is a waveform chart showing waveforms at respective sections in the circuit shown in FIG. 32.

Next, with reference to FIGS. 32 and 35, the self-excitation circuit 1021 will be explained. FIG. 35 is a waveform chart showing waveforms at points a to e in FIG. 32.

As shown in FIG. 32, the self-excitation circuit 1021 comprises a current/voltage converter (I-V converter) 1040, a zero-cross comparator 1041, attenuator 1042, a band-pass filter 1043, and a phase shifter 1044.

The input side of the current/voltage converter 1040 acts as an input terminal of the self-excitation circuit 1021 and is connected to the electrode 1033 (which may be the electrode 1034, of course) of the vibrator 1020. When a sine wave AC voltage with the resonance frequency of the vibrator 1020 is applied (by a voltage follower constituted by an operational amplifier 1072 as will be explained later) between the electrode 1035 and the electrode 1032, the vibrator 1020 vibrates in a direction perpendicular to the surfaces of the electrodes 1032 and 1035. Upon this vibration, a sine wave with the resonance frequency of the vibrator 1020 is generated from the electrodes 1033 and 1034 due to a piezoelectric effect.

As shown in FIG. 32, the current/voltage converter 1040 is constituted by an operational amplifier 1051, a resistor 1052, and a capacitor 1053. The input side of the current/voltage converter 1040 is connected to the electrode 1033 of the vibrator 1020 such that one input signal (signal from the electrode 1033 in this embodiment) of the vibrator 1020 is received as an electric current signal which is then converted into and output as a voltage signal. Namely, in this embodiment, as the vibrator 1020 vibrates, an electric charge generated upon its piezoelectric effect flows into a virtual grounding point of the operational amplifier 1051 by way of the electrode 1033, whereby its current is converted into a voltage. Since the piezoelectric signal from the vibrator 1020 is thus taken out as an electric current signal in this embodiment, the piezoelectric signal can be collected without loss. In this embodiment, the phase of the input current and the phase of the output voltage are inverted with respect to each other. Also, the resistor 1052 and the capacitor 1053 constitute a low-pass filter, which cuts a high frequency component. The capacitor 1053 may be omitted, however.

The voltage signal (sine wave voltage) output from the current/voltage converter 1040 is shown in (a) of FIG. 35. As indicated by continuous curve and dotted curve in (a), when an angular velocity is imparted to the vibrator 1020 so as to generate Coriolis force, for example, the amplitude of the output of the current/voltage converter 1040 inevitably changes in response thereto. Also, the amplitude of the output of the current/voltage converter 1040 fluctuates due to the mechanical and electrical unstableness of the vibrator 1020.

The zero-cross comparator 1041 is constituted by means of an operational amplifier 1054 and converts the output (which corresponds to the sine wave voltage indicative of the state of vibration of the vibrator 1020 in this embodiment) of the current/voltage converter 1040 into a square wave voltage which has a positive power source voltage level (e.g., +3 V) when the output of the current/voltage converter 1040 is greater than zero level (potential of the electrode 1032) while having a negative power source voltage level (e.g., −3 V) when the output of the current/voltage converter 1040 is smaller than zero level. In this case, regardless of the amplitude of the input waveform, the square wave voltage is output with its amplitude being securely set by the zero-cross comparator 1041 at an output amplitude determined by the power source voltage. In FIG. 35, (b) shows the output of the zero-cross comparator 1041. Though the zero-cross comparator 1041 is used while the reference level is set at zero level such that the square wave voltage has no DC component in this embodiment, the square wave voltage may have a DC component.

The attenuator 1042 is constituted by a potential dividing circuit composed of a resistor 1055 and a variable resistor 1056 and outputs the output (square wave voltage) of the zero-cross comparator 1041 with its amplitude being attenuated according to the potential dividing ratio thereof. The amplitude of the square wave voltage output from the attenuator 1042 can be arbitrarily set as the variable resistor 1056 is adjusted. The output of the attenuator 1042 is shown in (c) of FIG. 35. As the amplitude of the output voltage of the attenuator 1042 is decreasingly adjusted by the variable resistor 1056 therein, the voltage (driving voltage) imparting a positive feedback to the electrode 1035, which will be explained later, becomes constant, thereby enabling the vibrator 1020 to be subjected to self-excitation with a constant amplitude. Here, when the amplitude of the square wave voltage output from the zero-cross comparator 1041 is appropriate, the attenuator 1042 may be omitted.

The band-pass filter 1043 is a state variable filter constituted by operational amplifiers 1057 to 1059, resistors 1060 to 1065, and a capacitor 1066 and only transmits therethrough frequencies near the resonance frequency of the vibrator 1020. Namely, from the square wave voltage output from the attenuator 1042, the band-pass filter 1043 filters the sine wave voltage having a frequency identical to that of the output voltage of the current/voltage converter 1040. In this embodiment, with respect to the input square wave voltage output from the attenuator 1042, the band-pass filter 1043 outputs a sine wave voltage having an inverted phase (due to the fact that the phases of the input current and the output voltage are inverted by the current/voltage converter 1040) and a constant amplitude with the resonance frequency of the vibrator 1020. Its output waveform is shown in (d) of FIG. 35. In place of the band-pass filter 1043, a low-pass filter may be used. The passing band of the band-pass filter 1043 is determined by resistance values of the resistors 1060 to 1065.

As shown in (d) of FIG. 35, the phase of the sine wave voltage output from the band-pass filter 1043 is shifted and, in general, slightly retarded from the phase at which the amplitude of the vibration of the vibrator 1020 is substantially maximized.

The phase shifter 1044 adjusts the phase of the sine wave voltage, which has been filtered by the band-pass filter 1043, such that the amplitude of the vibration of the vibrator 1020 is substantially maximized. Its output waveform is shown in (e) of FIG. 35. In this embodiment, the band-pass filter 1043 is constituted by an operational amplifier 1067, resistors 1068 and 1069, a variable resistor 1070, and a capacitor 1075, such that the phase of the output waveform can be minutely adjusted as the resistance value of the variable resistor 1070 is adjusted. Though a voltage follower composed of an operational amplifier 1071 is provided between the output side of the band-pass filter 1043 and the input side of the phase shifter 1044 in this embodiment, it may be omitted.

To the output side of the phase shifter 1044, the input side of the voltage follower composed of the operational amplifier 1072 is connected, while the output side of this voltage follower acts as the output terminal of the self-excitation circuit 1021, which is connected to the electrode 1035 of the vibrator 1020. Accordingly, the output of the phase shifter 1044 is supplied to the electrode 1035 by way of the voltage follower so as to provide a positive feedback with the resonance frequency of the vibrator 1020, whereby the vibrator 1020 can be efficiently and correctly driven in a self-excitation manner. Here, the voltage follower composed of the operational amplifier 1072 may be omitted as well, thereby making the output side of the phase shifter 1044 as the output terminal of the self-excitation circuit 1021.

The configurations of the current/voltage converter 1040, zero-cross comparator 1041, attenuator 1042, filter 1043, and phase shifter 1044 should not be restricted to those mentioned above, however.

According to the self-excitation circuit 1021 explained in the foregoing, regardless of the fluctuation in the amplitude of the sine wave voltage ((a) in FIG. 35) which is the output of the current/voltage converter 1040 and indicative of the state of vibration of the vibrator 1020, namely, regardless of the mechanical and electrical unstableness of the vibrator and the influence of Coriolis force, the amplitude of the sine wave voltage (driving voltage), which is the output of the phase shifter 1044 and used as a driving voltage, is securely set to a predetermined level and stabilized. Accordingly, the amplitude of the self-excited vibration of the vibrator 1020 is stabilized, thereby preventing the vibrator 1020 from abnormally oscillating at frequencies other than the resonance frequency thereof.

In the following, with reference to FIG. 32 again, the detection circuit 1022 will be explained. In this embodiment, the detection circuit 1022 comprises a current/voltage converter 1080 and a differential circuit 1081, while the current/voltage converter 1040 is also commonly used as part of the detection circuit 1022. As in the case of the current/voltage converter 1040, the current/voltage converter 1080 is constituted by an operational amplifier 1082, a resistor 1083, and a capacitor 1084. The input side of the current/voltage converter 1080 is connected to the electrode 1034 of the vibrator 1020. The differential circuit 1081 takes out the differential between the outputs of the current/voltage converters 1040 and 1080 and outputs this differential. As can be seen from the explanation previously provided in conjunction with the vibrator 1020, the output of the differential circuit 1081 becomes the signal corresponding to the Coriolis force, namely, the detection signal.

Figure 36:
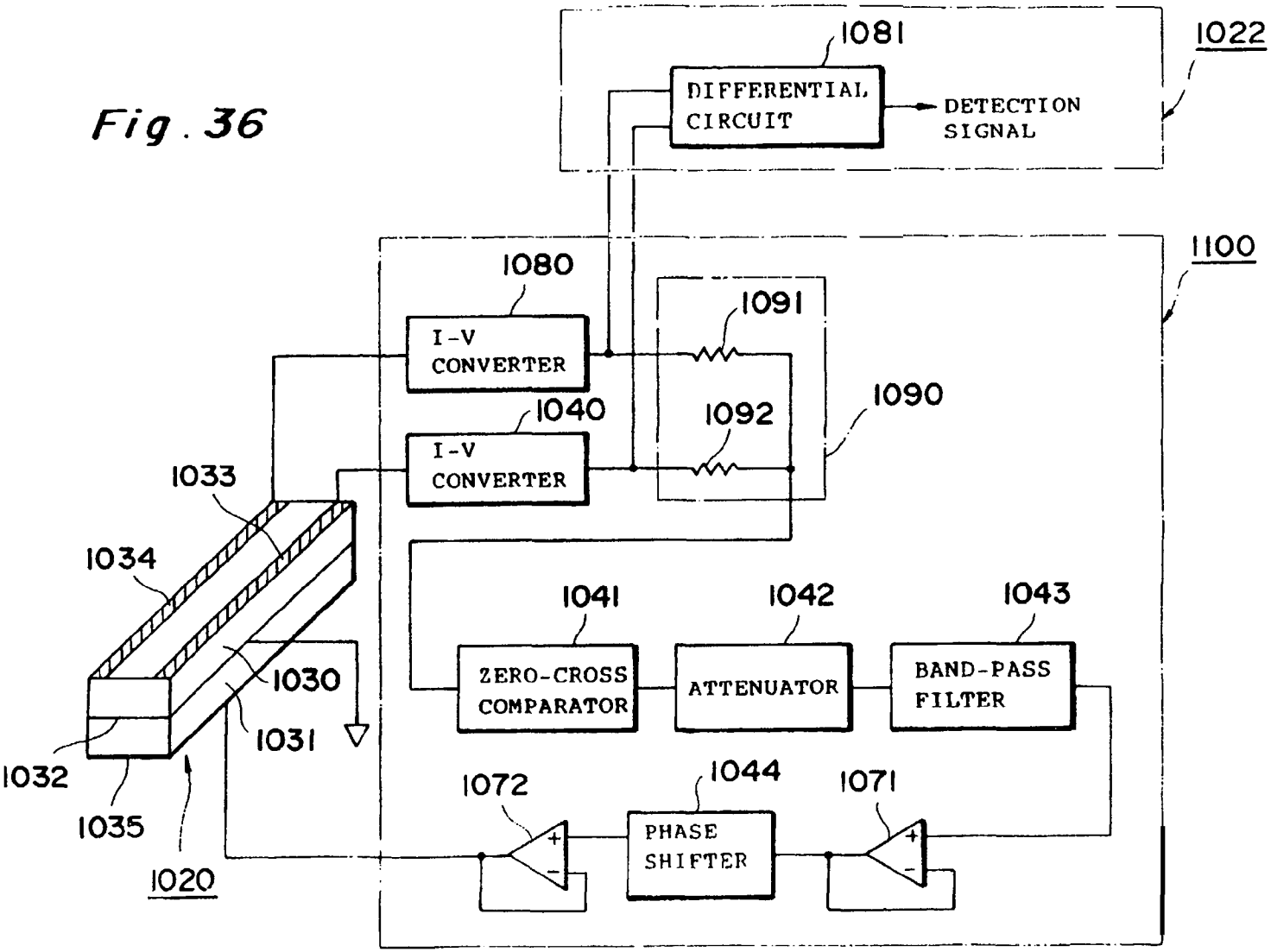
FIG. 36 is a circuit diagram showing a piezoelectric vibrational angular velocity meter in accordance with another embodiment.

FIG. 36 is a circuit diagram showing a piezoelectric vibrational angular velocity meter in accordance with another embodiment. In FIG. 36, constituents identical or corresponding to those shown in FIG. 32 are referred to with marks identical thereto without repeating their explanations.

The piezoelectric vibrational angular velocity meter shown in FIG. 36 differs from that shown in FIG. 32 mentioned above only in the following points. Namely, while the electric current signal is taken out by the current/voltage converter 1040 from only one electrode 1033 in the electrodes 1033 and 1034 of the vibrator 1020 and then converted into a voltage signal so as to be directly input into the zero-cross comparator 1041 in the self-excitation circuit 1021 of the piezoelectric vibrational angular velocity meter shown in FIG. 32, the current/voltage converter 1080 of the detection circuit 1022 is commonly used such that the electric current signals are respectively taken out from the electrodes 1033 and 1034 of the vibrator 1020 by the current/voltage converters 1040 and 1080 and then converted into voltage signals, whose sum (corresponding to the sine wave voltage indicative of the state of vibration of the vibrator 1020 in this embodiment) is formed by an adder 1090 and then input into the zero-cross comparator 1041 in a self-excitation circuit 1100 of the piezoelectric vibrational angular velocity meter shown in FIG. 36. Though the adder 1090 is constituted by resistors 1091 and 1092 in this embodiment, it should not be restricted thereto.

Since the signals corresponding to Coriolis force are generated at the electrodes 1033 and 1034 with phases opposite to each other, the voltage signals output from the respective current/voltage converters 1040 and 1080 are sine waves whose amplitudes change due to the Coriolis force in phases opposite to each other. Accordingly, when the sum of their outputs is formed by the adder 1090, their changes are supposed to be offset against each other, thereby making a constant output regardless of the Coriolis force. Actually, however, due to a slight difference between the areas of the electrodes 1033 and 1034, local positional differences in characteristics of PZT, and other mechanical and electrical unstableness of the vibrator 1020, the output (sum output) of the adder 1090 may not become constant, whereby the amplitude in the output of the adder 1090 may fluctuate.

However, the sine wave voltage signal having thus changed amplitude is input into the zero-cross comparator 1041 such that its output is converted into a rectangular voltage whose amplitude is determined by the power source voltage and thereby does not depend on the amplitude output of the input. The functions of the attenuator 1042, band-pass filter 1043, and phase shifter 1044 subsequent thereto are the same as those in the case of the self-excitation circuit 1021 shown in FIG. 32.

Accordingly, also in this embodiment, the amplitude of the self-excited vibration of the vibrator 1020 is stabilized, thereby preventing the vibrator 1020 from oscillating at frequencies other than the resonance frequency thereof.

Figure 37:
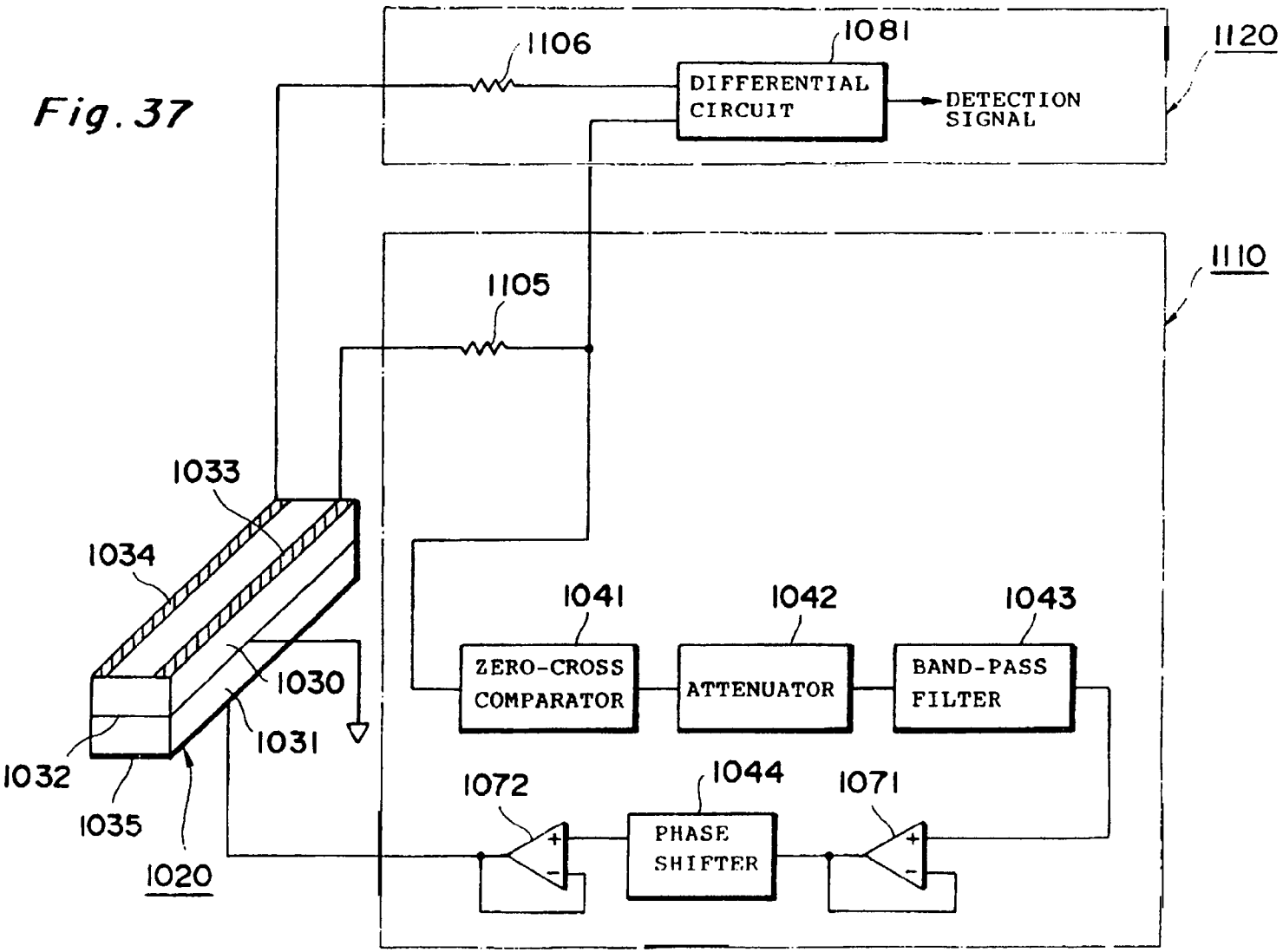
FIG. 37 is a circuit diagram showing a piezoelectric vibrational angular velocity meter in accordance with another embodiment.

In the following, a piezoelectric vibrational angular velocity meter in accordance with another embodiment will be explained with reference to FIG. 37. FIG. 37 is a circuit diagram showing the piezoelectric vibrational angular velocity meter in accordance with this embodiment. In FIG. 37, constituents identical or corresponding to those shown in FIG. 32 are referred to with marks identical thereto without repeating their explanations.

The piezoelectric vibrational angular velocity meter shown in FIG. 37 differs from that shown in FIG. 32 mentioned above only in the following points. Namely, while the input signal from the electrode 1033 of the vibrator 1020 is taken out by the current/voltage converter 1040 as an electric current signal so as to be converted into a voltage signal in the self-excitation circuit 1021 in the piezoelectric angular velocity meter shown in FIG. 32, the input signal from the electrode 1033 of the vibrator 1020 is taken out as a voltage signal by way of a resistor 1105 so as to be input into the zero-cross comparator 1041 in a self-excitation circuit 1110 in the piezoelectric angular velocity meter shown in FIG. 37. Also, consequently, a detection circuit 1120 shown in FIG. 37 takes out the input signal from the electrode 1034 as a voltage signal by way of a resistor 1106. The differential circuit 1081 takes out the differential between the voltage signals from the resistors 1105 and 1106. While the phases of the input electric current and output voltage are inverted with respect to each other in the current/voltage converter 1040 in the self-excitation circuit 1021 in the piezoelectric angular velocity meter shown in FIG. 32, no such inversion of phases occurs in the self-excitation circuit 1110 in the piezoelectric angular velocity meter shown in FIG. 37. Accordingly, the amount of phase adjustment in the phase shifter 1044 in FIG. 37 differs from that in FIG. 32.

Accordingly, also in this embodiment, the amplitude of the self-excited vibration of the vibrator 1020 is stabilized, thereby preventing the vibrator 1020 from oscillating at frequencies other than the resonance frequency thereof.

Figure 38:
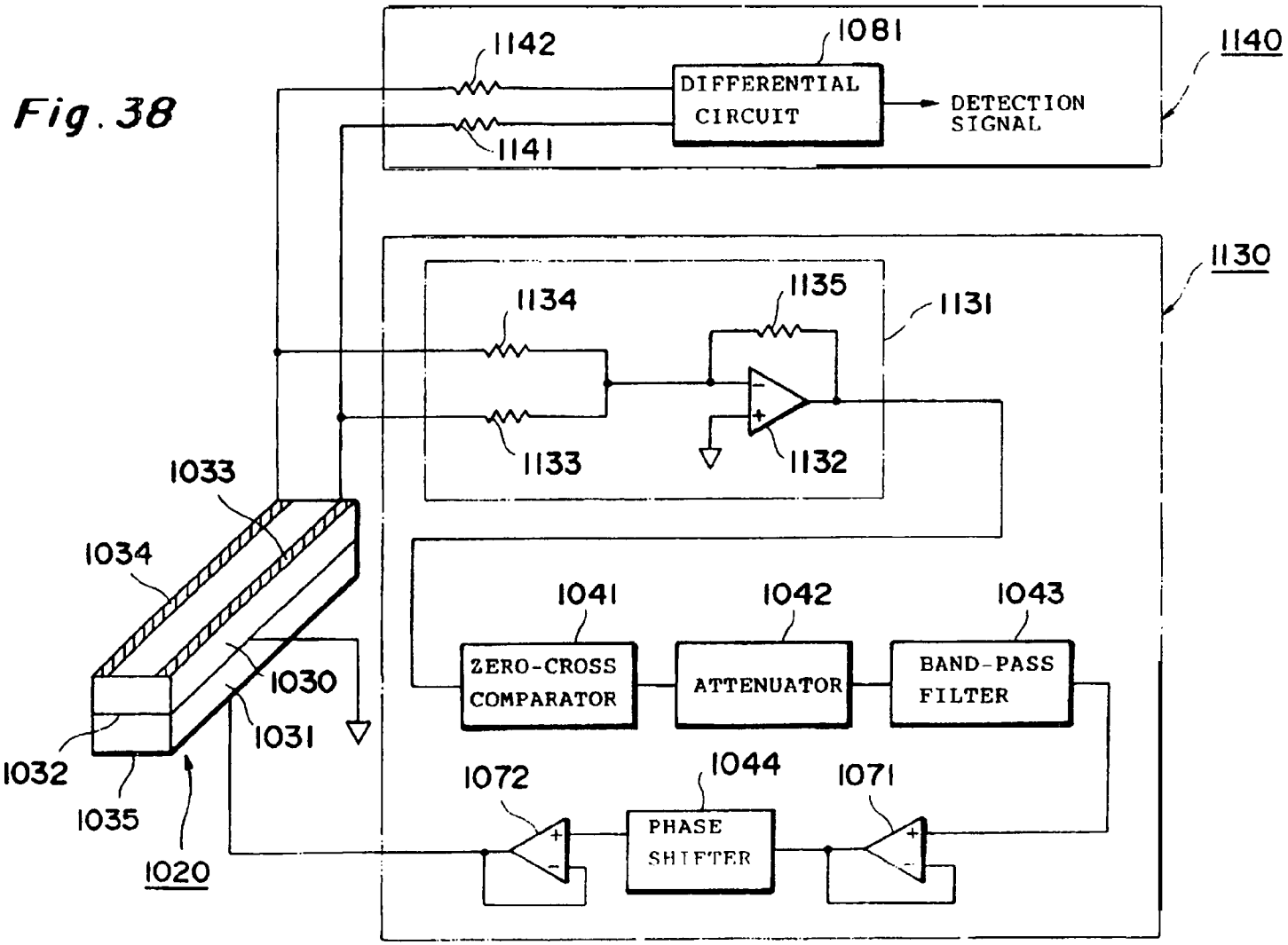
FIG. 38 is a circuit diagram showing a piezoelectric vibrational angular velocity meter in accordance with another embodiment.

In the following, a piezoelectric vibrational angular velocity meter in accordance with another embodiment will be explained with reference to FIG. 38. FIG. 38 is a circuit diagram showing the piezoelectric vibrational angular velocity meter in accordance with this embodiment. In FIG. 38, constituents identical or corresponding to those shown in FIG. 32 are referred to with marks identical thereto without repeating their explanations.

The piezoelectric vibrational angular velocity meter shown in FIG. 38 differs from that shown in FIG. 36 mentioned above only in the following points. Namely, while the current/voltage converters 1040 and 1080 are used to respectively take out the input signals from the electrodes 1033 and 1034 of the vibrator 1020 as current signals and then convert them into voltage signals whose sum is input into the zero-cross comparator 1041 by the adder 1090 in the self-excitation circuit 1100 in the piezoelectric vibrational angular velocity meter shown in FIG. 36, an adder 1131 is used to take out input signals from the electrodes 1033 and 1034 of the vibrator 1020 as voltage signals whose sum is input into the zero-cross comparator 1041 in a self-excitation circuit 1130 in the piezoelectric vibrational angular velocity meter shown in FIG. 38. Also, consequently, in a detection circuit 1140 in FIG. 38, the input signals from the electrodes 1033 and 1034 of the vibrator 1020 are respectively taken out as voltage signals by way of resistors 1141 and 1142, while a differential circuit 1081 takes out the differential between the voltage signals from the resistors 1141 and 1142. Though the adder 1131 is constituted by an operational amplifier 1132 and resistors 1133 to 1135 in this embodiment, it should not be restricted thereto. In this adder 1131, the input voltage and output voltage have phases inverted with respect to each other.

Figure 39:
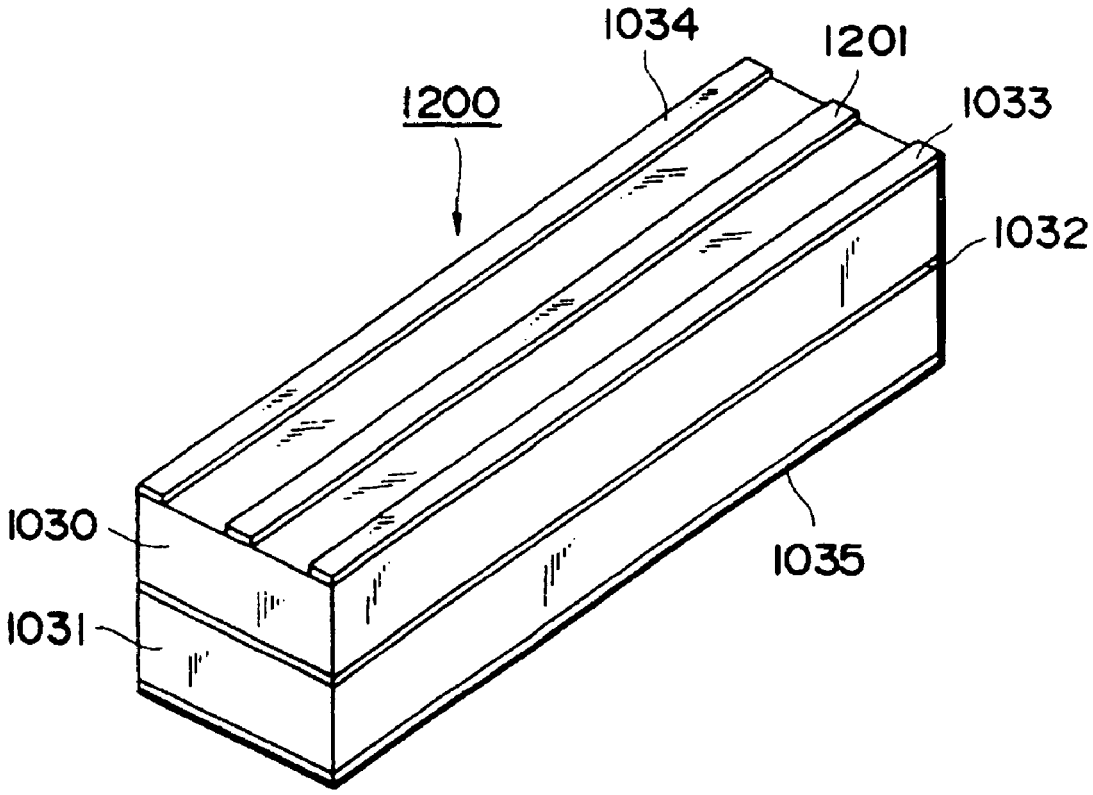
FIG. 39 is a perspective view of a vibrator.
Figure 40:
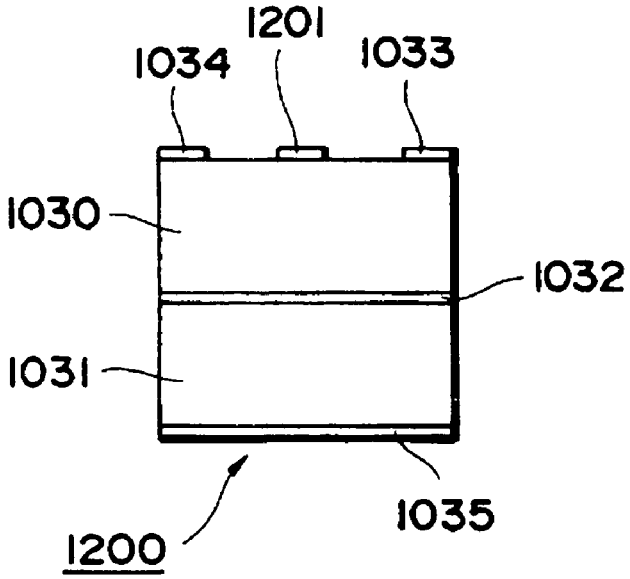
FIG. 40 is a front view of the vibrator shown in FIG. 39.

Next, another example of vibrators used in the piezoelectric vibrational angular velocity meter in accordance with the present invention will be explained with reference to FIGS. 39 and 40. FIG. 39 is a perspective view of this vibrator 1200, whereas FIG. 40 is a front view thereof. In FIGS. 39 and 40, constituents identical to those shown in FIG. 33 are referred to with marks identical thereto without repeating their explanations.

This vibrator 1200 differs from the vibrator 1020 shown in FIG. 33 only in that an electrode 1201 is additionally provided in the vibrator 1200. Namely, in the vibrator 1200, at substantially the center position in the second side surface (upper surface in FIG. 40) of the first member 1030, the electrode 1201 is formed independently from the electrodes 1033 and 1034. In this example, the electrode 1201 is formed by silver paste at the center of the upper surface of the first member 1030 so as to extend in the longitudinal direction thereof with a width of 0.3 mm. Since the electrode 1201 is formed at the center of the upper surface of the first member 1030, its voltage does not fluctuate upon bending vibration of the members 1030 and 1031 in their width direction due to Coriolis force. Also, since it is independent from the electrodes 1033 and 1034, the detection circuit and the self-excitation circuit can be electrically separated from each other, thereby preventing them from interfering with each other.

This vibrator 1200 can be combined with the self-excitation circuits 1021 and 1110 shown in FIGS. 32 and 37, for example. When the vibrator 1200 is combined with the self-excitation circuit 1021 shown in FIG. 32, for example, the electrode 1201 of the vibrator 1200 is connected to the input side of the current/voltage converter 1040, while the electrode 1035 of the vibrator 1200 is connected to the output side of the voltage follower 1072. Also, the electrode 1034 of the vibrator 1200 is connected to the input side of the current/voltage converter 1080 of the detection circuit 1022, while a current/voltage converter (not depicted), which is similar to the current/voltage converter 1080, is added to the detection circuit 1022. The electrode 1033 of the vibrator 1200 is connected to the input side of thus added current/voltage converter. The differential circuit 1081 takes out the differential between the output of the current/voltage converter 1080 and the output of the added current/voltage converter. Similarly, the vibrator 1200 may be combined with the self-excitation circuit 1110 shown in FIG. 37.

Figure 41:
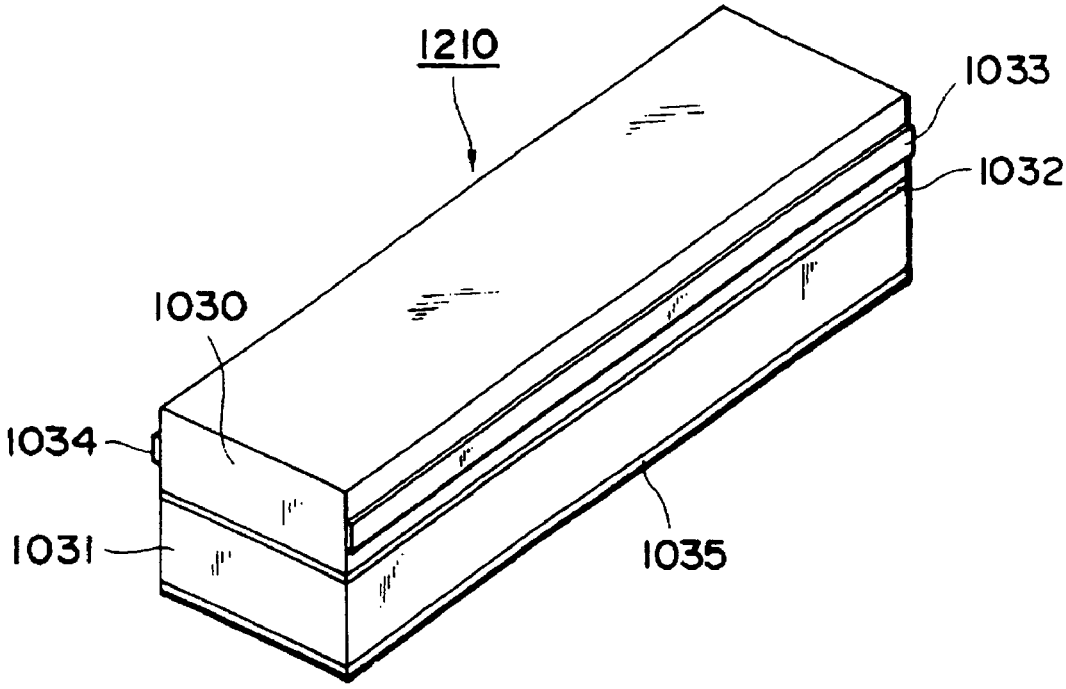
FIG. 41 is a perspective view of a vibrator.

Also, in the piezoelectric vibrational angular velocity meters shown in FIGS. 32, 36, 37, and 38, a vibrator 1210 shown in FIG. 41 may be used in place of the vibrator 1020 shown in FIG. 33.

Figure 42:
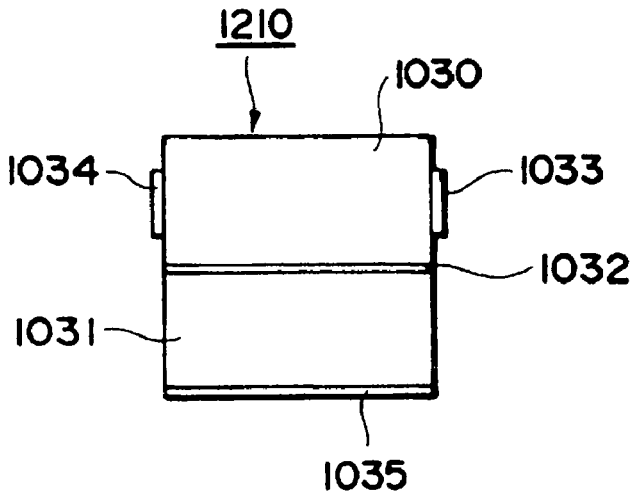
FIG. 42 is a front view of the vibrator shown in FIG. 41.

FIG. 41 is a perspective view of this vibrator 1210, whereas FIG. 42 is a front view thereof. In FIG. 41, constituents identical or corresponding to those shown in FIG. 33 are referred to with marks identical thereto without repeating their explanations.

This vibrator 1210 differs from the vibrator 1020 only in that the electrodes 1033 and 1034 are not formed on the upper surface (second surface) of the first member 1030 but respectively formed at the third and fourth side surfaces of the first member 1030 neighboring the first side surface (lower surface) of the first member 1030. It is clear that the vibrator 1210 is substantially equivalent to the vibrator 1020.

Figure 43:
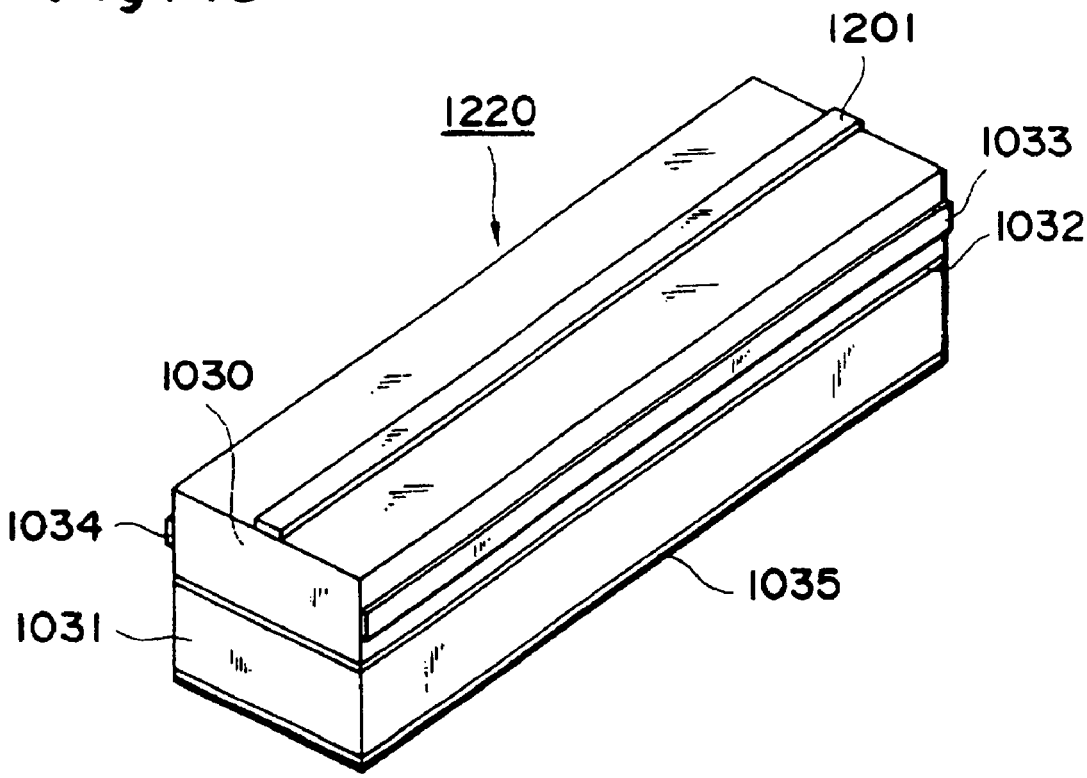
FIG. 43 is a perspective view of a vibrator.
Figure 44:
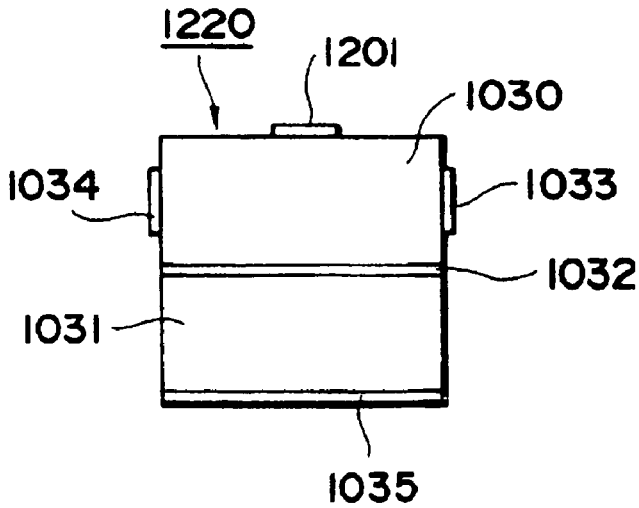
FIG. 44 is a front view of the vibrator shown in FIG. 43.

As in the case of the vibrator 1200 shown in FIG. 39, a vibrator 1220 shown in FIGS. 43 and 44 may be combined with the self-excitation circuits 1021 and 1110 respectively shown in FIGS. 32 and 37.

FIG. 43 is a perspective view of this vibrator 1220, whereas FIG. 44 is a front view thereof. In FIG. 43, constituents identical or corresponding to those shown in FIG. 39 are referred to with marks identical thereto without repeating their explanations.

This vibrator 1220 differs from the vibrator 1200 shown in FIG. 39 only in that the electrodes 1033 and 1034 are not formed on the upper surface (second surface) of the first member 1030 but respectively formed at the third and fourth side surfaces of the first member 1030 neighboring the first side surface (lower surface) of the first member 1030. It is clear that the vibrator 1220 is substantially equivalent to the vibrator 1200.

Figure 45:
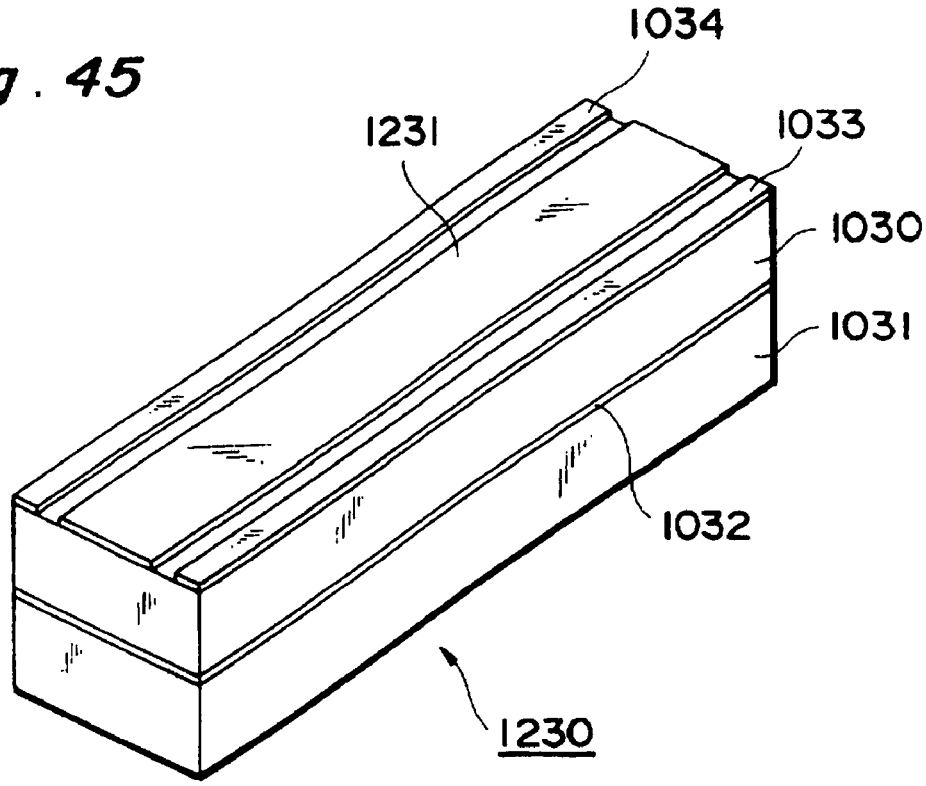
FIG. 45 is a perspective view of a vibrator.

Also, in the piezoelectric vibrational angular velocity meters shown in FIGS. 32, 36, 37, and 38, a vibrator 1230 shown in FIG. 45 may be used in place of the vibrator 1020 shown in FIG. 33.

Figure 46:
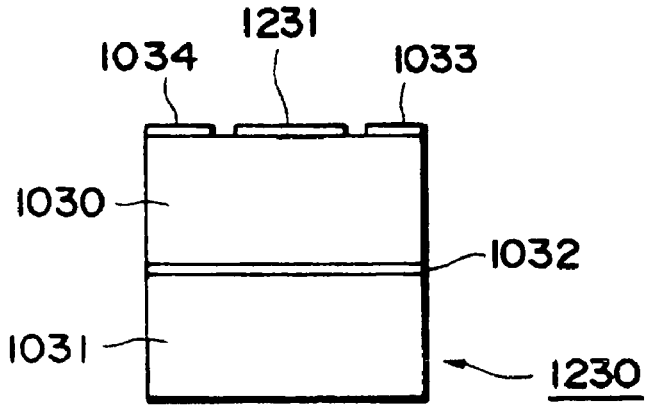
FIG. 46 is a front view of the vibrator shown in FIG. 45.

FIG. 45 is a perspective view of this vibrator 1230, whereas FIG. 46 is a front view thereof. In FIG. 45, constituents identical to those shown in FIG. 33 are referred to with marks identical thereto without repeating their explanations.

This vibrator 1230 differs from the vibrator 1020 only in that the electrode 1035 formed on the second side surface (lower surface in FIG. 46) of the second member 1031 in the vibrator 1020 is omitted and an electrode 1231 is added thereto instead. The electrode 1231 is formed by silver paste at substantially the center position of the second side surface (upper surface in FIG. 46) of the first member 1030 so as to extend in the longitudinal direction of the first member 1030 with a width larger than that of each of the electrodes 1033 and 1034.

While the vibrator 1020 shown in FIG. 33 utilizes the piezoelectric phenomenon of the second member 1031 to excite the vibrator 1020 as a whole, the vibrator 1230 shown in FIG. 45 does not utilize the piezoelectric phenomenon of the second member 1031 at all but utilizes the piezoelectric phenomenon of the first member 1030 alone to not only detect the vibration of the vibrator 1230 but also excite the vibrator 1230 as a whole. Nevertheless, the vibrator 1230 is similar to the vibrator 1020.

Since the vibrator 1230 does not utilize the piezoelectric phenomenon of the second member 1031 at all and thus the second member 1031 is piezoelectrically inactive, not only piezoelectric materials but also inherently piezoelectrically inactive materials such as alumina and glass may be used as the material for the second member 1031.

When this vibrator 1230 is used in the piezoelectric vibrational angular velocity meters shown in FIGS. 32, 36, 37, and 38 in place of the vibrator 1020 shown in FIG. 33, the output terminal of each of the self-excitation circuits 1021, 1100, 1110, and 1130 is connected to the electrode 1231 of the vibrator 1230.

Figure 47:
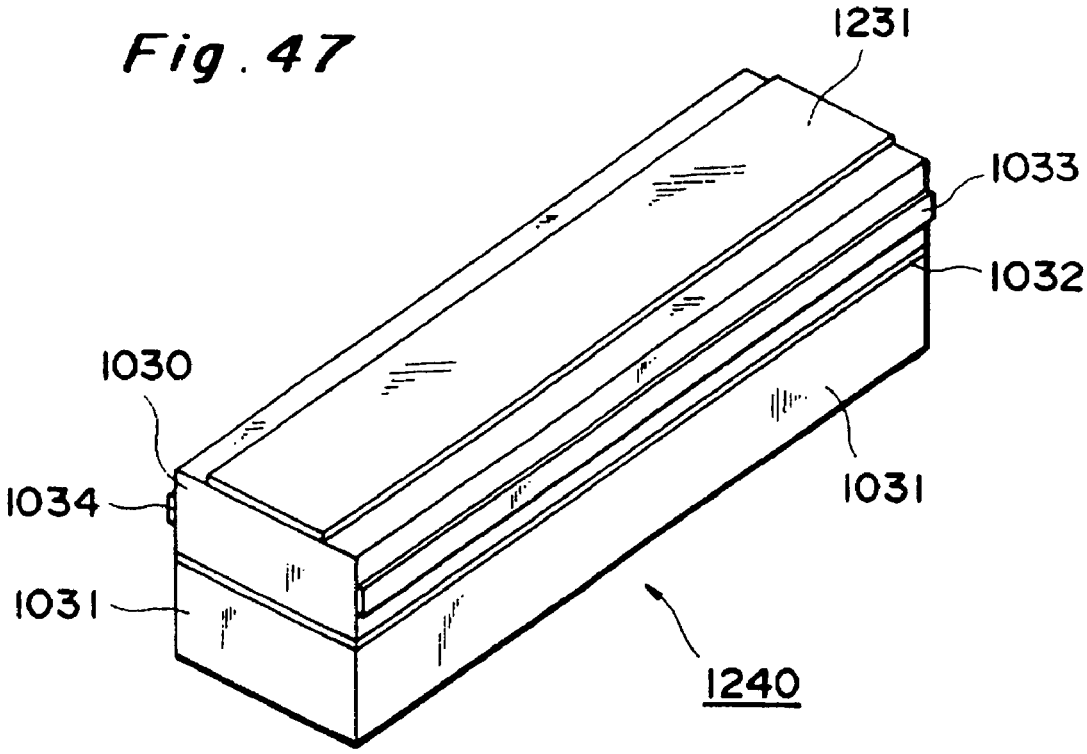
FIG. 47 is a perspective view of a vibrator.
Figure 48:
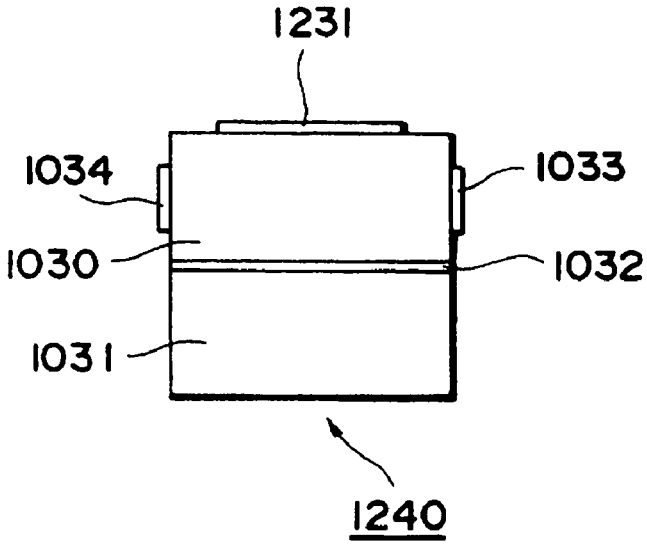
FIG. 48 is a front view of the vibrator shown in FIG. 47.

Also, in the piezoelectric vibrational angular velocity meters shown in FIGS. 32, 36, 37, and 38, a vibrator 1240 shown in FIGS. 47 and 48 may be used in place of the vibrator 1020 shown in FIG. 33.

FIG. 47 is a perspective view of this vibrator 1240, whereas FIG. 48 is a front view thereof. In FIG. 47, constituents identical or corresponding to those shown in FIG. 45 are referred to with marks identical thereto without repeating their explanations.

This vibrator 1240 differs from the vibrator 1230 shown in FIG. 45 only in that the electrodes 1033 and 1034 are not formed on the upper surface (second surface) of the first member 1030 but respectively formed at the third and fourth side surfaces of the first member 1030 neighboring the first side surface (lower surface) of the first member 1030. It is clear that the vibrator 1240 is substantially equivalent to the vibrator 1230.

Figure 49:
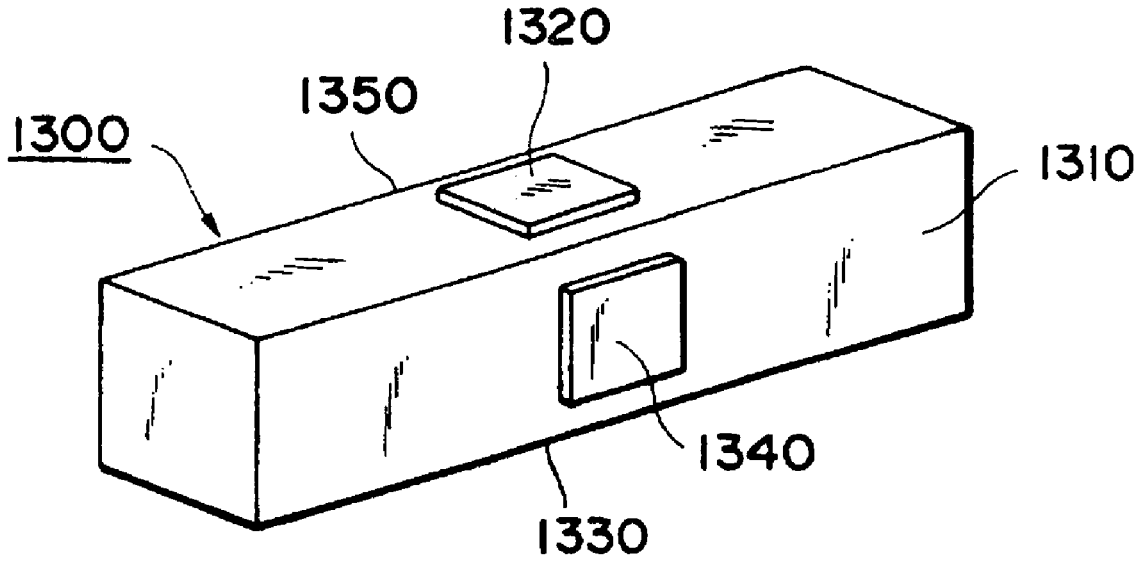
FIG. 49 is a perspective view of a vibrator.
Figure 50:
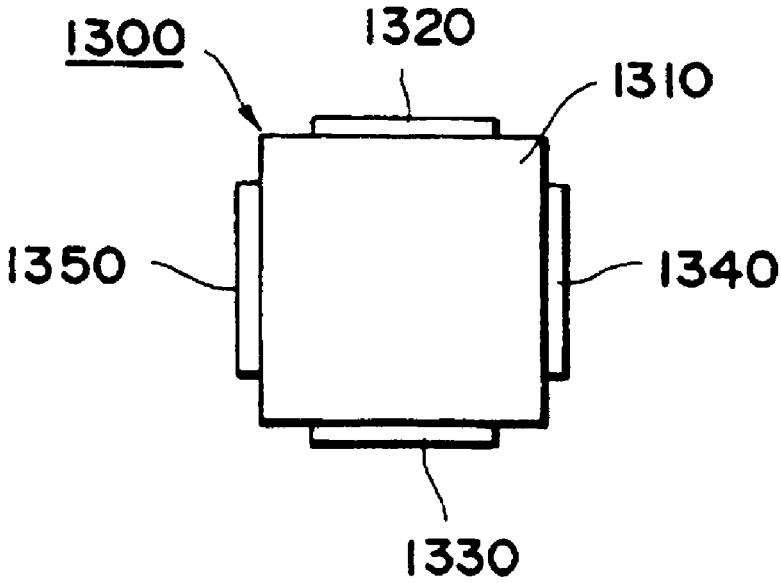
FIG. 50 is a front view of the vibrator shown in FIG. 49.

In the following, a still another example of the vibrator used in the piezoelectric vibrational angular velocity meter in accordance with the present invention will be explained with reference to FIG. 49. FIG. 49 is a perspective view of this vibrator 1300, whereas FIG. 50 is a front view thereof.

In this vibrator 1300, PZT plates (i.e., piezoelectric elements) 1320, 1330, 1340, and 1350, each of which has a length of 1.6 mm, a width of 3 mm, and a thickness of 0.3 mm with electrodes (not depicted) formed by silver paste on both sides thereof are respectively bonded to four side surfaces of a metal pole (column) 1310 made of an elinvar alloy having a square cross section, whose each side is 2 mm, with a length of 15 mm. The sizes of the respective portions should not be restricted to those mentioned above, however.

The PZT plate 1320 is used for exciting the vibrator by an inverse piezoelectric effect, whereas the PZT plate 1330 is used for generating a voltage upon vibration of the vibrator 1300 due to a piezoelectric effect. The PZT plates 1340 and 1350 are used for sensing Coriolis force generated when the vibrator is rotated around an axis which is in parallel to the longitudinal direction thereof so as to have an angular velocity. As the metal pole 1310 is used as an earth electrode, the electrode at the surface of each of the PZT plates 1320, 1330, 1340, and 1350 in contact with the metal pole 1310 has an earth potential. The PZT plate 1320 vibrates due to the sine wave voltage applied thereto. Upon this vibration, the metal pole 1310 vibrates so as to form irregularities in the thickness direction of the PZT plate 1320. The PZT plate 1330 vibrates so as to follow the metal pole 1310, whereby a voltage having a frequency identical to that of the vibration is generated due to a voltage effect. At the Coriolis vibration sensing electrodes 1340 and 1350, voltages corresponding to the Coriolis force are generated in phases inverted with respect to each other with frequencies identical to each other and identical to the frequency of the vibrator.

In the case of this vibrator 1300, the self-excitation circuits shown in FIGS. 32, 36, 37, and 38 may be used. The metal pole 1310, the outer electrodes of the PZT plates 1350 and 1340, and the outer electrode of the PZT plate 1320 may be respectively used as the electrode 1032, electrodes 1033 and 1034, and electrode 1035 of the vibrator 1020. Also, in the case of the self-excitation circuits shown in FIGS. 32 and 38, namely, when one of the PZT plates 1340 and 1350 is used as the comparator input, a similar self-excited driving operation can be effected when the output of the PZT plate 1330 is used in place thereof.

Figure 51:
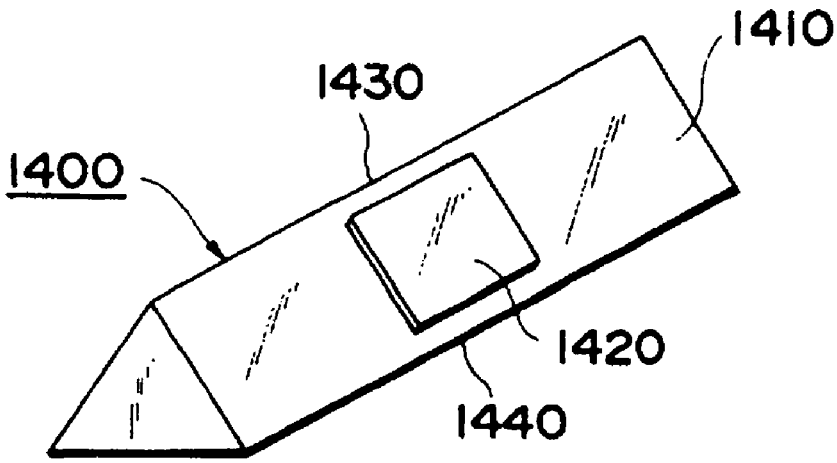
FIG. 51 is a perspective view of a vibrator.
Figure 52:
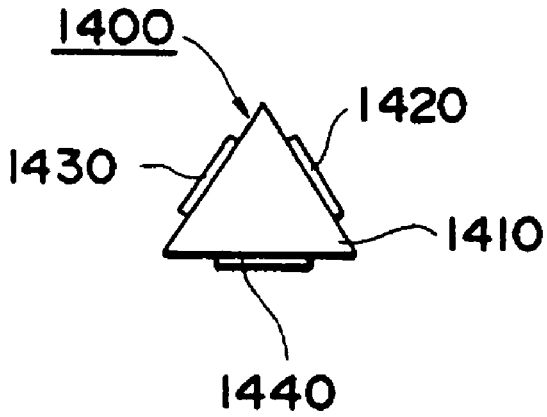
FIG. 52 is a front view of the vibrator shown in FIG. 51.

In the following, a still another example of the vibrator used in the piezoelectric vibrational angular velocity meter in accordance with the present invention will be explained with reference to FIGS. 51 and 52. FIG. 51 is a perspective view of this vibrator 1400, whereas FIG. 52 is a front view thereof.

In this vibrator 1400, PZT plates (i.e., piezoelectric elements) 1420, 1430, and 1440 each of which has a length of 1.4 mm, a width of 3 mm, and a thickness of 0.3 mm with electrodes (not depicted) formed by silver paste on both sides thereof are respectively bonded to three side surfaces of a metal pole (column) 1410 having an equilateral triangular cross section, whose each side is 2 mm, with a length of 15 mm. The sizes of the respective portions should not be restricted to those mentioned above. As in the case of the metal pole 1310 of the vibrator 1300 shown in FIG. 49, a metal material whose modules of elasticity changes little with respect to temperature is preferable as the material for the metal pole 1410.

In the case of this vibrator 1400, the self-excitation circuits shown in FIGS. 32, 36, 37, and 38 may be used as well. The metal pole 1410, the outer electrodes of the PZT plates 1420 and 1430, and the outer electrode of the PZT plate 1440 may be respectively used as the electrode 1032, electrodes 1033 and 1034, and electrode 1035 of the vibrator 1020.

Figure 53:
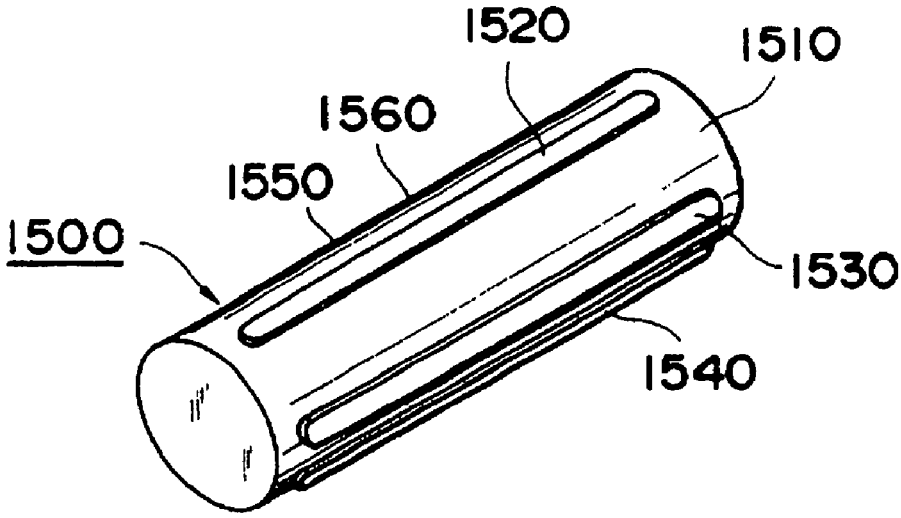
FIG. 53 is a perspective view of a vibrator.

In the following, a still another example of the vibrator used in the piezoelectric vibrational angular velocity meter in accordance with the present invention will be explained with reference to FIGS. 53 and 54. FIG. 53 is a perspective view of this vibrator 1500, whereas FIG. 54 is a front view thereof.

Figure 54:
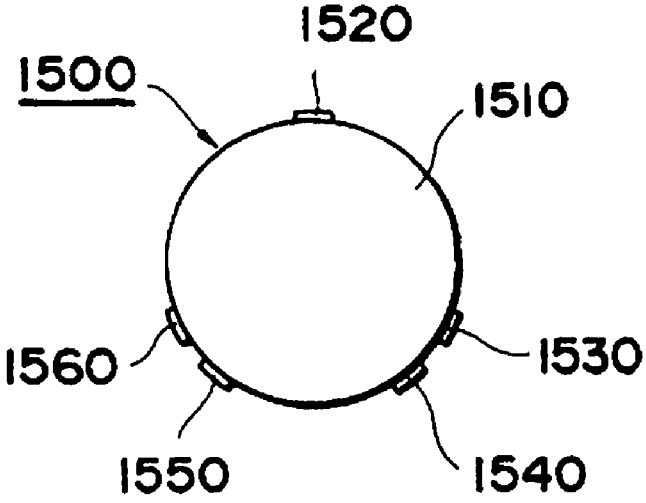
FIG. 54 is a front view of the vibrator shown in FIG. 53.

In this vibrator 1500, band-like electrodes 1520, 1530, 1540, 1550, and 1560 are formed on the side surface of a PZT cylinder 1510 having a diameter of 2 mm and a length of 14 mm so as to extend in the longitudinal direction thereof in parallel to each other as shown in FIG. 54. The sizes of the respective portions should not be restricted to those mentioned above, however.

In the case of this vibrator 1500, the self-excitation circuits shown in FIGS. 32, 36, 37, and 38 may be used as well. The two electrodes 1550 and 1540, the electrodes 1530 and 1560, and the electrode 1520 may be respectively used as the electrode 1032, electrodes 1033 and 1034, and electrode 1035 of the vibrator 1020.

The vibrator used in the piezoelectric vibrational angular velocity meter in accordance with the present invention should not be restricted to the vibrators mentioned above. Also, though the foregoing embodiments refer to the cases where the self-excitation circuit in accordance with the present invention is used for driving the vibrator of the piezoelectric vibrational angular velocity meter in a self-excitation manner, the self-excitation circuit of the present invention can be used for vibrating the vibrator of other apparatuses or the like in a self-excitation manner.

As explained in the foregoing, the above-mentioned piezoelectric vibrational velocity meter can stabilize the driving voltage regardless of the mechanical and electrical unstableness of the vibrator, thereby stabilizing the amplitude of the self-excited vibration of the vibrator while preventing the vibrator from abnormally oscillating at frequencies other than the resonance frequency thereof.

In the following, a piezoelectric vibrational angular velocity meter in accordance with another embodiment will be explained. A piezoelectric vibrational angular velocity meter utilizing normal and inverse piezoelectric effects comprises a vibrator, an excitation driving means for driving the vibrator in an excitation manner, and a detecting means for detecting Coriolis force generated due to a rotation of the vibrator, thereby detecting the Coriolis force generated due to the rotation of the vibrator. The piezoelectric vibrational angular velocity meter is adopted as angular velocity sensor, manual blurring sensor, and the like and has a number of achievements.

Figure 64:
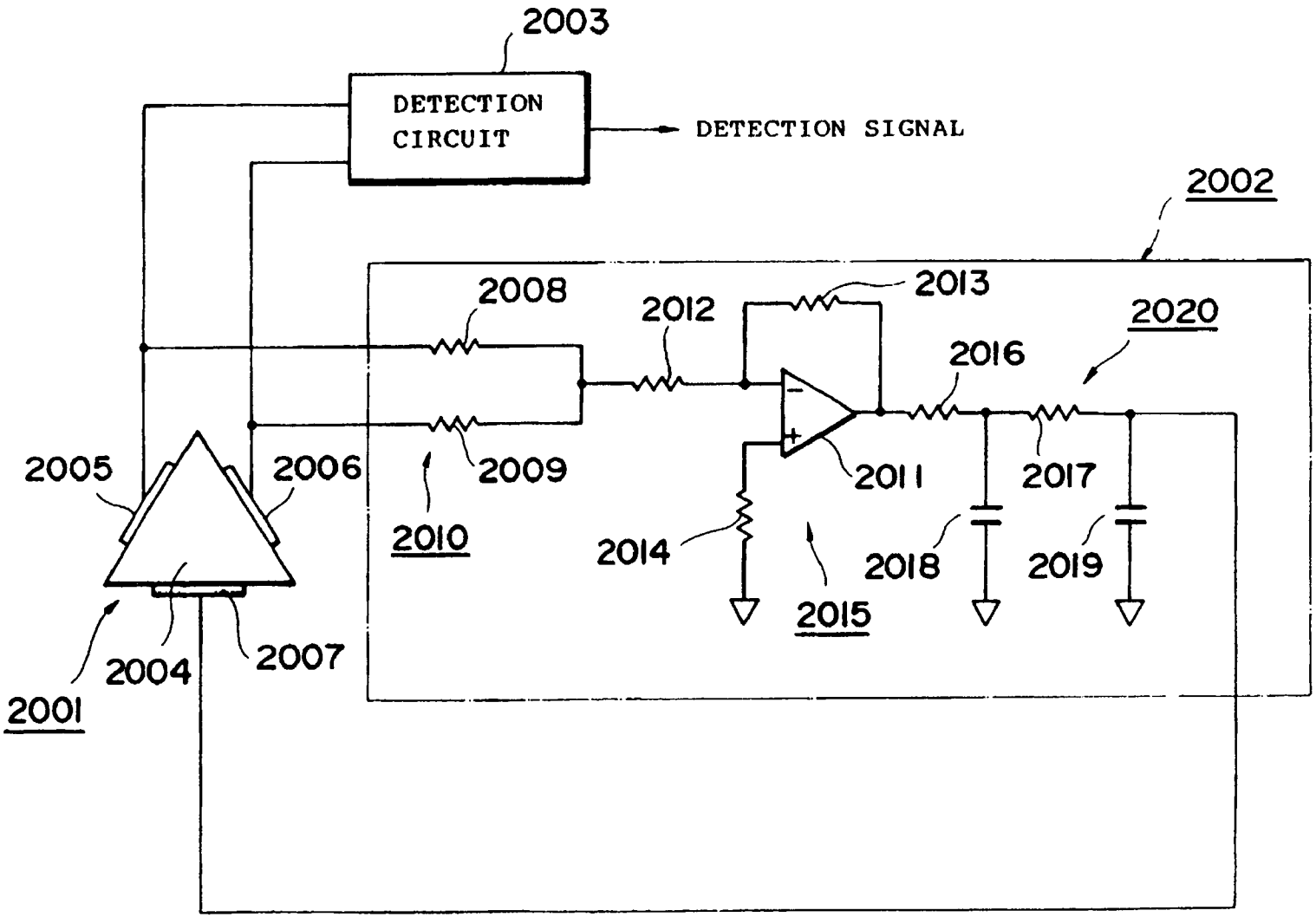
FIG. 64 is a circuit diagram showing a comparative piezoelectric vibrational angular velocity meter.

FIG. 64 shows a comparative piezoelectric vibrational angular velocity meter. This piezoelectric vibrational angular velocity meter comprises a vibrator 2001. a self-excitation driving circuit 2002 for driving the vibrator 2001 in a self-excitation manner, and a detection circuit 2003 for detecting, based on a signal from the vibrator 2001, the detection signal corresponding to Coriolis force acting on the vibrator 2001.

In the vibrator 2001, piezoelectric elements 2005, 2006, and 2007 each of which has electrodes (not depicted) respectively formed on both sides thereof are attached to respective side surfaces of a vibration substrate 2004 formed as an equilateral triangular pole made of an elinvar alloy. The two piezoelectric elements 2005 and 2006 are used for detection, whereas the remaining piezoelectric element 2007 is used for driving.

The two input terminals of the detection circuit 2003 are respectively connected to the piezoelectric elements 2005 and 2006. Also, the two input terminals of the self-excitation driving circuit 2002 are respectively connected to the piezoelectric elements 2005 and 2006, while the output terminal thereof is connected to the piezoelectric element 2007.

The self-excitation driving circuit 2002 is constituted by an adder circuit 2010 composed of two resistors 2008 and 2009; an inverting amplifier 2015 composed of an operational amplifier 2011 and resistors 2012 to 2014; and a low-pass filter 2020 composed of two steps of RC filters formed by resistors 2016 and 2017 and capacitors 2018 and 2019.

The output voltages from the piezoelectric elements 2005 and 2006 are added together at the adder 2010 and then inversely amplified by the inverting amplifier 2015. The phase of thus amplified voltage is adjusted by the low-pass filter 2020 so as to be supplied to the piezoelectric element 2007 as a driving voltage. Consequently, a positive feedback is provided so as to attain a loop gain of 1 or higher, whereby the vibrator 2001 is driven in a self-excitation manner.

The detection circuit 2003 takes out the differential between the output voltages from the piezoelectric elements 2005 and 2006, for example, so as to attain the detection signal corresponding to the Coriolis force acting on the vibrator 2001.

In this piezoelectric vibrational angular velocity meter, however, since only the self-excitation driving circuit 2002 is used as an excitation driving circuit for driving the vibrator 2001 in an excitation manner, the rise time after the self-excitation driving circuit 2001 is started till the amplitude of vibration of the vibrator 2001 attains a measurable amplitude (stationary state) is long.

In particular, since the piezoelectric constant of the piezoelectric material forming the vibrator 2001 is highly dependent on temperature, it greatly varies upon temperature in this piezoelectric vibrational angular velocity meter. When the environmental temperature in use is low, for example, at a temperature not higher than 0° C., the rise time for the vibrator 2001 becomes remarkably long.

Accordingly, in cases where this piezoelectric angular velocity meter 2001 is used for measuring Coriolis force in real time, for example, in order to detect manual blurring of a still camera and vibrations other than the manual blurring, a time lag may occur in the measured value when the measurement is effected after the stationary state is attained or reproducibility cannot be attained when the measurement is effected before the stationary state is achieved. Accordingly, it has not been suitable for the measurement in which a rapid rise time is required.

Figure 65:
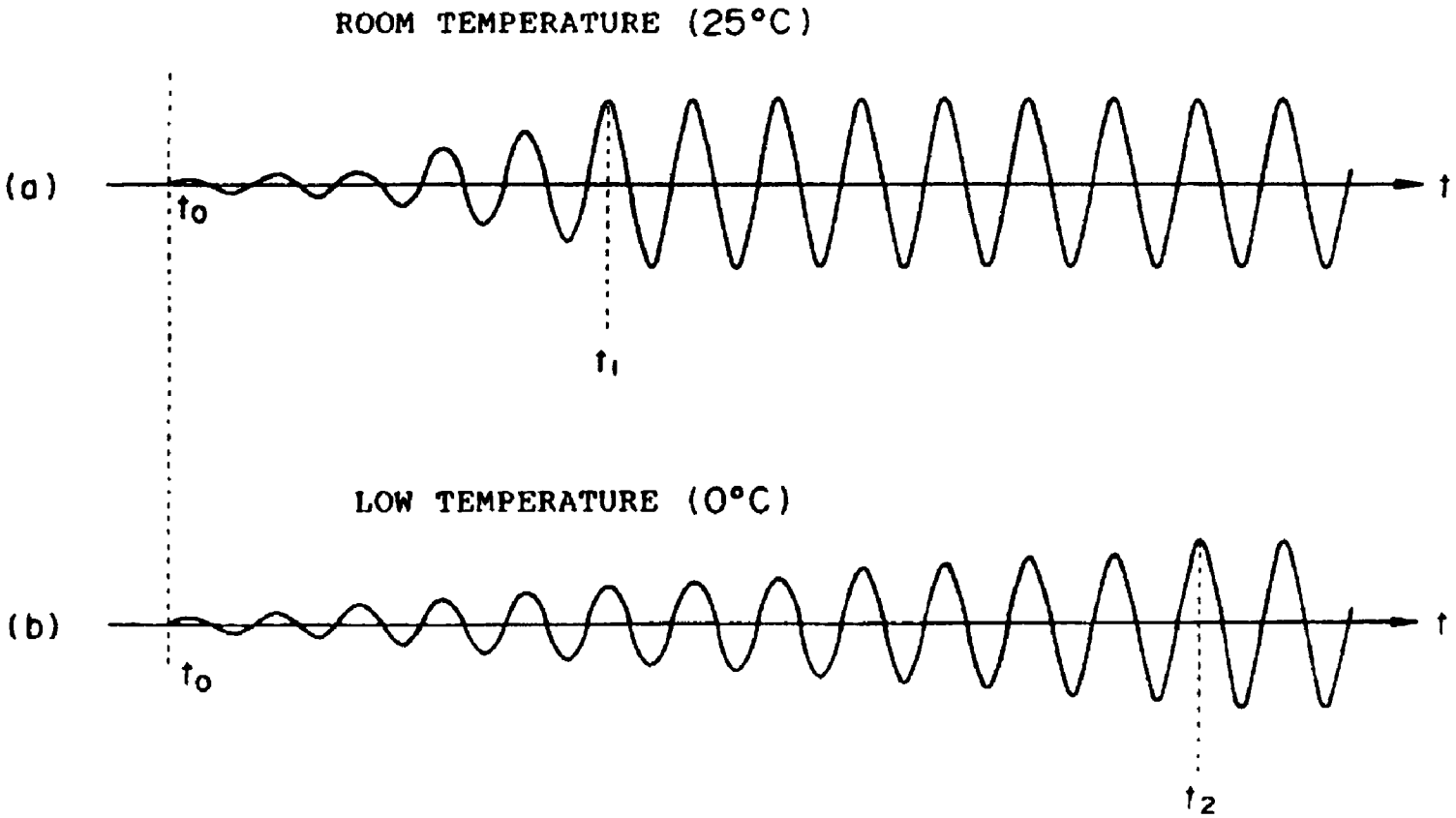
FIG. 65 shows output waveforms of the self-excitation driving circuit in the piezoelectric vibrational angular velocity meter shown in FIG. 64.

In FIG. 65, (a) shows the output waveform of the self-excitation driving circuit 2002 (i.e., state of vibration of the vibrator 2001) at room temperature (25° C.), whereas (b) shows that at a low temperature (0° C.). At room temperature, when started at time $t_0$, the amplitude gradually increases till time $t_1$ and becomes constant thereafter, thereby attaining a stationary state. At a low temperature, on the other hand, the amplitude gradually increases till time $t_2(>t_1)$ and becomes constant thereafter, thereby attaining a stationary state. From FIG. 65, it can be seen that the rise time $t_0$ to $t_2$ of the vibrator 2001 at a low temperature is much longer than the rise time $t_0$ to $t_1$ of the vibrator 2001 at room temperature.

In view of such circumstances, the following embodiments provide excitation driving circuits and methods as well as piezoelectric vibrational angular velocity meters using the same by which the rise time for the vibrator can be reduced. First, the outline of the embodiments will be explained.

The excitation driving circuit of the first embodiment is an excitation driving circuit for driving a vibrator in an excitation manner and comprises a self-excitation driving circuit for driving the vibrator in a self-excitation manner and a forced excitation circuit CV for forcibly driving the vibrator PED1 when started.

The excitation driving circuit of the second embodiment further comprises, in the excitation driving circuit of the first embodiment, a means by which, when an amplitude level of a signal indicative of the state of vibration of the vibrator becomes a predetermined level or higher, the excited driving of the vibrator by the forced excitation driving circuit is nullified while only the excited driving of the vibrator by the self-excitation driving circuit is made effective.

The excitation driving circuit of the third embodiment further comprises, in the excitation driving circuit of the first embodiment, a means by which, after a predetermined time has passed from the starting time, the excited driving of the vibrator by the forced excitation driving circuit is nullified while only the excited driving of the vibrator by the self-excitation driving circuit is made effective.

The excitation driving circuit of the fourth embodiment is an excitation driving circuit for driving a vibrator in an excitation manner and comprises a self-excitation driving circuit for driving the vibrator in a self-excitation manner and a pulse signal applying means for forcibly applying a predetermined pulse to an input portion of the self-excitation driving circuit when started.

The excitation driving circuit of the fifth embodiment further comprises, in the excitation driving circuit of the fourth embodiment, a means by which, when an amplitude level of a signal indicative of the state of vibration of the vibrator becomes a predetermined level or higher, the application of the pulse signal by the pulse signal applying means is nullified.

The excitation driving circuit of the sixth embodiment further comprises, in the excitation driving circuit of the fifth embodiment, a means by which, after a predetermined time has passed from the starting time, the application of the pulse signal by the pulse signal applying means is nullified.

The piezoelectric vibrational angular velocity meter of the seventh embodiment is a piezoelectric vibrational angular velocity meter comprising a vibrator and wherein the excitation driving circuit is that in accordance with one of the first to sixth embodiments.

The excitation driving method in accordance with the eighth embodiment is an excitation driving method for driving a vibrator in an excitation manner, wherein, after the vibrator is forcibly driven in an excitation manner when started, the vibrator is driven in an self-excitation manner.

According to the excitation driving circuits of the first to third embodiments of the present invention, while the vibrator is driven in a self-excitation manner by the self-excitation driving circuit, it is forcibly driven in an excitation manner by the forced excitation driving circuit when started. Accordingly, the rise time of the vibrator can be reduced as compared with the conventional cases. Therefore, Coriolis force can be appropriately measured in real time in such cases as detection of manual blurring of still camera or vibration other than the manual blurring.

Though the forced excited vibration of the vibrator by the forced excitation driving circuit is important for reducing the rise time of the vibrator when started, it is unnecessary and may rather deteriorate the self-excitation of the vibrator after the vibration of the vibrator has reached its stationary state. Accordingly, it is preferable that, when the vibration of the vibrator attains the stationary state or a state in the proximity thereof, the excited driving of the vibrator by the forced excitation driving circuit be nullified while the excited driving of the vibrator by the self-excitation circuit alone be made effective. In this case, the excited driving of the vibrator by the forced excitation driving circuit may be nullified while the excited driving of the vibrator by the self-excitation circuit alone is made effective when the amplitude level of the signal indicative of the state of vibration of the vibrator is at a predetermined level or higher as in the case of the excitation driving circuit of the second embodiment. Alternatively, the excited driving of the vibrator by the forced excitation driving circuit may be nullified while the excited driving of the vibrator by the self-excitation circuit alone is made effective after a predetermined time has passed from the starting time as in the case of the excitation driving circuit of the third embodiment.

Also, in the excitation driving circuits of the fourth to sixth embodiments, no forced excitation driving circuit is provided independently from the self-excitation driving circuit. However, the pulse signal applying means applies a predetermined pulse signal to the input portion of the self-excitation circuit when started. Due to this predetermined pulse signal, the self-excitation driving circuit operates as the forced excitation driving circuit. Namely, while a signal from the vibrator indicative of the state of vibration thereof is normally applied to the self-excitation driving circuit such that the vibrator is driven by the self-excitation driving circuit in a self-excitation manner, at the time of starting, the predetermined pulse signal is input to the input portion of the self-excitation driving circuit such that the vibrator is forcibly excited by the self-excitation driving circuit. Accordingly, the rise time of the vibrator can be reduced by the excitation driving circuits of the fourth to sixth embodiments as well.

Also, as mentioned above, the forced excited driving of the vibrator is unnecessary and may rather deteriorate the self-excitation of the vibrator after the vibration of the vibrator has reached its stationary state. Accordingly, it is preferable that, when the vibration of the vibrator attains the stationary state or a state in the proximity thereof, the forced excited driving of the vibrator be nullified while the self-excited driving of the vibrator alone be made effective. In this case, the application of the pulse signal by the pulse signal applying means may be nullified when the amplitude level of the signal indicative of the state of vibration of the vibrator is at a predetermined level or higher as in the case of the excitation driving circuit of the fifth embodiment. Alternatively, the application of the pulse signal by the pulse signal applying means may be nullified after a predetermined time has passed from the starting time as in the case of the excitation driving circuit of the sixth embodiment.

Also, according to the piezoelectric vibrational angular velocity meter of the seventh embodiment, since it has the excitation driving circuit of any of the first to sixth embodiments, the rising time of the vibrator is reduced. Accordingly, Coriolis force can be appropriately measured in real time in such cases as detection of manual blurring of still camera or vibration other than the manual blurring.

Further, according to the excitation driving method of the eighth embodiment, since the vibrator is forcibly driven in an excitation manner when started and then driven in a self-excitation manner, the rise time for the vibrator can be reduced as in the case of the excitation driving circuits of the first to sixth embodiments. In the following, the foregoing embodiments of the present invention will be explained in further detail with reference to the drawings.

In the following, the excitation driving circuits and methods as well as the piezoelectric vibrational angular velocity meters using the same will be explained in further detail with reference to the drawings.

Figure 56:
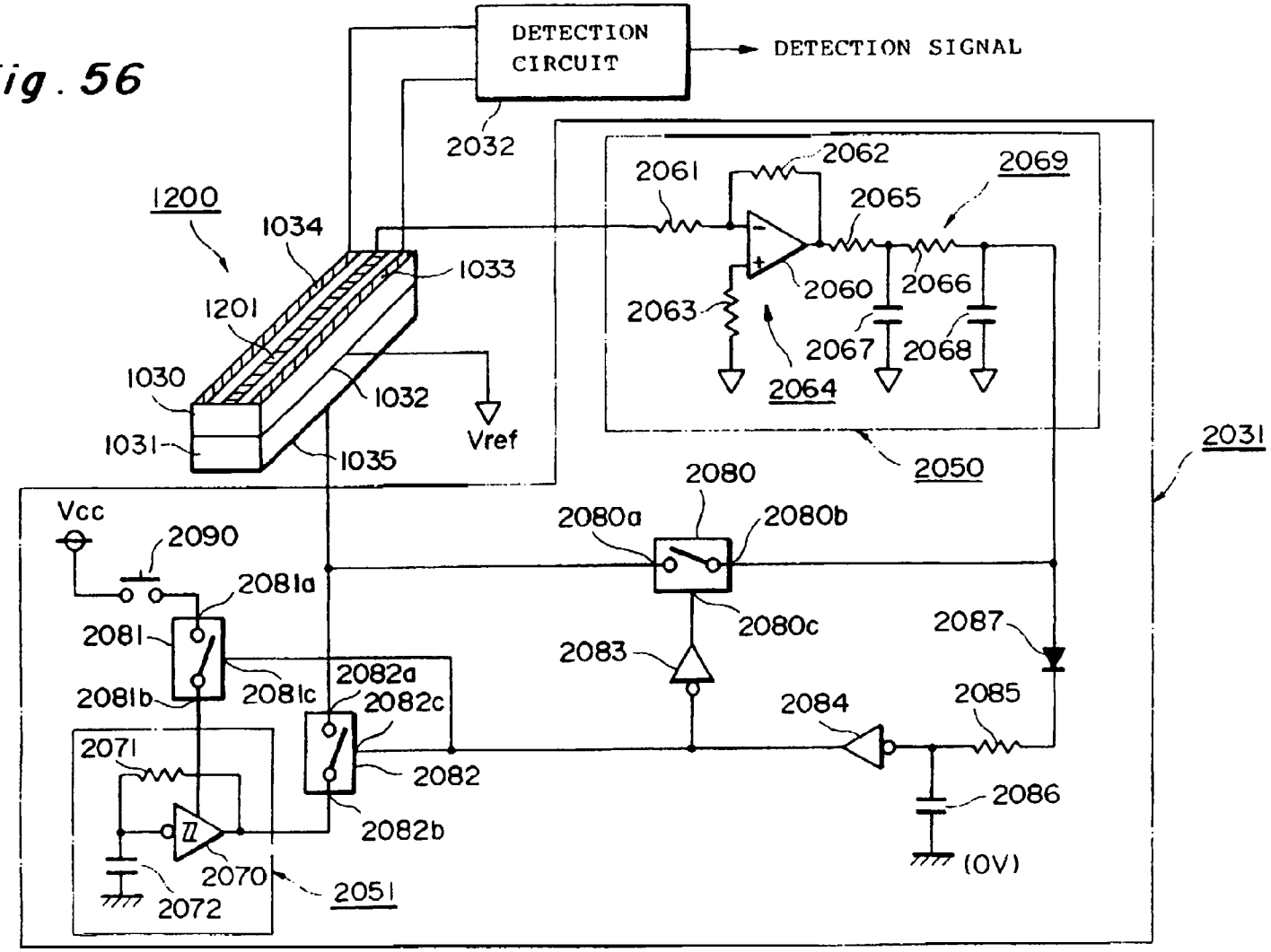
FIG. 56 is a circuit diagram of a piezoelectric vibrational angular velocity meter.

FIG. 56 is a circuit diagram of a piezoelectric vibrational angular velocity meter in accordance with an embodiment.

As shown in FIG. 56, this piezoelectric vibrational angular velocity meter comprises a vibrator 1200, an excitation driving circuit 2031 for driving the vibrator 1200 in an excitation manner, and a detection circuit 2032 which attains, based on an input signal from the vibrator 1200, a detection signal corresponding to Coriolis force acting on the vibrator 1200.

First, the vibrator 1200 is shown in FIGS. 39 and 40. The configuration of the vibrator 1200 is identical to that of the vibrator PED1 shown in FIG. 1. In order for the vibrator 1200 to effectively vibrate upon application of a driving voltage thereto and to yield a large voltage generated due to the vibration thereof, a piezoelectric material having a large Q value is selected as the material for each of the members 1030 and 1031. Also, it is preferable for the vibrator 1200 to have resonance frequencies in its thickness direction and width direction substantially coincide with each other. When they coincide with each other, the vertical cross section of the vibrator 1200 becomes substantially square. For example, this frequency matching operation is effected as, while the vibrator 1200 is vibrated, its side surface is shaven with laser or the like so as to adjust the resonance frequency.

With reference to FIG. 56 again, the two input terminals of the detection circuit 2032 are respectively connected to the electrodes 1034 and 1033. The detection circuit 2032 takes out the differential between the output voltages from the electrodes 1033 and 1034, for example, to attain a detection signal corresponding to the Coriolis force acting on the vibrator 1200. The detection circuit 2032 is configured, for example, similarly to the conventional detection circuit.

Next, the excitation driving circuit 2031 will be explained with reference to FIG. 56.

The excitation driving circuit 2031 comprises a self-excitation driving circuit 2050 for driving the vibrator 1200 in a self-excitation manner and a forced excitation circuit 2051 for forcibly driving the vibrator 1200 in an excitation manner when started.

The input terminal of the self-excitation driving circuit 2050 is connected to the electrode 1201 of the vibrator 1200, whereas the output terminal of the self-excitation driving circuit 2050 is connected to the electrode 1035 of the vibrator 1200 by way of an analog switch 2080 as will be explained later. The self-excitation driving circuit 2050 is constituted by an inverting amplifier 2064 composed of an operational amplifier 2060 and resistors 2061 to 2063 and a low-pass filter 2069 composed of two steps of RC filters comprising resistors 2065 and 2066 and capacitors 2067 and 2068. The configuration of the self-excitation driving circuit 2050 should not be restricted thereto, however. The output voltage from the electrode 1201 is inversely amplified by the inverting amplifier 2064. The phase of thus amplified voltage is adjusted by the low-pass filter 2069. When the analog switch 2080 is on, thus phase-adjusted voltage is supplied to the electrode 1035 as a driving voltage by way of the analog switch 2080. As a result, a positive feedback is provided so as to attain a loop gain of 1 or higher, whereby the vibrator 1200 is driven in a self-excitation manner. According to this self-excitation driving circuit 2050, simple harmonic oscillation of the vibrator 1200 with bending in the direction (thickness direction) perpendicular to the surfaces of the electrodes 1034 and 1033 can be attained.

As mentioned previously, the electrode 1032 of the vibrator 1200 is used as a reference electrode so as to be maintained at potential $V_{ref}$(=$V_{CC}$/2, e.g., 2.5 V) by means of a power source circuit which is not depicted. Here, $V_{CC}$ indicates a power source voltage (e.g., 5 V).

On the other hand, the forced excitation driving circuit 2051 is constituted by an oscillation circuit comprising a Schmitt trigger inverter 2070, a resistor 2071, and a capacitor 2072. The configuration of the forced excitation driving circuit 2051 should not be restricted thereto, however. When both of a power switch 2090 (corresponding to a start switch, contact, or the like in this embodiment) and an analog switch 2080, which will be explained later, are on, the power source voltage $V_{CC}$ is supplied to the power source terminal of the Schmitt trigger inverter 2070 and thus the forced excitation driving circuit 2051 performs an oscillating operation, whereby an oscillation output pulse is attained from the output terminal of the Schmitt trigger inverter 2070. The values of the resistor 2071 and capacitor 2072 are selected such that the oscillation frequency substantially coincides with the mechanical resonance frequency of the vibrator 1200. Also, the output terminal of the Schmitt trigger inverter 2070 (output terminal of the forced excitation driving circuit 2051) is connected to the electrode 1035 of the vibrator 1200 by way of an analog switch 2082 which will be explained later. When the analog switch 2082 is on, the oscillation output pulse is supplied to the electrode 1035 as a driving voltage by way of the analog switch 2082.

Further, as shown in FIG. 56, the excitation driving circuit 2031 has the analog switches 2080, 2081, and 2082, inverters 2083 and 2084, a resistor 2085, a capacitor 2086, and a diode 2087. In the analog switches 2080, 2081, and 2082, the junctions between terminals 2080a and 2080b, between 2081a and 2081b, and between 2082a and 2082b are respectively turned on and off when high and low level signals are applied to control terminals 2080c, 2081c, and 2082c, respectively. Between the output terminal of the self-excitation driving circuit 2050 and the earth (0 V), the diode 2087, the resistor 2085, and the capacitor 2086 are connected in series. Here, the resistor 2085 and capacitor 2086 constitute an RC low-pass filter. The middle point (output terminal of the RC low-pass filter) in the connection between the resistor 2085 and capacitor 2086 is connected to the input terminal of the inverter 2084. The output terminal of the inverter 2084 is connected to the input terminal of the inverter 2083. The output terminal of the inverter 2083 is connected to the control terminal 2080c of the analog switch 2080. The output terminal of the inverter 2084 is also connected to the respective control terminals 2081c and 2082c of the analog switches 2081 and 2082.

In this embodiment, the analog switches 2080, 2081, and 2082, inverters 2083 and 2084, resistor 2085, capacitor 2086, and diode 2087 constitute a means by which, when the amplitude level of a signal indicative of the state of vibration of the vibrator 1200 becomes a predetermined level or higher, the excited driving of the vibrator 1200 by the forced excitation driving circuit 2051 is nullified while the excited driving of the vibrator 1200 by the self-excitation driving circuit 2050 alone is made effective. Namely, by way of the diode 2087 and resistor 2085, the capacitor 2086 is charged with the output of the forced excitation driving circuit 2051 as the signal indicative of the state of vibration of the vibrator 1200. The charged voltage (output of the RC low-pass filter constituted by the resistor 2085 and capacitor 2086) corresponds to the amplitude level of the output of the self-excitation driving circuit 2050. Until the level of thus charged voltage reaches a threshold value $V_{TH1}$ of the inverter 2084 (the level of the charged voltage being set so as to reach the threshold value $V_{TH1}$ of the inverter 2084 when the output of the forced excitation driving circuit 2051 substantially attains its stationary state, i.e., when the vibration of the vibrator 1200 substantially attains its stationary state), the outputs of the inverter 2084 and 2083 are respectively set to high and low levels. Consequently, the analog switch 2080 is turned off, while the analog switches 2081 and 2082 are turned on, whereby the excited driving of the vibrator 1200 by the forced excitation driving circuit 2051 is made effective while the excited driving of the vibrator 1200 by the self-excitation driving circuit 2050 is nullified. Then, after the level of the charged voltage of the capacitor 2086 has reached the threshold value $V_{TH1}$ of the inverter 2084, the outputs of the inverter 2084 and 2083 are respectively set to low and high levels. Consequently, the analog switch 2080 is turned on, while the analog switches 2081 and 2082 are turned off, whereby the excited driving of the vibrator 1200 by the forced excitation driving circuit 2051 is nullified while the excited driving of the vibrator 1200 by the self-excitation driving circuit 2050 alone is made effective. Though the output of the self-excitation driving circuit 2050 is used as the signal indicative of the state of vibration of the vibrator 1200 in this embodiment, the signal derived from the electrode 1201, for example, may be used therefor as well.

Next, with reference to the timing chart shown in FIG. 57, the operation of the piezoelectric vibrational angular velocity meter in accordance with this embodiment, in particular, that of the excitation driving circuit 2031, will be explained.

Figure 57:
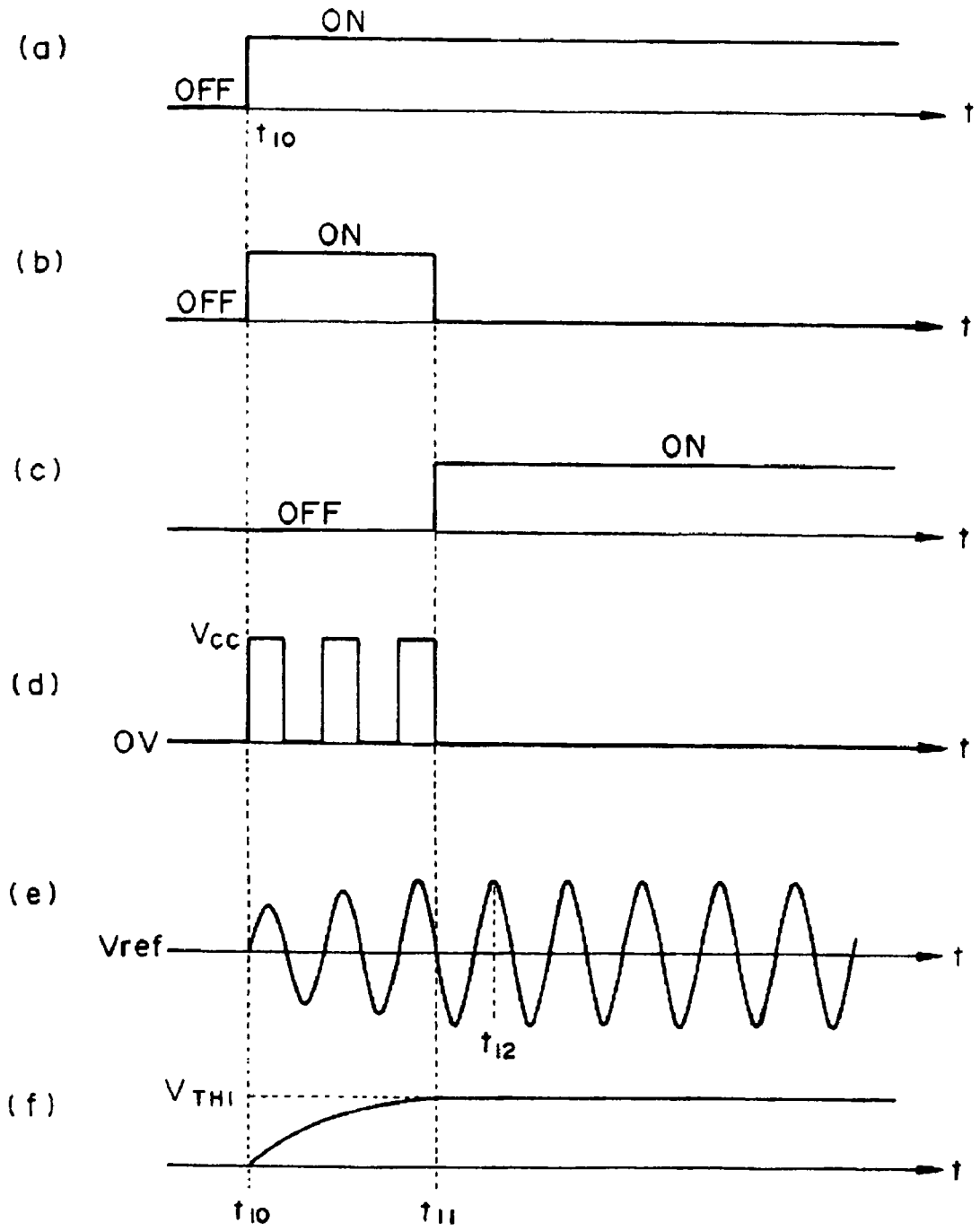
FIG. 57 is a timing chart showing an operation of an excitation driving circuit.

In FIG. 57, (a), (b), (c), (d), (e) and (f) show the on/off states of the power switch 2090, the on/off states of the analog switches 2081 and 2082, the on/off states of the analog switch 2080, the output of the forced excitation driving circuit 2051, the output of the self-excitation driving circuit 2050, and the charged voltage of the capacitor 2086, respectively.

First, at time $t_{10}$, the power switch 2090 is turned on so as to start the apparatus ((a) in FIG. 57). At this point, since the vibration of the vibrator 1200 is not in its stationary state yet, the output of the self-excitation driving circuit 2050 is nearly zero, whereby the charged voltage of the capacitor 2086 is lower than the threshold value $V_{TH1}$ of the inverter 2084 ((f) in FIG. 57). Accordingly, the analog switches 2081 and 2082 are turned on ((b) in FIG. 57), while the analog switch 2080 remains off ((c) in FIG. 57). Therefore, the forced excitation driving circuit 2051 oscillates to output an oscillation output pulse having a frequency substantially identical to the resonance frequency of the vibrator 1200 ((d) in FIG. 57). This oscillation output pulse is supplied to the electrode 1035 of the vibrator 1200 by way of the analog switch 2082, whereby the vibrator 1200 is forcibly vibrated with an amplitude which is relatively large even at the beginning and gradually increases. As a signal is obtained from the electrode 1201 of the vibrator 1200 in response to this vibration, the self-excitation driving circuit 2050 has an output such as that shown in (e) of FIG. 57. As a result, the charged voltage of the capacitor 2086 gradually increases as shown in (f) of FIG. 57. Here, until the charged voltage of the capacitor 2086 reaches the threshold value $V_{TH1}$ of the inverter 2084, the analog switch 2080 remains off, whereby the output of the self-excitation driving circuit 2050 is not supplied to the electrode 1035.

At time $t_{11}$ where the charged voltage of the capacitor 2086 has reached the threshold value $V_{TH1}$ of the inverter 2084 (the vibrator being substantially in its stationary state at this point in this embodiment), the analog switches 2081 and 2082 are turned off whereas the analog switch 2080 is turned on. Accordingly, the forced excitation driving circuit 2051 stops its oscillating operation, while the output terminal of the inverter 2070 is separated from the electrode 1035. Also, the output of the self-excitation driving circuit 2050 is supplied to the electrode 1035 by way of the analog switch 2080, whereby the vibrator 1200 is driven in a self-excitation manner with the resonance frequency of the vibrator 1200. As a result, as shown in (e) of FIG. 57, the amplitude of the vibrator 1200 becomes stable at time $t_{12}$ and thereafter, whereby the self-excited vibration of the vibrator 1200 continues under its stationary state.

In this embodiment, at the starting (period $t_{10}$ to $t_{12}$), the vibrator 1200 is forcibly driven in an excitation manner by the forced excitation driving circuit 2051, whereby the rise time $t_{10}$ to $t_{12}$ for the vibrator 1200 is greatly reduced as compared with conventional cases even when the environmental temperature in use changes.

Next, a piezoelectric vibrational angular velocity meter in accordance with another embodiment will be explained with reference to FIGS. 58 and 59.

Figure 58:
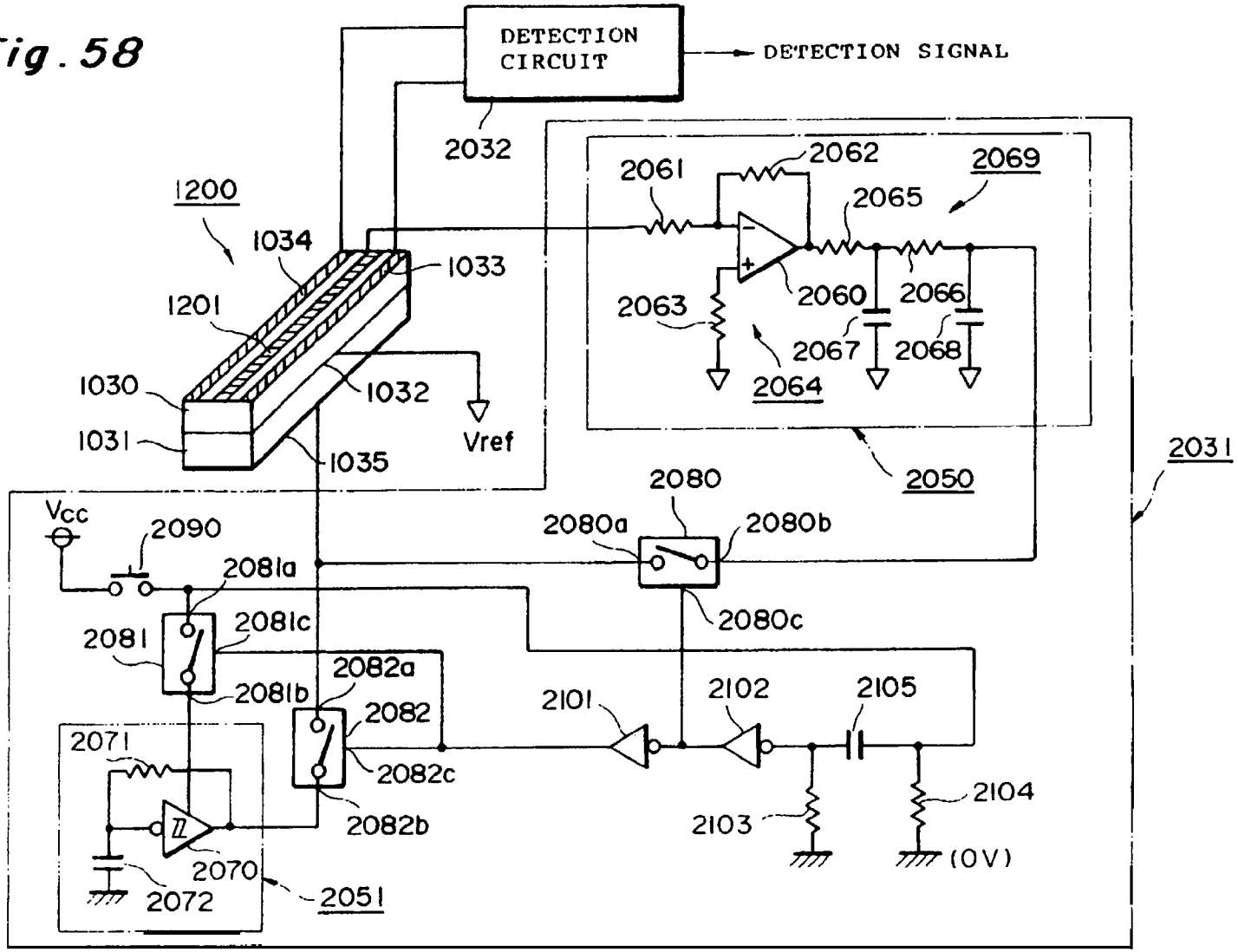
FIG. 58 is a circuit diagram showing a piezoelectric vibrational angular velocity meter.

FIG. 58 is a circuit diagram showing the piezoelectric vibrational angular velocity meter in accordance with this embodiment. In FIG. 58, constituents identical or corresponding to those shown in FIG. 56 are referred to with marks identical thereto without repeating their overlapping explanations.

The piezoelectric vibrational angular velocity meter of this embodiment differs from that shown in FIGS. 56 and 57 only in the configuration of the excitation driving circuit 2031. The excitation driving circuit 2031 in FIG. 58 differs from that in FIG. 56 only in that the inverters 2083 and 2084, resistor 2085, capacitor 2086, and diode 2087 in FIG. 56 are omitted while inverters 2101 and 2102, resistors 2103 and 2104, and a capacitor 2105 are provided instead as shown in FIG. 58.

In this embodiment, between a terminal of the power switch 2090 opposite to the power source and the ground (0 V), the capacitor 2105 and the resistor 2103 are connected in series. Also, between the terminal of the power switch 2090 opposite to the power source and the ground (0 V), the resistor 2104 used for discharge is connected. The middle point of the connection between the capacitor 2105 and the resistor 2103 is connected to the input terminal of the inverter 2102. The output of the inverter 2102 is connected to the control terminal 2080c of the analog switch 2080 and the input terminal of the inverter 2101. The output terminal of the inverter 2101 is connected to the respective control terminals 2081c and 2082c of the analog switches 2081 and 2082.

In this embodiment, the analog switches 2080, 2081, and 2082, inverters 2101 and 2102, resistors 2103 and 2104, and capacitor 2105 constitute a means by which, after a predetermined time has passed from the starting point, the excited driving of the vibrator 1200 by the forced excitation driving circuit 2051 is nullified while the excited driving of the vibrator 1200 by the self-excitation driving circuit 2050 alone is made effective. Namely, when the power switch 2090 is turned on, an electric current successively flows through the capacitor 2105 and the resistor 2103 such that the capacitor 2105 is charged, whereby the voltage of the input terminal of the inverter 2102 gradually decreases from the power source voltage $V_{CC}$ which is attained immediately after the power switch 2090 is turned on. Until the voltage of the input terminal of the inverter 2102 has reached a threshold value $V_{TH2}$ of the inverter 2102 (the level of the input terminal of the inverter 2102 being set so as to reach the threshold value $V_{TH2}$ of the inverter 2102 when the output of the forced excitation driving circuit 2051 substantially attains its stationary state, i.e., when the vibration of the vibrator 1200 substantially attains its stationary state) after a predetermined time which is determined by the time constants of the capacitor 2105 and resistors 2103 and 2104, the outputs of the inverter 2102 and 2101 are respectively set to low and high levels. Consequently, the analog switch 2080 is turned off, while the analog switches 2081 and 2082 are turned on, whereby the excited driving of the vibrator 1200 by the forced excitation driving circuit 2051 is made effective while the excited driving of the vibrator 1200 by the self-excitation driving circuit 2050 is nullified. Then, after the voltage of the input terminal of the inverter 2102 has reached the threshold value $V_{TH2}$ of the inverter 2102, the outputs of the inverter 2101 and 2102 are respectively set to low and high levels. Consequently, the analog switch 2080 is turned on, while the analog switches 2081 and 2082 are turned off, whereby the excited driving of the vibrator 1200 by the forced excitation driving circuit 2051 is nullified while the excited driving of the vibrator 1200 by the self-excitation driving circuit 2050 alone is made effective.

Next, with reference to the timing chart shown in FIG. 59, the operation of the piezoelectric vibrational angular velocity meter in accordance with this embodiment shown in FIG. 58, in particular, that of the excitation driving circuit 2031, will be explained.

Figure 59:
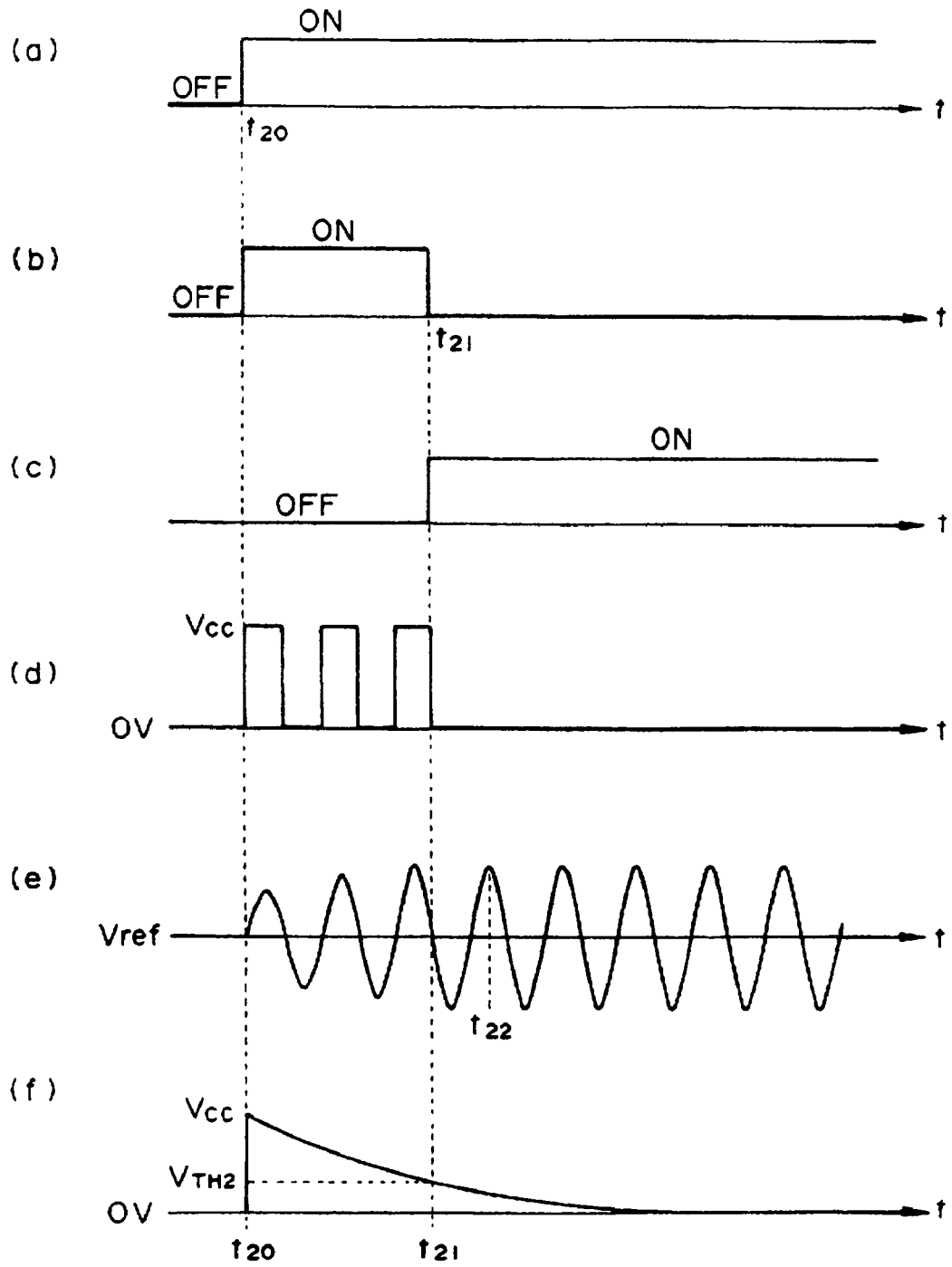
FIG. 59 is a timing chart showing an operation of an excitation driving circuit.

In FIGS. 59, (a), (b), (c), (d), (e) and (f) show the on/off states of the power switch 2090, the on/off states of the analog switches 2081 and 2082, the on/off states of the analog switch 2080, the output of the forced excitation driving circuit 2051, the output of the self-excitation driving circuit 2050, and the voltage of the input terminal of the inverter 2102, respectively.

First, at time $t_{20}$, the power switch 2090 is turned on so as to start the apparatus ((a) in FIG. 59). At this point, since the capacitor 2105 has not been charged yet, the input terminal of the inverter 2102 is at the power supply voltage $V_{CC}$ which is beyond the threshold value $V_{TH2}$ of the inverter 2102 ((f) in FIG. 59). Accordingly, the analog switches 2081 and 2082 are turned on ((b) in FIG. 59), while the analog switch 2080 remains off ((c) in FIG. 59). Therefore, the forced excitation driving circuit 2051 oscillates to output an oscillation output pulse having a frequency substantially identical to the resonance frequency of the vibrator 1200 ((d) in FIG. 59). This oscillation output pulse is supplied to the electrode 1035 of the vibrator 1200 by way of the analog switch 2082, whereby the vibrator 1200 is forcibly vibrated with an amplitude which is relatively large even at the beginning and gradually increases. Then, as the capacitor 2105 is charged, the voltage at the input terminal of the inverter 2102 gradually decreases as shown in (f) of FIG. 59. Here, until the voltage of the input terminal of the inverter 2102 reaches the threshold value $V_{TH2}$ of the inverter 2102, the analog switch 2080 remains off, whereby the output of the self-excitation driving circuit 2050 is not supplied to the electrode 1035.

At time $t_{21}$ where the voltage at the input terminal of the inverter 2102 has reached the threshold value $V_{TH2}$ of the inverter 2102 (the vibrator being substantially in its stationary state at this point in this embodiment) after a predetermined time has passed from the starting point $t_{20}$, the analog switches 2081 and 2082 are turned off whereas the analog switch 2080 is turned on. Accordingly, the forced excitation driving circuit 2051 stops its oscillating operation, while the output terminal of the inverter 2070 is separated from the electrode 1035. Also, the output of the self-excitation driving circuit 2050 is supplied to the electrode 1035 by way of the analog switch 2080, whereby the vibrator 1200 is driven in a self-excitation manner with the resonance frequency of the vibrator 1200. As a result, as shown in (e) of FIG. 59, the amplitude of the vibrator 1200 becomes stable at time $t_{22}$ and thereafter, whereby the self-excited vibration of the vibrator 1200 continues under its stationary state.

Also in this embodiment, at the starting (period $t_{20}$ to $t_{22}$), the vibrator 1200 is forcibly driven in an excitation manner by the forced excitation driving circuit 2051, whereby the rise time $t_{20}$ to $t_{22}$ for the vibrator 1200 is greatly reduced as compared with the above-mentioned comparative angular velocity meter even when the environmental temperature in use changes.

Next, a piezoelectric vibrational angular velocity meter in accordance with another embodiment will be explained with reference to FIG. 60.

Figure 60:
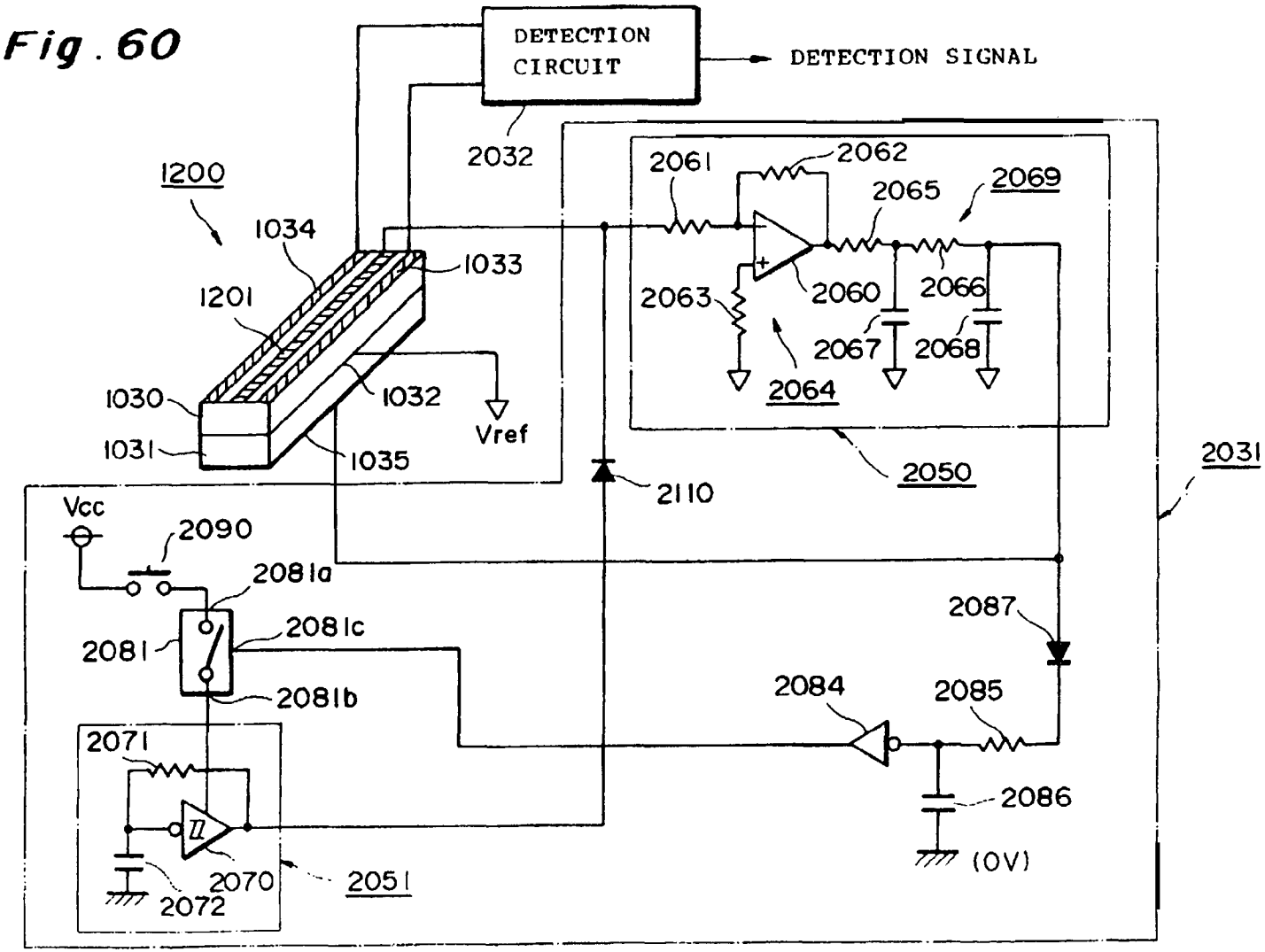
FIG. 60 is a circuit diagram of a piezoelectric vibrational angular velocity meter.

FIG. 60 is a circuit diagram showing the piezoelectric vibrational angular velocity meter in accordance with this embodiment. In FIG. 60, constituents identical or corresponding to those shown in FIG. 56 are referred to with marks identical thereto without repeating their overlapping explanations.

The piezoelectric vibrational angular velocity meter of this embodiment differs from that shown in FIGS. 56 and 57 only in the configuration of the excitation driving circuit 2031. The excitation driving circuit 2031 of this embodiment differs from that in FIG. 56 only in that the analog switches 2080 and 2082 and inverter 2083 in FIG. 56 are omitted while a diode 2110 is provided instead and that the output of self-excitation driving circuit 2051 is directly connected to the electrode 1035 of the vibrator 1200 while the output of the circuit 2051 is connected to the middle point of the connection between the input terminal of the self-excitation driving circuit and the electrode 2101 by way of the diode 2110.

In this embodiment, the circuit 2051 functions as a pulse signal applying means for forcibly applying a predetermined pulse signal to the input portion of the self-excitation driving circuit 2050 when started, while also being used as a forced excitation driving circuit. Namely, the oscillation output pulse from the circuit 2051 is also applied to the input terminal of the self-excitation driving circuit 2050 by way of the diode 2110 so as to be used as the predetermined pulse signal. Also, the oscillation output pulse from the circuit 2051 is applied to the electrode 1201 by way of the diode 2110 and used as a driving signal for forcibly driving the vibrator 1200 in an excitation manner. Here, the vibrator 1200 also vibrates when the driving signal is applied to the electrode 1201. Accordingly, in this embodiment, when the oscillation output pulse is generated from the circuit 2051, this oscillation output pulse is applied to the input terminal of the self-excitation driving circuit 2050. Then, the output of the self-excitation driving circuit 2050 generated in response thereto is applied to the electrode 1035 of the vibrator 1200 so as to forcibly vibrate the vibrator 1200, while the oscillation output is applied to the electrode 1201 so as to forcibly vibrate the vibrator 1200. Here, when the oscillation output pulse from the circuit 2051 is applied to the input terminal of the self-excitation driving circuit 2050, the self-excitation driving circuit 2050 operates as the forced excitation driving circuit.

However, for example, a reverse-current preventing diode may be inserted so as to prevent the oscillation output pulse of the circuit 2051 from being applied to the electrode 1201 such that the circuit 2051 is merely used as the pulse signal applying means without being used as the forced excitation driving circuit. In this case, the analog switch 2081, inverter 2084, resistor 2085, capacitor 2086, and diode 2087 constitute only a means by which, when the amplitude level of a signal indicative of the state of vibration of the vibrator 1200 becomes a predetermined level or higher, the application of the pulse signal by the circuit 2051 as the pulse signal applying means is nullified.

Next, the operation of the piezoelectric vibrational angular velocity meter in accordance with this embodiment shown in FIG. 60, in particular, that of the excitation driving circuit 2031, will be explained. For this explanation, reference can be made to the timing chart shown in FIG. 57 (except for (c) thereof) as well.

First, at time $t_{10}$, the power switch 2090 is turned on so as to start the apparatus ((a) in FIG. 57). At this point, since the vibration of the vibrator 1200 is not in its stationary state yet, the output of the self-excitation driving circuit 2050 is nearly zero, whereby the charged voltage of the capacitor 2086 is lower than the threshold value $V_{TH1}$ of the inverter 2084 ((f) in FIG. 57). Accordingly, the analog switch 2081 is turned on ((b) in FIG. 57). Therefore, the circuit 2051 oscillates to output an oscillation output pulse having a frequency substantially identical to the resonance frequency of the vibrator 1200 ((d) in FIG. 57). This oscillation output pulse is supplied to the electrode 1201 of the vibrator 1200 by way of the diode 2110. Also, this oscillation output pulse is supplied to the input terminal of the self-excitation driving circuit 2050. The pulse generated at the output terminal of the self-excitation driving circuit 2050 in response thereto is supplied to the electrode 1035 of the vibrator 1200. As a result, due to a synergetic effect of the pulses supplied to the electrodes 1201 and 1035, the vibrator 1200 is forcibly vibrated with an amplitude which is relatively large even at the beginning and gradually increases. As a signal is obtained from the electrode 1201 of the vibrator 1200 in response to this vibration, the self-excitation driving circuit 2050 substantially has an output shown in (e) of FIG. 57. As a result, the charged voltage of the capacitor 2086 gradually increases as shown in (f) of FIG. 57.

At time $t_{11}$ where the charged voltage of the capacitor 2086 has reached the threshold value $V_{TH1}$ of the inverter 2084 (the vibrator being substantially in its stationary state at this point in this embodiment), the analog switch 2081 is turned off. Accordingly, the forced excitation driving circuit 2051 stops its oscillating operation. Therefore, the forced excitation of the vibrator 1200 is terminated, while the vibrator 1200 is driven in a self-excitation manner by the output of the self-excitation driving circuit 2050 alone. As a result, as shown in (e) of FIG. 57, the amplitude of the vibrator 1200 becomes stable at time $t_{12}$ and thereafter, whereby the self-excited vibration of the vibrator 1200 continues under its stationary state.

Also in this embodiment, at the starting (period $t_{10}$ to $t_{12}$), the vibrator 1200 is forcibly driven in an excitation manner, whereby the rise time $t_{10}$ to $t_{12}$ for the vibrator 1200 is greatly reduced as compared with the above-mentioned comparative angular velocity meter even when the environmental temperature in use changes.

Next, a piezoelectric vibrational angular velocity meter in accordance with another embodiment will be explained with reference to FIG. 61.

Figure 61:
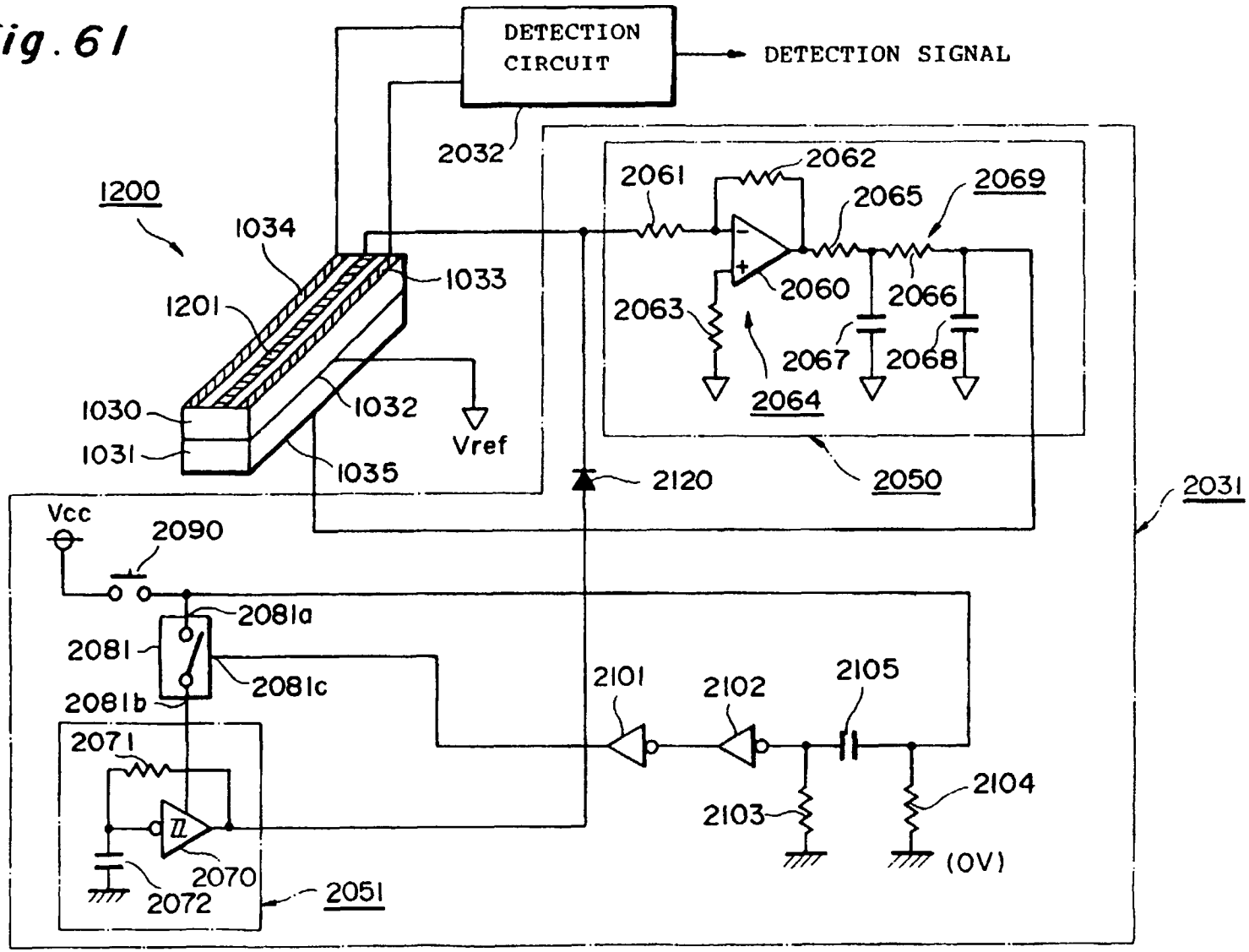
FIG. 61 is a circuit diagram of a piezoelectric vibrational angular velocity meter.

FIG. 61 is a circuit diagram showing the piezoelectric vibrational angular velocity meter in accordance with this embodiment. In FIG. 61, constituents identical or corresponding to those shown in FIG. 58 are referred to with marks identical thereto without repeating their overlapping explanations.

The piezoelectric vibrational angular velocity meter of this embodiment differs from that shown in FIGS. 58 and 59 only in the configuration of the excitation driving circuit 2031. The excitation driving circuit 2031 of this embodiment differs from that in FIG. 58 only in that the analog switches 2080 and 2082 in FIG. 58 are omitted while a diode 2120 is provided instead and that the output terminal of the self-excitation driving circuit 2050 is directly connected to the electrode 1035 of the vibrator 1200 while the output of the circuit 2051 is connected to the middle point of the connection between the input terminal of the self-excitation driving circuit and the electrode 1201 by way of the diode 2120.

In this embodiment, as in the case of the piezoelectric vibrational angular velocity meter shown in FIG. 60, the circuit 2051 functions as a pulse signal applying means for forcibly applying a predetermined pulse signal to the input portion of the self-excitation driving circuit 2050 when started, while also being used as a forced excitation driving circuit. Namely, the oscillation output pulse from the circuit 2051 is also applied to the input terminal of the self-excitation driving circuit 2050 by way of the diode 2120 so as to be used as the predetermined pulse signal. Also, the oscillation output pulse from the circuit 2051 is applied to the electrode 1201 by way of the diode 2120 and used as a driving signal for forcibly driving the vibrator 1200 in an excitation manner. Accordingly, in this embodiment, when the oscillation output pulse is generated from the circuit 2051, this oscillation output pulse is applied to the input terminal of the self-excitation driving circuit 2050. Then, the output of the self-excitation driving circuit 2050 generated in response thereto is applied to the electrode 1035 of the vibrator 1200 so as to forcibly vibrate the vibrator 1200, while the oscillation output is applied to the electrode 1201 so as to forcibly vibrate the vibrator 1200. Here, when the oscillation output pulse from the circuit 2051 is applied to the input terminal of the self-excitation driving circuit 2050, the self-excitation driving circuit 2050 operates as the forced excitation driving circuit.

However, for example, a reverse-current preventing diode may be inserted so as to prevent the oscillation output pulse of the circuit 2051 from being applied to the electrode 1201 such that the circuit 2051 is merely used as the pulse signal applying means without being used as the forced excitation driving circuit. In this case, the analog switch 2081, invertors 2101 and 2102, resistors 2103 and 2104, and capacitor 2105 constitute only a means by which, after a predetermined time has passed from the starting point, the application of the pulse signal by the circuit 2051 as the pulse signal applying means is nullified.

Next, the operation of the piezoelectric vibrational angular velocity meter in accordance with this embodiment shown in FIG. 61, in particular, that of the excitation driving circuit 2031, will be explained. Also, in this explanation, reference can be made to the timing chart shown in FIG. 59 (except for (c) thereof).

First, at time $t_2$o, the power switch 2090 is turned on so as to start the apparatus ((a) in FIG. 59). At this point, since the capacitor 2105 has not been charged yet, the input terminal of the inverter 2102 is at the power supply voltage $V_{CC}$ which is beyond the threshold value V of the inverter 2102 ((f) in FIG. 59). Accordingly, the analog switch 2081 is turned on ((b) in FIG. 59). Therefore, the circuit 2051 oscillates to output an oscillation output pulse having a frequency substantially identical to the resonance frequency of the vibrator 1200 ((d) in FIG. 59). This oscillation output pulse is supplied to the electrode 1201 of the vibrator 1200 by way of the diode 2120. Also, this oscillation output pulse is supplied to the input terminal of the self-excitation driving circuit 2050. The pulse generated at the output terminal of the self-excitation driving circuit 2050 in response thereto is supplied to the electrode 1035 of the vibrator 1200. As a result, due to a synergetic effect of the pulses supplied to the electrodes 1201 and 1035, the vibrator 1200 is forcibly vibrated with an amplitude which is relatively large even at the beginning and gradually increases. Then, as the capacitor 2105 is charged, the voltage at the input terminal of the inverter 2102 gradually decreases as shown in (f) of FIG. 59.

At time $t_{21}$ where the voltage of input terminal of the inverter 2102 has reached the threshold value $V_{TH2}$ of the inverter 2102 (the vibrator being substantially in its stationary state at this point in this embodiment) after a predetermined time has passed from the starting point $t_{20}$, the analog switch 2081 is turned off. Accordingly, the forced excitation driving circuit 2051 stops its oscillating operation. Therefore, the forced excitation of the vibrator 1200 is terminated while the vibrator 1200 is driven in a self-excitation manner by the output of the self-excitation driving circuit 2050 alone. As a result, as shown in (e) of FIG. 59, the amplitude of the vibrator 1200 becomes stable at time $t_{22}$ and thereafter, whereby the self-excited vibration of the vibrator 1200 continues under its stationary state.

Also in this embodiment, at the starting (period $t_{20}$ to $t_{22}$), the vibrator 1200 is forcibly driven in an excitation manner by the forced excitation driving circuit 2051, whereby the rise time $t_{20}$ to $t_{22}$ for the vibrator 1200 is greatly reduced as compared with the above-mentioned comparative angular velocity meter even when the environmental temperature in use changes.

Next, a piezoelectric vibrational angular velocity meter in accordance with another embodiment will be explained with reference to FIGS. 62 and 63.

Figure 62:
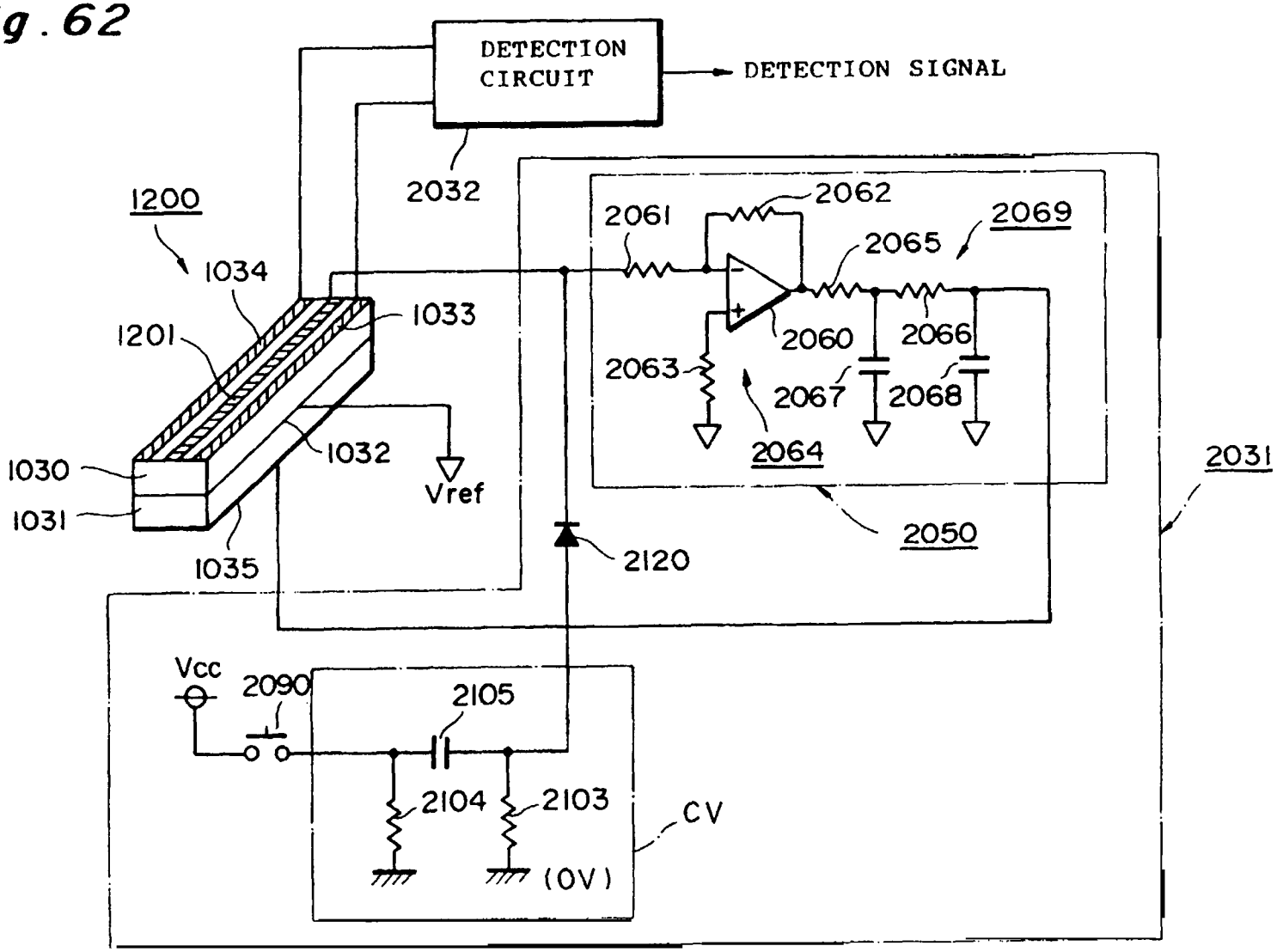
FIG. 62 is a circuit diagram showing a piezoelectric vibrational angular velocity meter.

FIG. 62 is a circuit diagram showing the piezoelectric vibrational angular velocity meter in accordance with this embodiment. In FIG. 62, constituents identical or corresponding to those shown in FIG. 61 are referred to with marks identical thereto without repeating their explanations.

The piezoelectric vibrational angular velocity meter of this embodiment differs from that shown in FIG. 61 only in the configuration of the excitation driving circuit 2031. The excitation driving circuit 2031 of this embodiment differs from that in FIG. 61 only in that the circuit 2051 and analog switch 2081 in FIG. 61 are omitted.

In this embodiment, a circuit composed of resistors 2103 and 2104 and a capacitor 2105 forms a forced excitation driving circuit CV, while functioning as a pulse signal applying means for forcibly applying a predetermined pulse signal to the input portion of the self-excitation driving circuit 2050 when started. Namely, when started, a single pulse is output from the middle point of the connection between the capacitor 2105 and the resistor 2103. This single pulse is applied to the electrode 1201 by way of the diode 2120 and used as a driving signal for forcibly driving the vibrator 1200 in an excitation manner. Also, this single pulse is applied to the input terminal of the self-excitation driving circuit 2050 by way of the diode 2120 and used as the predetermined pulse signal. Accordingly, in this embodiment, when the single pulse is generated, it is applied to the input terminal of the self-excitation driving circuit 2050. The output of the self-excitation driving circuit 2050 generated in response thereto is applied to the electrode 1035 of the vibrator 1200 so as to forcibly excite the vibrator 1200, while the oscillation output pulse is applied to the electrode 1201 so as to forcibly excite the vibrator 1200.

Next, the operation of the piezoelectric vibrational angular velocity meter in accordance with this embodiment shown in FIG. 62, in particular, that of the excitation driving circuit 2031, will be explained with reference to the timing chart shown in FIG. 63.

Figure 63:
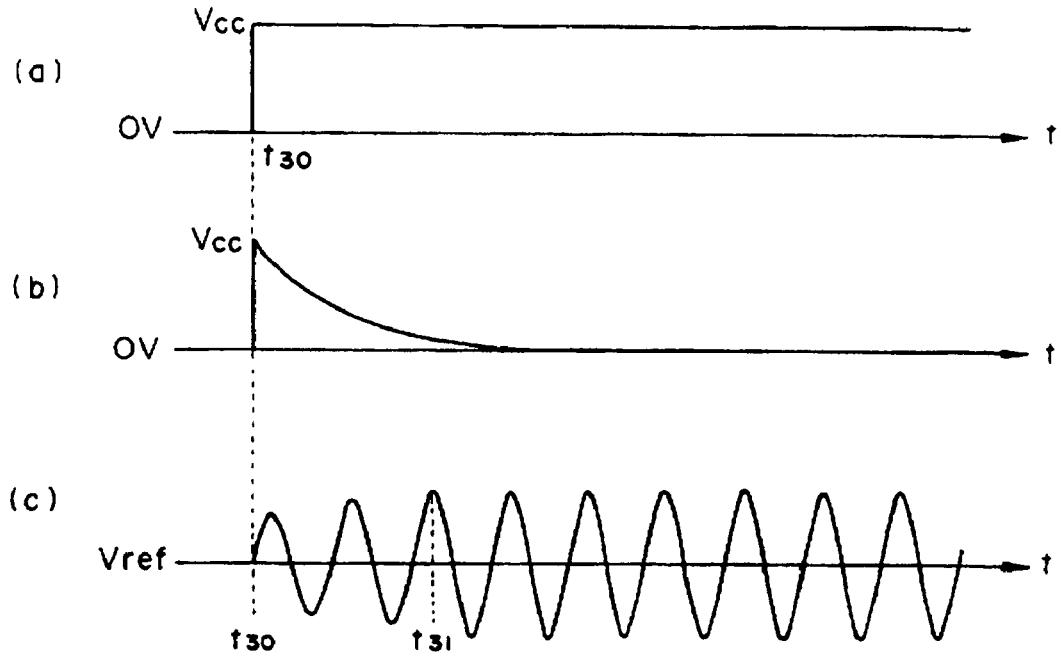
FIG. 63 is a timing chart showing an operation of an excitation driving circuit.

In FIG. 63, (a), (b), and (c) show the on/off states of the power switch 2090, the voltage at the middle point of the connection between the capacitor 2105 and the resistor 2103, and the output of the self-excitation driving circuit 2050, respectively.

First, at time $t_{30}$, the power switch 2090 is turned on so as to start the apparatus ((a) in FIG. 63). The voltage at the middle point of the connection between the capacitor 2105 and the resistor 2103 is at the power supply voltage $V_{CC}$ at this point and gradually decreases thereafter ((b) in FIG. 63). Namely, when the power switch is turned on, a single pulse such as that shown in (b) of FIG. 63 is generated. This single pulse is supplied to the electrode 1201 of the vibrator 1200 by way of the diode 2120. Also, this single pulse is supplied to the input terminal of the self-excitation driving circuit 2050. Then, a pulse generated at the output terminal of the self-excitation driving circuit 2050 in response thereto is supplied to the electrode 1035 of the vibrator 1200. As a result, due to a synergetic effect of the pulses supplied to the electrodes 1201 and 1035, the vibrator 1200 is forcibly vibrated once initially with a relatively large amplitude when started. Thereafter, based on the signal from the electrode 1201 generated in response to this vibration, the self-excitation driving circuit 2050 drives the vibrator 1200 in a self-excitation manner. As a result, as shown in (c) of FIG. 63, the amplitude of the vibrator 1200 becomes stable at time $t_{31}$ and thereafter, whereby the self-excited vibration of the vibrator 1200 continues under its stationary state.

Also in this embodiment, at the starting (initial part at the starting in this embodiment), the vibrator 1200 is forcibly driven in an excitation manner by the forced excitation driving circuit, whereby the rise time $t_{30}$ to $t_{31}$ for the vibrator 1200 is greatly reduced as compared with the above-mentioned comparative angular velocity meter even when the environmental temperature in use changes.

Here, in the embodiments shown in FIGS. 56 to 62, the vibrator 1020 shown in FIG. 43 may be used in place of the vibrator 1200 shown in FIG. 39.

Also, in the embodiments shown in FIGS. 56 to 62, the vibrator 1020 shown in FIG. 33 may be used in place of the vibrator 1200 shown in FIG. 39.

When this vibrator 1020 is used, one terminal of the resistor 2061 may be connected to the electrode 1033 or 1034 in FIGS. 56, 58, 60, 61, and 62. Alternatively, to the self-excitation driving circuit 2050, two resistors respectively corresponding to the resistors 2008 and 2009 in FIG. 64 may be added such that first ends of these two resistors are respectively connected to the electrodes 1033 and 1034. For example, in the case where the vibrator 1020 is used in FIG. 60, even when the above-mentioned two resistors are added thereto, the cathode of the diode 2110 may be connected to the input terminal of the inverting amplifier 2064 of the self-excitation driving circuit 2050.

Also, in the embodiments shown in FIGS. 56 to 62, the vibrator 1210 shown in FIG. 41 may be used in place of the vibrator 1200 shown in FIG. 39.

Further, in the embodiments shown in FIGS. 56 to 62, the vibrator 1230 shown in FIG. 45 may be used in place of the vibrator 1200 shown in FIG. 39. In this case, the points connected to the electrode 1035 in FIGS. 56, 58, 60, 61, and 62 are connected to the electrode 1231 of the vibrator 1230.

Also, in the embodiments shown in FIGS. 56 to 62, the vibrator 1240 shown in FIG. 47 may be used in place of the vibrator 1200 shown in FIG. 39.

Further, the vibrator 1300 shown in FIG. 49 may be used in place of the vibrator 1200 shown in FIG. 39 in the embodiments shown in FIGS. 56 to 62. In this case, for example, the metal pole 1310, the outer electrodes of the PZT plates 1350 and 1340, and the outer electrode of the PZT plate 1320 may be respectively used as the electrode 1032, electrodes 1033 and 1034, and electrode 1035 of the vibrator 1200. Also, to the self-excitation driving circuit 2050, two resistors respectively corresponding to the resistors 2008 and 2009 in FIG. 64 may be added such that first ends of these two resistors are respectively connected to the outer electrodes of the PZT plates 1350 and 1340.

Further, the vibrator 1400 shown in FIG. 51 may be used in place of the vibrator 1200 shown in FIG. 39 in the embodiments shown in FIGS. 56 to 62. In this case, for example, the metal pole 1410, the outer electrodes of the PZT plates 1420 and 1430, and the outer electrode of the PZT plate 1440 may be respectively used as the electrode 1032, electrodes 1033 and 1034, and electrode 1035 of the vibrator 1200. Also, to the self-excitation driving circuit 2050, two resistors respectively corresponding to the resistors 2008 and 2009 in FIG. 64 may be added such that first ends of these two resistors are respectively connected to the outer electrodes of the PZT plates 1420 and 1430.

Further, the vibrator 1500 shown in FIG. 51 may be used in place of the vibrator 1200 shown in FIG. 39 in the embodiments shown in FIGS. 56 to 62. In this case, for example, the two electrodes 1550 and 1540, the electrodes 1530 and 1560, and the electrode 1520 may be respectively used as the electrode 1032, electrodes 1033 and 1034, and electrode 1035 of the vibrator 1200. Also, to the self-excitation driving circuit 2050, two resistors respectively corresponding to the resistors 2008 and 2009 in FIG. 64 may be added such that first ends of these two resistors are respectively connected to the electrodes 1530 and 1560.

In the following, a camera using such a self-excitation driving circuit will be explained.

Figure 66:
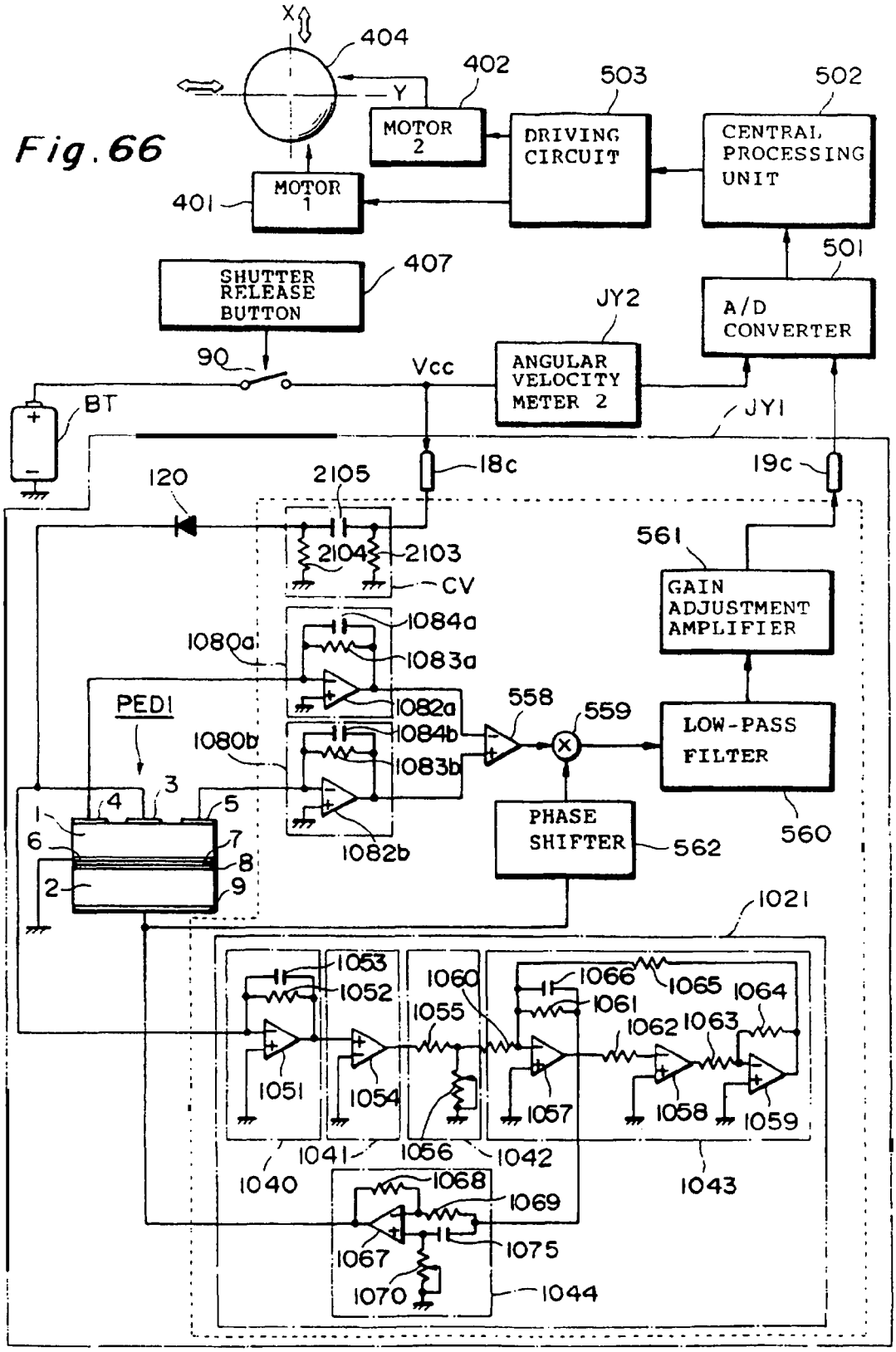
FIG. 66 is a block diagram showing a camera system.

FIG. 66 shows a system configuration of a camera obtained when a piezoelectric vibrational angular velocity meter JY1 comprising an excitation driving circuit, in which the self-excitation circuit shown in FIG. 32 and the forced excitation circuit CV shown in FIG. 62 are combined together, is applied to the camera shown in FIG. 4A. The configuration of a piezoelectric vibrational angular velocity meter JY2 in FIG. 66 is identical to that of the angular velocity meter JY1. These angular velocity meters JY1 and JY2 are disposed such that the longitudinal directions of their respective vibrators are perpendicular to each other as shown in FIG. 4A. Here, elements identical or equivalent to each other are referred to with identical marks without repeating their overlapping explanations. Though the buffer amplifiers 1071 and 1072 are not used in the system shown in FIG. 66, they may be incorporated therein.

A power source or battery BT accommodated within the camera supplies an electric power to the system within the camera. As a shutter release button 407 is pushed down, the camera performs an image capturing operation. As the shutter release button 407 is pushed down, a switch 90 is turned on, whereby a driving electric power is supplied to each of the angular velocity meters JY1 and JY2. Namely, as the shutter release button 407 is pushed down, the potential of an input terminal 18c becomes $V_{CC}$. When the input voltage $V_{CC}$ is applied to the input terminal of the forced excitation circuit CV, namely, the joint between the resistor 2103 and the capacitor 2105, one pulse of voltage is applied to a center electrode 3 by way of the joint between the resistor 2104 and the capacitor 2105 and then by way of the diode 2120. Accordingly, one pulse of voltage is applied between a ground electrode 6 of the vibrator and the center electrode 3, whereby an upper piezoelectric crystal layer 1 bends in its thickness direction. At this time, the input pulse voltage transmitted through the diode 2120 is also applied to the input terminal of the self-excitation circuit 1021.

The input pulse current which flows into the current/voltage converting circuit 1040 from the forced excitation circuit CV in response to the input pulse voltage is converted into a pulse voltage. Thus converted pulse voltage is input into the comparator 1041 from which the component of this voltage greater than zero level is output as the high level. The amplitude of the square wave voltage output from the comparator 1041 is adjusted by the potential dividing circuit 1042. The square wave voltage transmitted through the potential dividing circuit 1042 is transmitted through the band-pass filter 1043 so as to be converted into a sine wave voltage. The sine wave voltage output from the band-pass filter 1043 is input into the phase shifter 1044.

The phase shifter 1044 adjusts the phase of the input voltage such that the phase of the sine wave voltage output therefrom equals to the phase of the input voltage of the self-excitation circuit 1021. Accordingly, the pulse voltages are applied between the center electrode 3 and ground electrode 6 of the vibrator and between the lower surface electrode 9 and ground electrode 6 of the vibrator from the forced excitation circuit CV and the self-excitation circuit 1021, respectively, whereby the vibrator greatly bends in its thickness direction. Therefore, the rise time for the vibrator can be reduced. Also, a voltage due to a piezoelectric effect is generated between the center electrode 3 and ground electrode 6 of the upper piezoelectric crystal layer 1 which has bent in the thickness direction. This voltage is input into the self-excitation circuit 1021 again, whereby the vibration of the vibrator continues. When the vibrator rotates while vibrating, Coriolis force is imparted to the vibrator, thereby warping the vibration of the vibrator.

At each of left and right electrodes 4 and 5 of the vibrator, an AC voltage, in which the voltage generated by the Coriolis force is superposed on the voltage generated by the vibration, is generated. The alternating currents flowing through the vibrator due to these AC voltages are converted into AC voltages by current/voltage converting circuits 1080a and 1080b, respectively. The current/voltage converting circuits 1080a is constituted by an operational amplifier 1082a, a resistor 1083a, and a capacitor 1084a; whereas the current/voltage converting circuits 1080b is constituted by an operational amplifier 1082b, a resistor 1083b, and a capacitor 1084b. A differential amplifier 558 outputs the difference between these AC voltages, namely, the voltage component generated in response to the Coriolis force. Assuming that the angular velocity is $\Omega$ and the velocity of vibration of the vibrator in its thickness direction is V, Coriolis force F is in proportion to $\Omega \times V$. At the time when the velocity of vibration V is maximized, namely, when the vibrator is at the neutral position (phase of vibration =0°), the Coriolis force F is maximized and, accordingly, the sine wave voltage (phase of AC voltage =90°) generated by the Coriolis force is also maximized.

Consequently, the phase of the electric signal corresponding to the Coriolis force output from the differential amplifier 558 is shifted from the phase of the AC signal for vibrating the vibrator by about 90°. A phase shifter 562 makes the phases of these signals coincide with each other. A multiplier 559 synchronously detects and then outputs the multiplication of these signals, namely, the voltage signal corresponding to the Coriolis force output from the differential amplifier 558. This voltage signal corresponding to the Coriolis force is smoothed by the low-pass filter 560. Then, its gain is adjusted by a gain adjustment amplifier 561. Subsequently, it is digitized by an A/D converter 501 so as to be input into a central processing unit 502 within the camera as an angular velocity data (X axis). The configuration of the angular velocity meter JY2 is identical to that of the angular velocity meter JY1. The signal output from the angular velocity meter JY2 is digitized by the A/D converter 501 so as to be input into the central processing unit 502 within the camera as an angular velocity data (Y axis). Based on thus detected angular velocity data, the central processing unit 502 controls motors 401 and 402 so as to move an image pickup lens 404. Here, the central processing unit 502 moves the lens 404 as explained with reference to FIGS. 4B to 4D.

The vibrator used in the piezoelectric vibrational angular velocity meter in accordance with the present invention should not be restricted to the foregoing vibrators. Any of the foregoing vibrators or piezoelectric vibrational angular velocity meters can be applied to the above-mentioned camera. The excitation driving circuit can also be used when vibrators of other apparatuses and the like are driven in an excitation manner.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 207080/1994 (6-207080) filed on Aug. 31, 1994, 207081/1994 (6-207081) filed on Aug. 31, 1994, 207082/1994 (6-207082) filed on Aug. 31, 1994, 115693/1995 (7-115693) filed on May 15, 1995, 170152/1995 (7-170152) filed on Jun. 13, 1995, and 209242/1995 (7-209242) filed on Jul. 25, 1995 are hereby incorporated by reference.

What is claimed is:

1. An angular velocity meter comprising:

a vibrator and a self-excitation driving circuit for driving said vibrator in a self-excitation manner, said self-excitation driving circuit comprising:

a converting means for converting a first sine wave voltage indicative of a state of vibration of said vibrator into a square wave voltage which becomes a first predetermined level when said first [square] *sine* wave voltage is greater than a predetermined reference level while becoming a second predetermined level when said first [square] *sine* wave voltage is smaller than said predetermined reference level;

a filter for filtering a second sine wave voltage, which has a frequency identical to a frequency of said first sine wave voltage, from said square wave voltage; and a phase shifter for adjusting a phase of said second sine wave voltage, which has been filtered by said filter, such that an amplitude of vibration of said vibrator is substantially maximized.

2. A meter according to claim 1, further comprising a current/voltage converter which receives one input signal from said vibrator as an electric current signal and converts said electric current signal into a voltage signal, said converting means converting an output of said current/voltage converter, as said first sine wave voltage, into said square wave voltage.

3. A meter according to claim 1, further comprising a means for receiving one input signal from said vibrator as a voltage signal, said converting means converting said voltage signal, as said first sine wave voltage, into said square wave voltage.

4. A meter according to claim 1, wherein said converting means includes a zero-cross comparator.

5. A meter according to claim 4, wherein said converting means further includes an attenuator for attenuating an output of said zero-cross comparator.

6. A meter according to claim 5, wherein said attenuator comprises a potential dividing circuit including a variable resistor.

7. A meter according to claim 1, wherein said vibrator comprises:

a first piezoelectric crystal layer;

at least three electrodes formed on an upper surface of said first piezoelectric crystal layer; and an electrode formed on a lower surface of said first piezoelectric crystal layer.

8. A camera comprising the meter according to claim 1.

9. A self-excitation circuit for driving a vibrator in a self-excitation manner, said self-excitation circuit comprising:

a converting means for converting a first sine wave voltage indicative of a state of vibration of said vibrator into a square wave voltage which becomes a first predetermined level when said first [square] *sine* wave voltage is greater than a predetermined reference level while becoming a second predetermined level when said first [square] *sine* wave voltage is smaller than said predetermined reference level;

a filter for filtering a second sine wave voltage, which has a frequency identical to a frequency of said first sine wave voltage, from said square wave voltage; and a phase shifter for adjusting a phase of said second sine wave voltage, which has been filtered by said filter, such that an amplitude of vibration of said vibrator is substantially maximized.

*10. A self-excitation circuit according to claim 9, wherein said converting means includes a zero-cross comparator.*

* * * * *